US006415952B1

(12) United States Patent
Ohtuka et al.

(10) Patent No.: US 6,415,952 B1
(45) Date of Patent: Jul. 9, 2002

(54) APPARATUS FOR CARRYING SELECTED ARTICLE TO TAKE-OUT WINDOW IN AUTOMATIC VENDING MACHINE

(75) Inventors: Yuji Ohtuka; Yukio Tamura, both of Osaka-fu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/562,444

(22) Filed: May 1, 2000

(51) Int. Cl.[7] .................................... B65G 59/00
(52) U.S. Cl. .................................... 221/103; 221/131
(58) Field of Search .................................... 221/5, 7, 9, 13, 221/15, 92, 105, 106, 123, 131, 247, 248

(56) References Cited

U.S. PATENT DOCUMENTS 3,747,733 A * 7/1973 Knickerbocker ............ 221/103

FOREIGN PATENT DOCUMENTS

JP 8-315240 11/1996

* cited by examiner

*Primary Examiner*—Kenneth W. Noland
(74) *Attorney, Agent, or Firm*—McDermott, Will & Emery

(57) ABSTRACT

A plurality of article-storing columns, each of which stores therein various kinds of articles piled up and being different from others, are arranged within a machine in row and column directions. At the lower part of each of these article-storing columns, an article-push-out means for pushing out an article at the lowest layer, respectively. A movable article-picking-up means which operates for the article-push-out means of each of the article-storing columns at position opposite to it is provided. The article pushed out by the movement of the article-push-out means actuated by the article-picking-up means is taken into the article-picking-up means and carried to a article-take-out unit of the machine. Further, a plurality of article-storing columns, each of which stores therein various kinds of articles piled up and being different from others, are arranged within a machine in row and column directions. An article-picking-up means, which takes in an article in each of the article-storing columns at the position opposite to it, is provided in a state being able to move in a perpendicular direction Y and in a horizontal direction X by a first and a second transfer means. The article taken into the article-picking-up means is carried to a article-take-out unit of the machine.

11 Claims, 49 Drawing Sheets

APPARATUS FOR CARRYING SELECTED ARTICLE TO TAKE-OUT WINDOW IN AUTOMATIC VENDING MACHINE

FIELD OF THE INVENTION

This invention relates to an apparatus for carrying a selected article to a take-out window in an automatic vending machine used for the sale of an article having many kinds, for example, cigarettes etc., and more particularly, relates to an apparatus for carrying a selected article to a take-out window in an automatic vending machine having an improved carrying mechanism for taking out an article from each of article-storing columns storing various kinds of articles which are piled up therein and different from others, respectively, and carrying the article to an article-take-out window.

BACKGROUND OF THE INVENTION

In the past, in this kind of article-carrying apparatus in an automatic vending machine, for example, as disclosed in Japanese laid-open patent specification Tokkaihei 8-315240 filed by the applicant of this invention and laid-open, there has been an apparatus having such structure as providing a driving belt under the lower part of each of article-storing columns within a machine in which various kinds of articles are stored in piled up state, and pushing out an article at the lowest layer piled up on this driving belt by moving the protrusion by almost horizontal running of said driving belt and making the article fall and carry towards an article-carrying portion.

However, in such conventional type of article-carrying apparatus in an automatic vending machine, there is a disadvantage in that the number of the article-storing columns increases, especially in a case that many kinds of goods are stored, because an independent driving mechanism is provided for each of article-storing columns within a machine, so that not only the number of driving mechanism required increases, wiring within the machine becomes complicated and reduction in number of required parts is disturbed but also the cost for the whole apparatus is raised.

Also, in order to raise the space-using efficiency of the machine, it is desirable to provide article-storing columns in the inside of the door which opens and shuts the front of the main body of a machine, too, but a conventional apparatus described above can not achieve the purpose.

SUMMARY OF THE INVENTION

Accordingly, it is an object of the invention to provide an article-carrying apparatus in an automatic vending machine enabled to dispose within both the main body of a machine and the door thereof each of article-storing columns in which classified, various kinds of articles are stored in a state of being piled up, respectively, so that article-storing efficiency can be raised, and to decrease number of parts required for an article-carrying apparatus in order to reduce the cost for the whole apparatus.

According to the first aspect of the invention, the invention described in claim 1 provides an apparatus for carrying a selected article to a take-out window in an automatic vending machine, comprising a plurality of columns for storing various articles classified in kind and piled one on another, the plurality of columns being arranged in columns and rows, the apparatus, comprises: means for pushing out an article which is positioned at the lowest layer in each of the plurality of columns, the pushing-out means being provided at the lower part of each of the plurality of columns; means for picking up the article pushed out by the pushing-out means; and means for moving the picking-up means which is holding the article in predetermined directions, whereby the selected article is carried to a predetermined position in the vicinity of the take-up window; wherein the pushing-out means is actuated by the picking-up means.

The invention described in claim 1 provides the apparatus, wherein each of the columns and the pushing-out means are arranged in the main body and the inside of the door which is provided in the front of the main body and enabled to open and shut.

The invention described in claim 2 provides the.: apparatus as defined in claim 1, wherein the picking-up means is positioned between the main body and the door thereof.

The invention described in claim 3 provides the apparatus as defined in claim 1, or 2, wherein the moving-means has means for hanging and supporting the picking-up means in a state being movable in horizontal direction, a vertical-transfer mechanism which makes the hanging-and-supporting means move in vertical direction, and a horizontal-transfer mechanism which makes the picking-up means hung and supported by the hanging-and-supporting means move in horizontal direction.

The invention described in claim 4 provides the apparatus as defined in claim 1, 2, or 3, wherein the pushing-out means has a pushing-out member which moves to push out an article at the lowest layer piled up in each of columns toward a direction for the article to be pushed out, and a differential mechanism which makes the pushing-out member return to its original waiting position.

The invention described in claim 5 provides the apparatus as defined in claim 1, 2, 3, or 4, wherein the picking-up means has a pushing-out-drive means which makes the pushing-out means drive toward the pushing-out direction of the article, means for taking in the article pushed out from the column one by one by the drive of the pushing-out means driven by the pushing-out-drive means, and a means for holding and carrying the article which stores and holds the article temporally and carries out it, wherein the holding-and-carrying means is enabled to carry out the article at the position to which the picking-up means is moved by the moving means and at which it corresponds to the article carrying out portion.

The invention described in claim 6 provides the apparatus as defined in claim 5, wherein the pushing-out-drive means has a protrusion member enabled to protrude and move toward the pushing-out means and means for driving the protrusion member, and the pushing-out member of the pushing-out means is pushed out by the protrusion and movement of the protrusion member driven by the drive means, and returned to its original waiting position by the releasing operation by the withdrawal drive of the protrusion member.

The invention described in claim 7 provides the apparatus as defined in claim 5, wherein the drive means for the taking-in means and for the holding-and-carrying means is co-used.

That is to say, according to an article carrying apparatus in an automatic vending machine embodying the first aspect of the invention, each of the plurality of columns in which various kinds of articles piled up and being different from others are arranged vertically and horizontally, in plural columns and rows, and an pushing-out means which pushes out an article at lowest layer is provided at the lower part of each of the columns, while for each of the pushing-out means of respective article-storing columns, a movable picking-up means operating at the opposite side of the column is provided, and an article pushed out by the operation of the pushing-out means actuated by the picking-up means is taken into said picking-up means and moved to an article take-out unit of the machine, so that the drive for the pushing-out means of all the columns is conducted by one picking-up means and number of required parts for the article carrying system is decreased and cost of the whole apparatus is reduced.

Also, since each of the columns and the pushing-out means thereof are lined up in the main body of a machine and the inside of the door, article-storing efficiency is raised.

According to the second aspect of the invention, the invention described in claim 8 provides an apparatus for carrying a selected article to a take-out window in an automatic vending machine, a plurality of columns for storing various articles classified in kind and piled one on another, the plurality of columns being arranged in columns and rows, the apparatus, comprises: means for picking up the article from each of the plurality of columns one by one at a position opposite to the column and takes therein and means for moving the picking-up means selectively from the article take-out window to a position corresponding to each of the plurality of columns, wherein the picking-up means includes an article-taking-in-and-placing unit, a protrusion member enabled to move to protrude and withdraw so as to take in an article at the lowest layer in the column into said article-take-in-and-placing unit, a pushing-out member which is provided at the protruding end of the protrusion member and capable of rotating to stand upward, and a drive unit driving the protrusion member, wherein an article at the lowest layer in the column is pushed out from its back side toward the article-take-in-and-placing unit by the withdrawal movement of the protrusion member by the drive unit after the protrusion.

The invention described in claim 9 provides the apparatus as defined in claim 8, wherein the columns are arranged in the main body and the door which is provided in the front side of the machine and enabled to open and shut.

The invention described in claim 10 provides the apparatus as defined in claim 9, wherein the picking-up means is positioned between the main body and the door.

The invention described in claim 11 provides the apparatus as defined in claim 8, 9 or 10, wherein the moving means comprise a hanging-and-supporting means which hangs and supports the picking-up means,a vertical-transfer mechanism which moves the hanging-and-supporting means perpendicularly, and a horizontal-transfer mechanism which moves the picking-up means which is hung and supported by the hanging-and-supporting means in a horizontal direction.

That is to say, according to an article carrying apparatus in an automatic vending machine embodying the second aspect of the invention, each of the plurality of columns which stores various kinds of articles piled up therein and being different from others are arranged within a machine vertically and horizontally, in plural columns and rows, respectively, and a movable article-picking-up means which takes in an article stored in each of the columns at a position opposite to it is provided, and the article which is taken into the article-picking-up means is moved to an article take out unit of the machine, so that the drive for the plurality of columns is conducted by one picking-up means, by which number of parts required for the article carrying system is reduced and cost reduction for the whole apparatus is performed.

BRIEF DESCRIPTION OF THE DRAWINGS

The invention will be described in more detail in conjunction with the appended drawings, wherein;

FIG. 38, likewise, shows patterns of arrangement of an article-storing columns in a machine body and the door.

DETAILED DESCRIPTION OF THE PREFERRED EMBODIMENT

Figure 1:
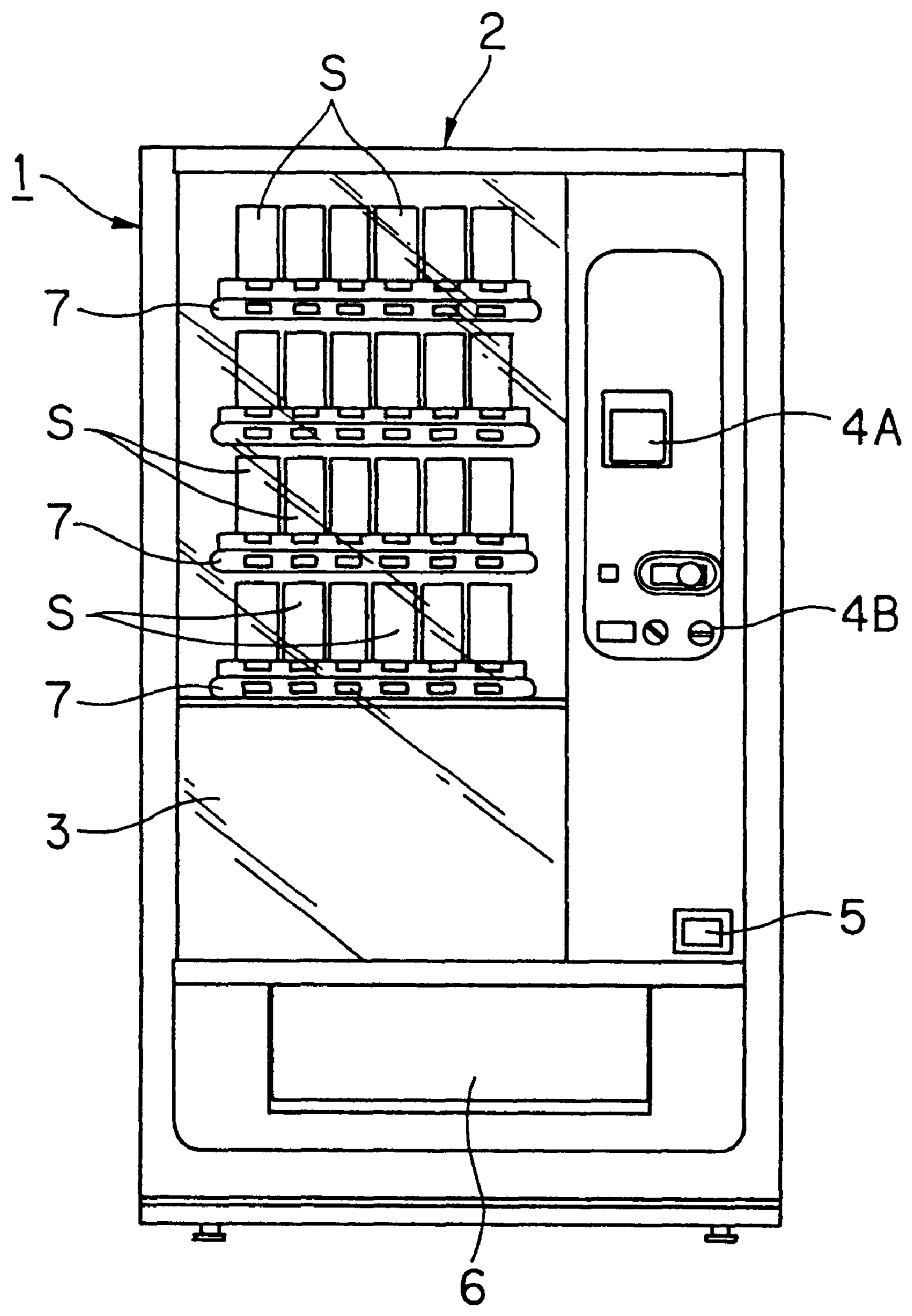
FIG. 1 is an explanatory drawing showing an automatic vending machine embodying the invention.

Referring now to the drawings an embodiment of the invention will be explained in detail. FIG. 1 shows briefly the whole structure of an automatic vending machine in which an article-carrying apparatus embodying the invention is installed. The reference numeral 1 indicates a machine, 2 indicates the main body of the machine, 3 indicates a door provided on the front side of the main body 2 and being capable of opening and closing. On the front surface of the door 3, a bill putting-in aperture 4A and a coin putting-in aperture 4B which constitute a cash putting-in portion, a change repaying aperture 5 and an article take-out window 6 are provided, and above them plural kinds of sales samples of article S, cigarettes etc, are displayed in plural columns, and push buttons 7 are provided every columns of these sample articles S as the switches to select an article to be purchased.

Figure 2:
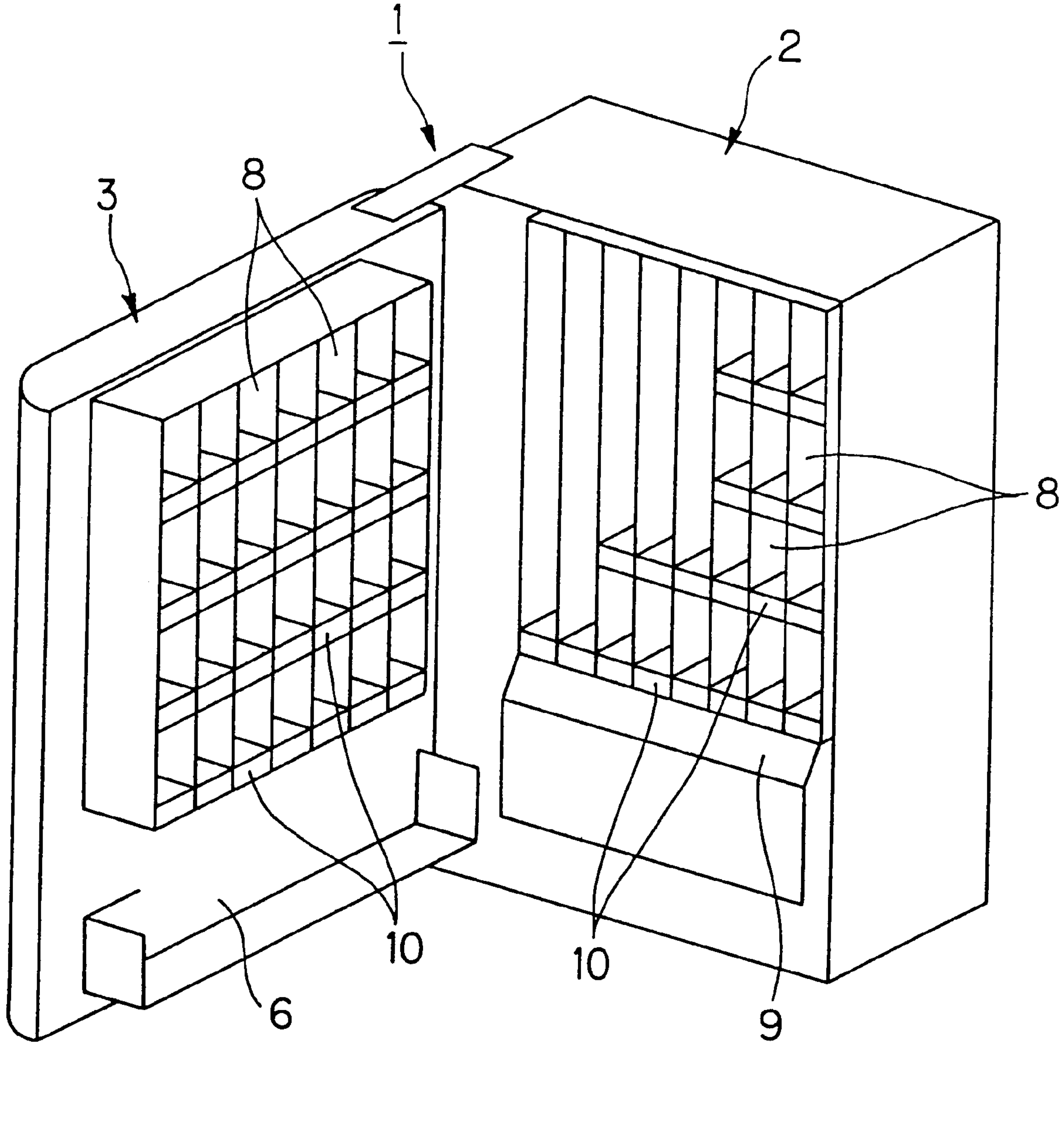
FIG. 2 is, likewise, an explanatory drawing showing briefly an arrangement of article-storing columns in a state that the door of a machine is opened.
Figure 3:
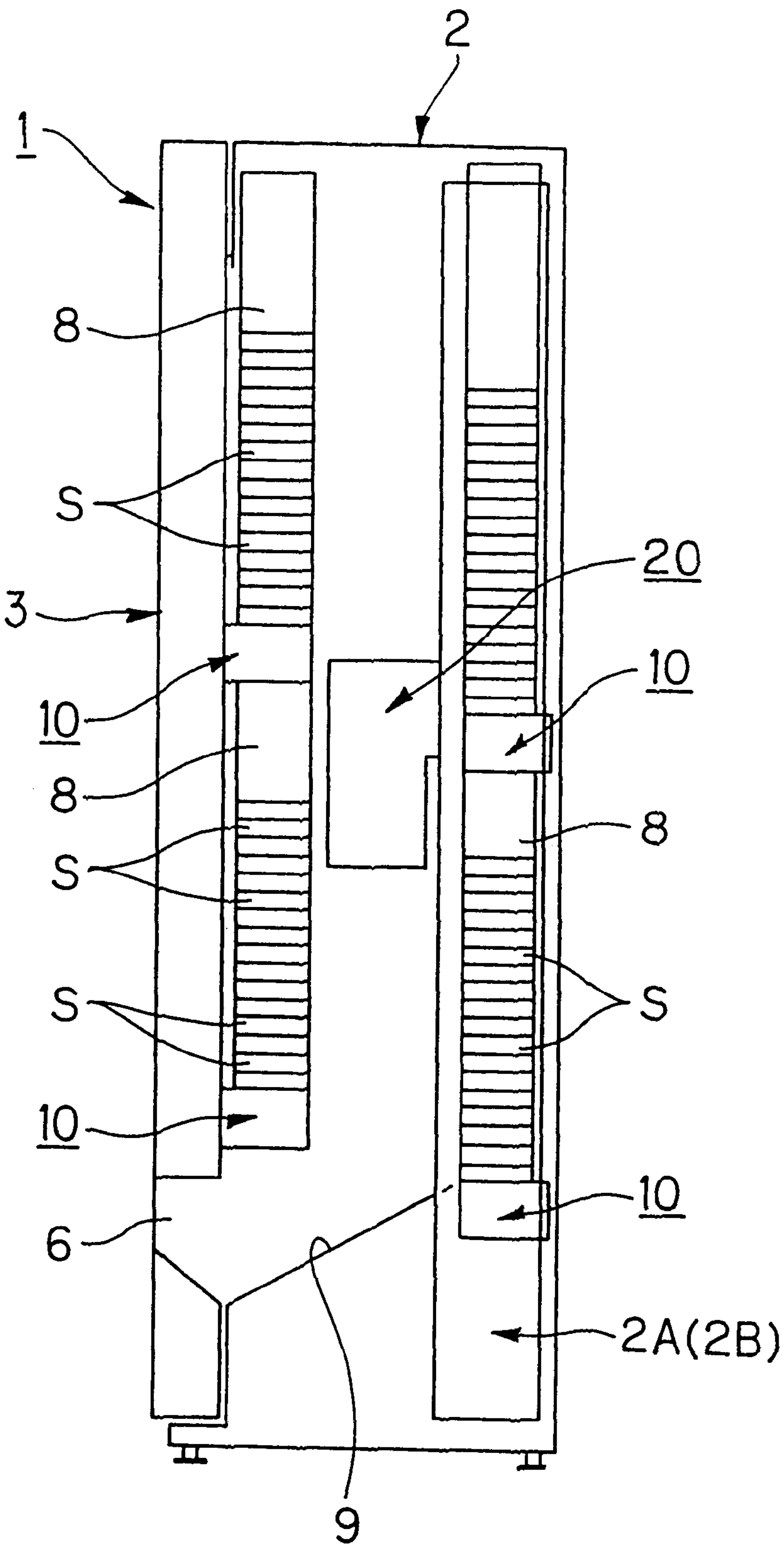
FIG. 3 is, likewise, an explanatory drawing showing briefly an arrangement of article-storing columns and an article-pick-up means.

And, as shown in FIG. 2, in the main body 2 of machine 1 and the inside of the door 3, in the front and the back sides, respectively, plural article-storing columns 8 in which various articles S classified by kind and piled up in horizontally-laid posture are arranged, in vertical column and in horizontal row directions, to form a matrix of a predetermined arrangement pattern. These front and back article-storing columns 8 and 8, as shown in FIG. 3, are disposed to oppose each other with the front and rear relation when the door is closed, and at the bottom of the main body 2 a shooter 9 is disposed so as to correspond to the article-take-out window 6 provided at the lower part on the front of the door 3.

Figure 4:
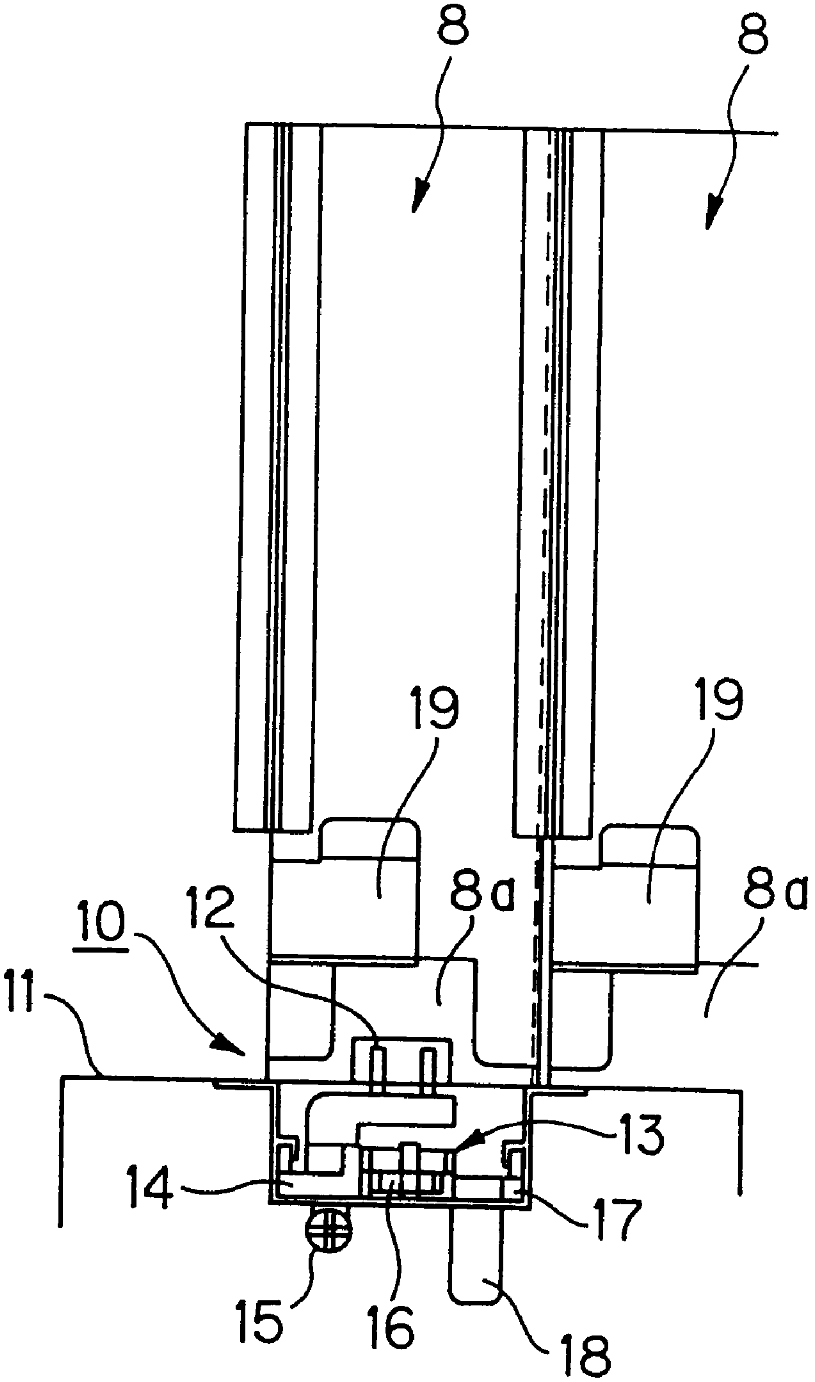
FIG. 4 is, likewise, a partial expanded front view of an article-push-out means.
Figure 5:
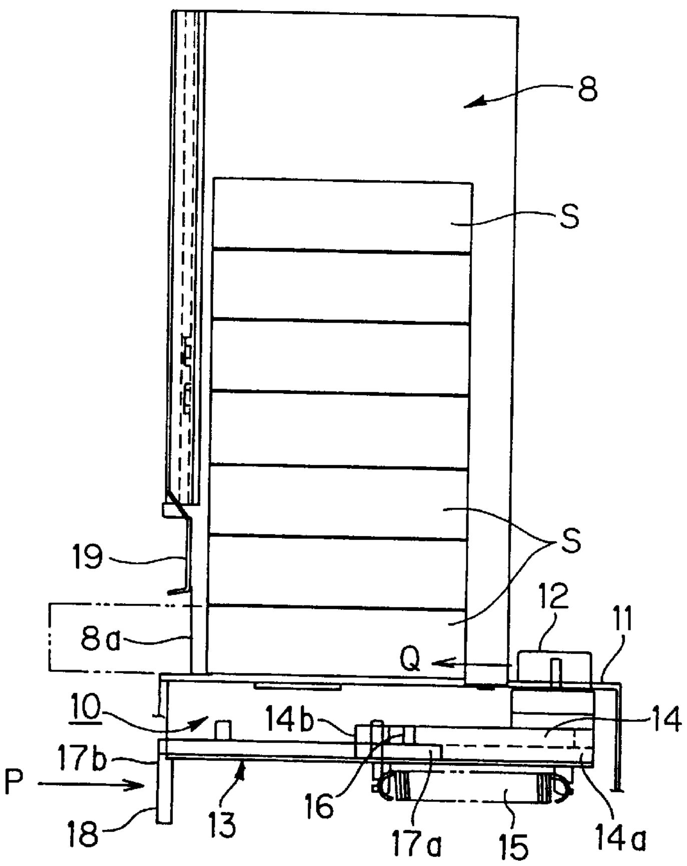
FIG. 5 is, likewise, a partial expanded side view of an article-push-out means.
Figure 6:
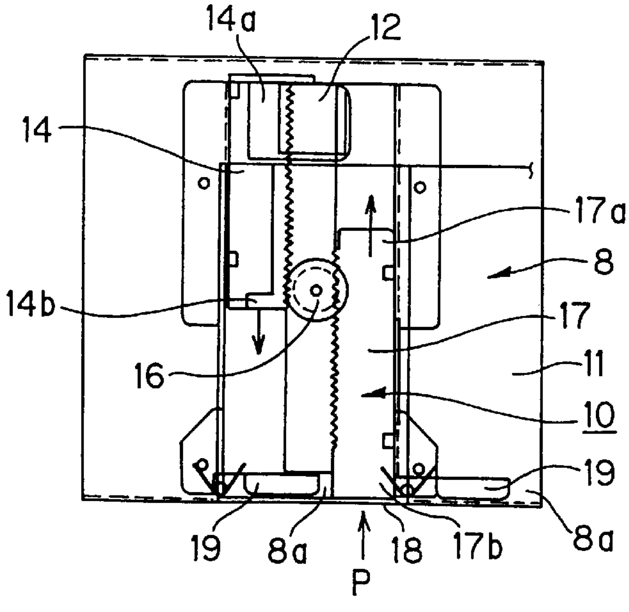
FIG. 6 is, likewise, a partial expanded plan view of an article-push-out means.

At the lower part of each of article-storing columns 8 disposed in the main body 2 of machine 1 and the door 3 thereof, article-push-out means 10 are provided, respectively. As shown in FIG. 4 to FIG. 6, each of these article-push-out means 10 includes a column base 11 on which the lowest of article S stored and piled up in horizontally-laid posture within the article storing column 8 is placed, and a movable pusher (pushing-out member) provided for pushing out the article S at the lowest layer placed on the column base 11 from an open portion 8*a* opened at the lower part of the article-storing column 8 and being able to synchronize with a differential mechanism 13.

The differential mechanism 13 is composed of a first rack gear 14 having the pusher 12 protruded at its rear end 14*a* corresponding to the back face of the article S, a spring member 15 giving energy enabling the first rack gear 14 to move to return to its original waiting position, and a second rack gear 17 disposed and enabled to move relatively and in parallel with the first rack gear 14 by engaging its rear end 17*a* via the differential gears 16 with the front end 14*b* of the first rack gear 14. At the front end portion 17*b* of the second rack gear 17, an actuating plate 18 is provided. The actuating plate 18 corresponds to, in a manner to be able to contact with and separate from it, a pusher (protruding member) 33 of the article-push-out driving means 30 of the article-pick-up means 20 described hereinafter, and is operated by the protruding movement of the pusher 33 in its protruding direction P.

Further, the numeral 19 indicates a restraining panel provided at the open portion 8*a* opened at the lower part of the article-storing column 8. The restraining plate 19 is designed to prevent the jumping out of a second article S placed on the lowest layer of articles piled up in horizontally-laid posture and stored within the article-storing column 8.

That is to say, the article-push-out means 10, by operating the actuating plate 18 provided at the front end 17*b* of the second rack gear 17 toward the protruding direction P of the pusher (protruding member) 33 which constitutes the article-push-out driving means 30 incorporated in the article-pick-up means 20 described below, makes the second rack gear 17 move toward the rear direction (direction of the arrow of the line in FIG. 6), and makes the first rack gear 14, which moves relatively via the differential gears 16 in synchronization with the movement of the second rack gear 17 toward the rear side, move forward (direction of the arrow of the line in FIG. 6) against the force given by the spring member 15. Together with the relative movement of the first rack gear 14 the pusher 12 moves towards the front so that the article S at the lowest layer piled up in horizontally-laid posture in the article-storing column 8 is pushed out, as shown in FIG. 5 with two dots line.

Figure 7:
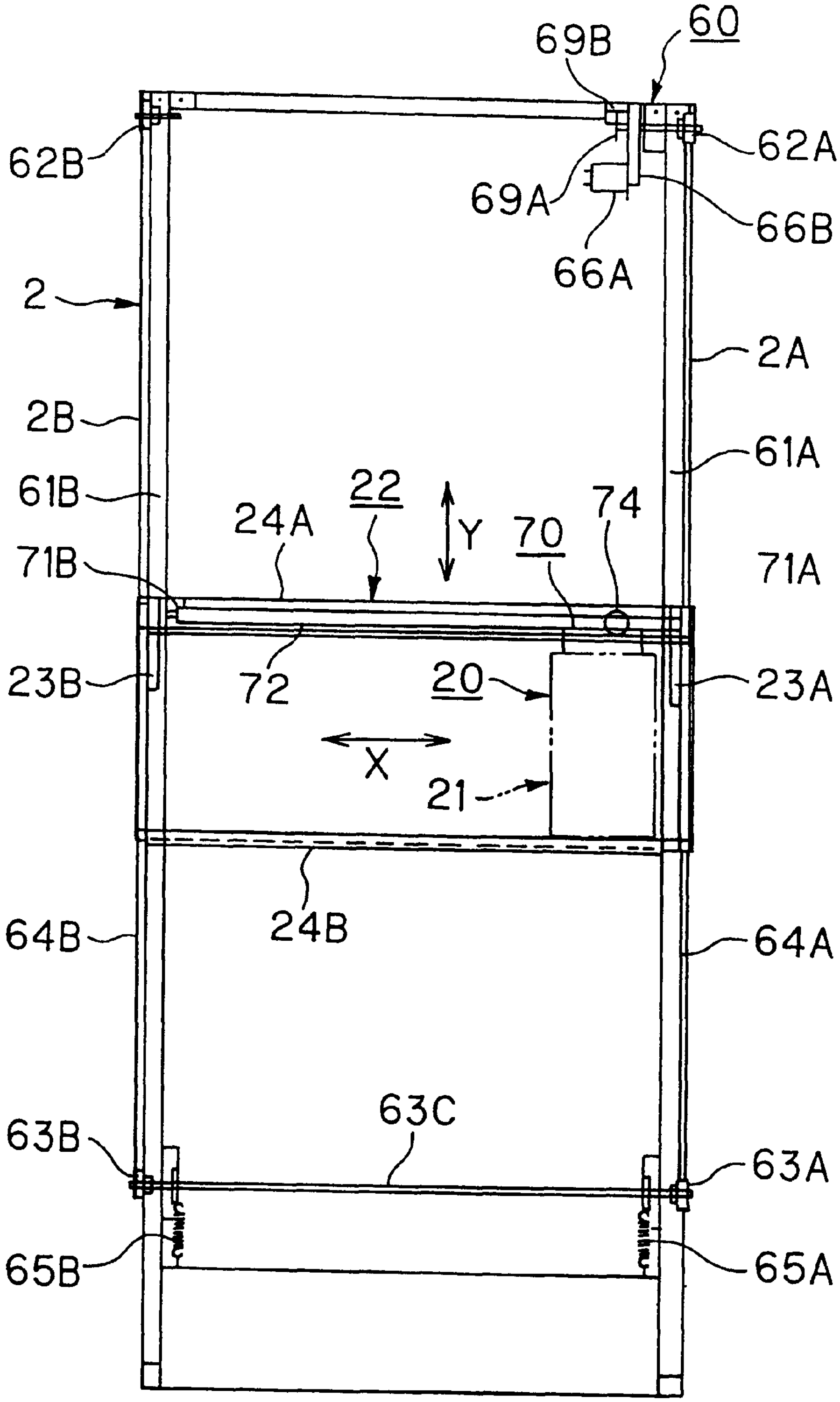
FIG. 7 is, likewise, a partial expanded front view of a transfer means.
Figure 8:
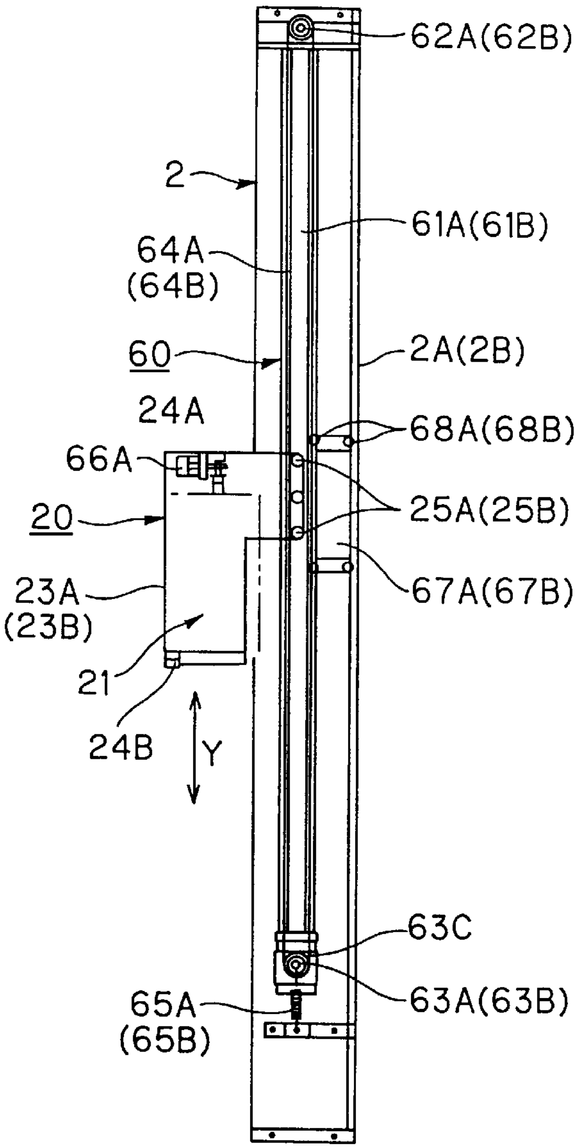
FIG. 8 is, likewise, a partial expanded side view of a transfer means.
Figure 9:
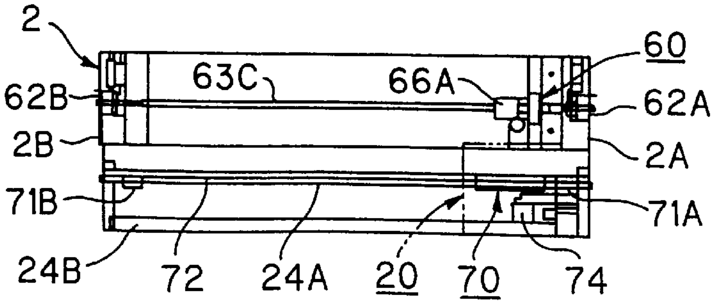
FIG. 9 is, likewise, a partial expanded plan view of a transfer means.

The article-pick-up means 20, as shown in FIG. 3, in a state the door of the machine 1 is closed, is positioned between the main body 2 and the door 3. It comprises, as shown in FIG. 7 to FIG. 9 an article-push-out driving means 30, an article-take-in means 40 and a housing 21 constituting an article-take-in and storing portion in which an article-hold-and-carry means 50 is incorporated, and the housing 21 is hung and supported via a hang-support means 22 by a vertical-transfer mechanism 60 and a horizontal-transfer mechanism 70, a first and a second transfer means, as described herebelow in a manner that it can move vertically and horizontally, in vertical direction Y and in horizontal direction X.

The hang-support means 22 hanging and supporting the housing 21 movable in vertical direction Y and in horizontal direction X comprises a pair of right and left movable brackets 23A and 23B and a pair of upper and lower X-axis guide-shafts 24A and 24B transversely provided between the movable brackets 23A and 23B, and the housing 21 is hung and supported between these X-axis guide-shafts 24A and 24B in a state being able to move in horizontal direction, to right and left, while the pair of right and left movable brackets 23A and 23B are hung and supported by the vertical-transfer mechanism 60, the first transfer means, to be movable in vertical direction Y.

Figure 10:
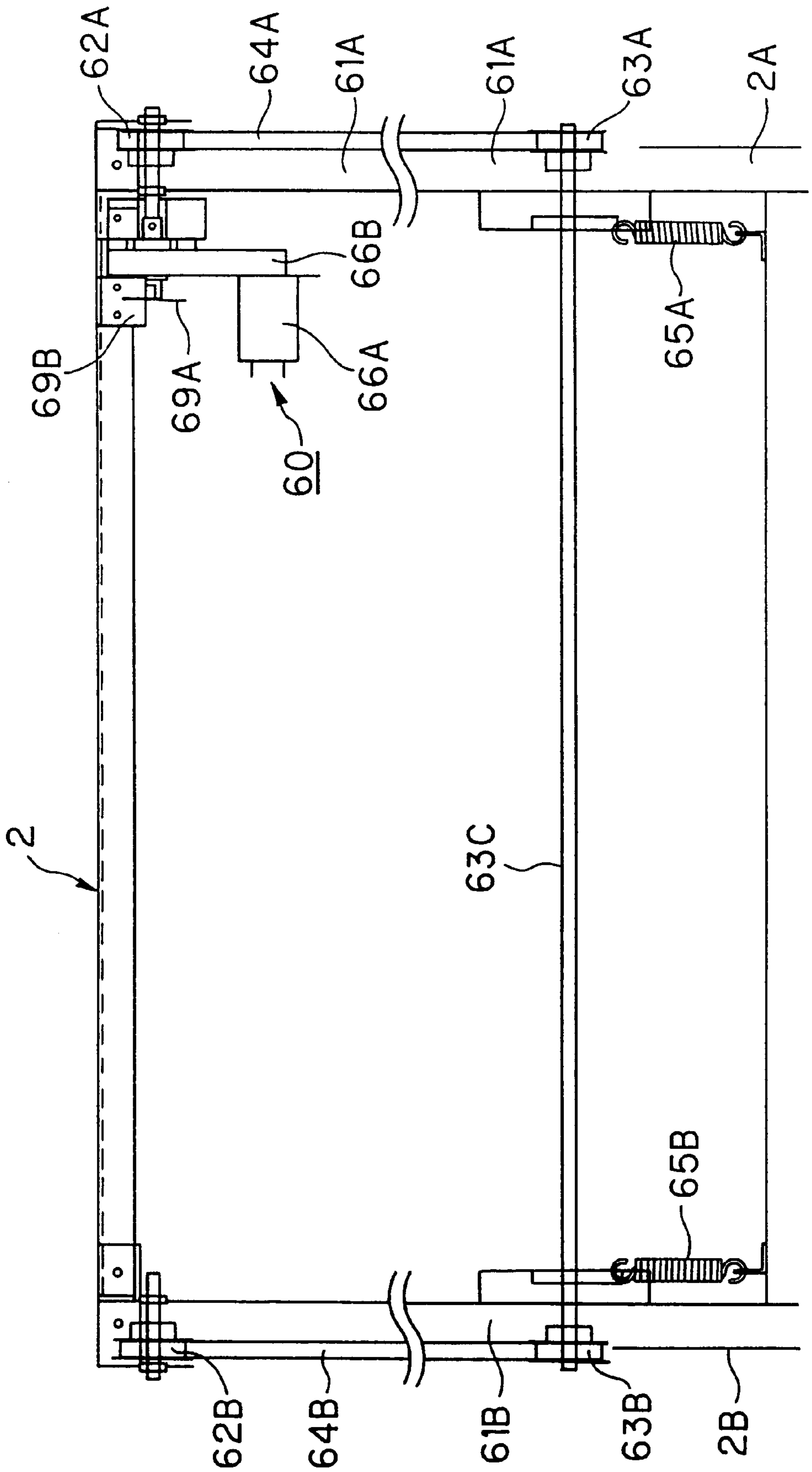
FIG. 10 is, likewise, a partial expanded front view of the first transfer means.
Figure 11:
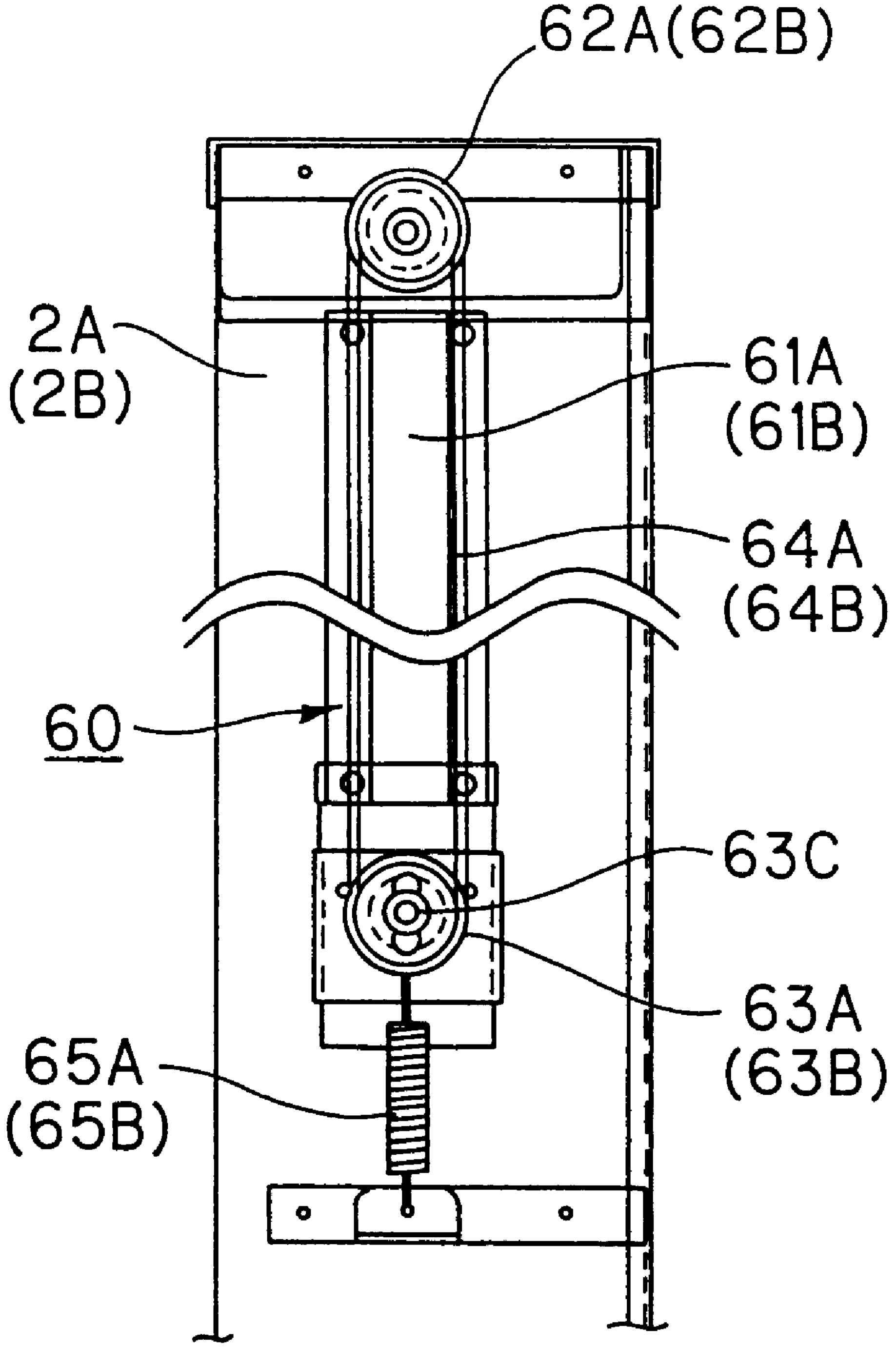
FIG. 11 is, likewise, a partial expanded side view of the first transfer means.
Figure 12:
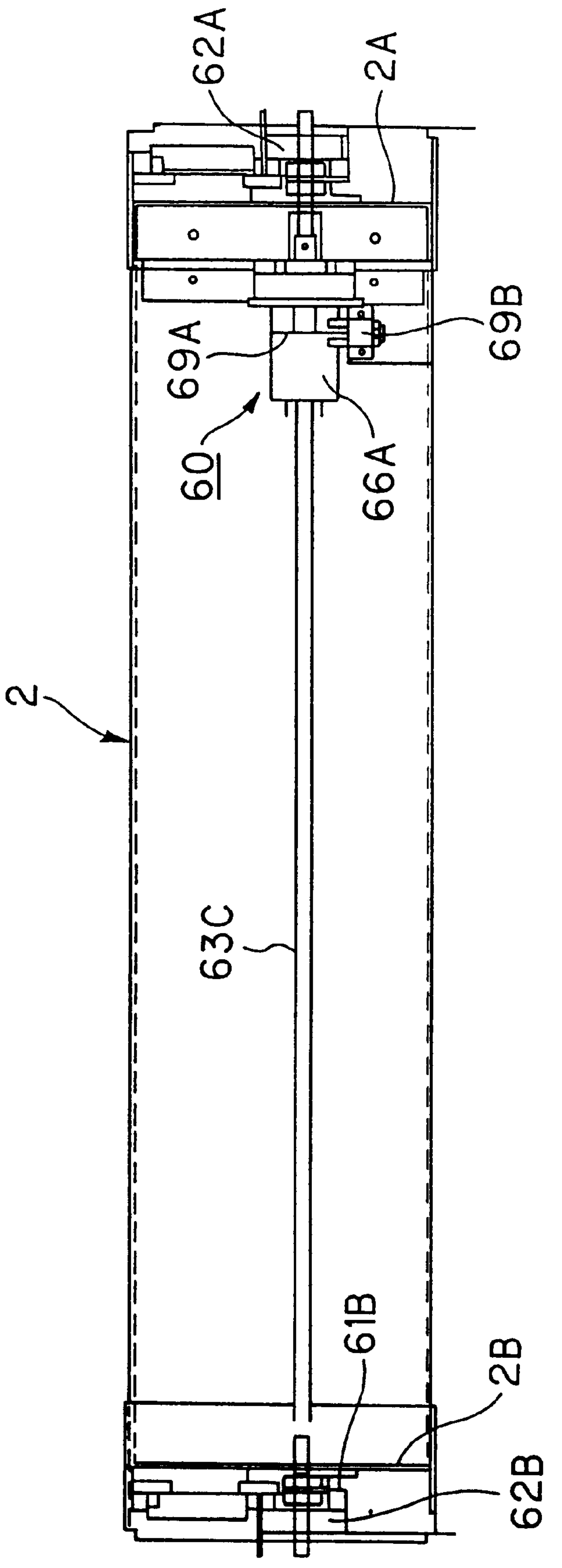
FIG. 12 is, likewise, a partial expanded plan view of the first transfer means.

The vertical-transfer mechanism 60, as shown in details in FIG. 10 to FIG. 12, is composed of Y-axis guide rail 61A and 61B provided on the right and left flames 2A and 2B of the main body 2 of the machine 1, respectively, a pair of right and left pulleys 62A and 62B, and 63A and 63B provided at the upper end and the lower end of the Y-axis guide rails 61A and 61B, a shaft 63C connecting the pulleys 63A and 63B at the lower end side, Y-axis driving belt 64A and 64B given between the upper and lower pulleys 62A and 62B, and 63A and 63B, respectively, and a pair of right and left springs 65A and 65B energizing the shaft 63C downward and give tension to Y-axis driving belt 64A and 64B, and the pulley 62A provided at the upper end of Y axis guide rail 61A is connected with Y-axis driving motor 66A via a speed reducing gear box 66B.

And, to the Y-axis driving belt 64A and 64B, a pair of right and left movable brackets 23A and 23B forming the hang-support means 22 of the article pick-up means 20 are secured, in a state being movable via plural rotatable rollers 25A and 25B which guide the brackets 23A and 23B along Y-axis guide rails 61A and 61B, while, to the Y-axis driving belt 64A and 64B, to the positions corresponding to the hang-support portion of the movable brackets 23A and 23B, balancers 67A and 67B are secured via plural rollers 68A and 68B which rotate to guide them along Y-axis guide rail 61A and 61B. The balancers 67A and 67B take the balance with the article-pick-up means 20 which is hung and supported via the hang-support means 22 by Y-axis driving belts 64A and 64B, and thereby reduce the loading torque imposed on each of the pulleys 62A and 62B, and 63A and 63B so that the movement of the article-pick-up unit 20 become smooth.

That is to say, the vertical-transfer mechanism 60 makes the article-pick-up means 20 move in Y-axis direction by driving one of Y-axis drive belts 64A via pulley 62A by normal and reverse rotation of the Y-axis driving motor 66A and also by driving the other Y-axis drive belt 66B in synchronization therewith. The control for the movement of the article-pick-up means 20 in Y-axis direction is conducted by detecting with a position detective pulse sensor 69A the pulse signal generated by a position detective pulse generator 69A provided on the rotating shaft of the Y-axis driving motor 66A.

Figure 13:
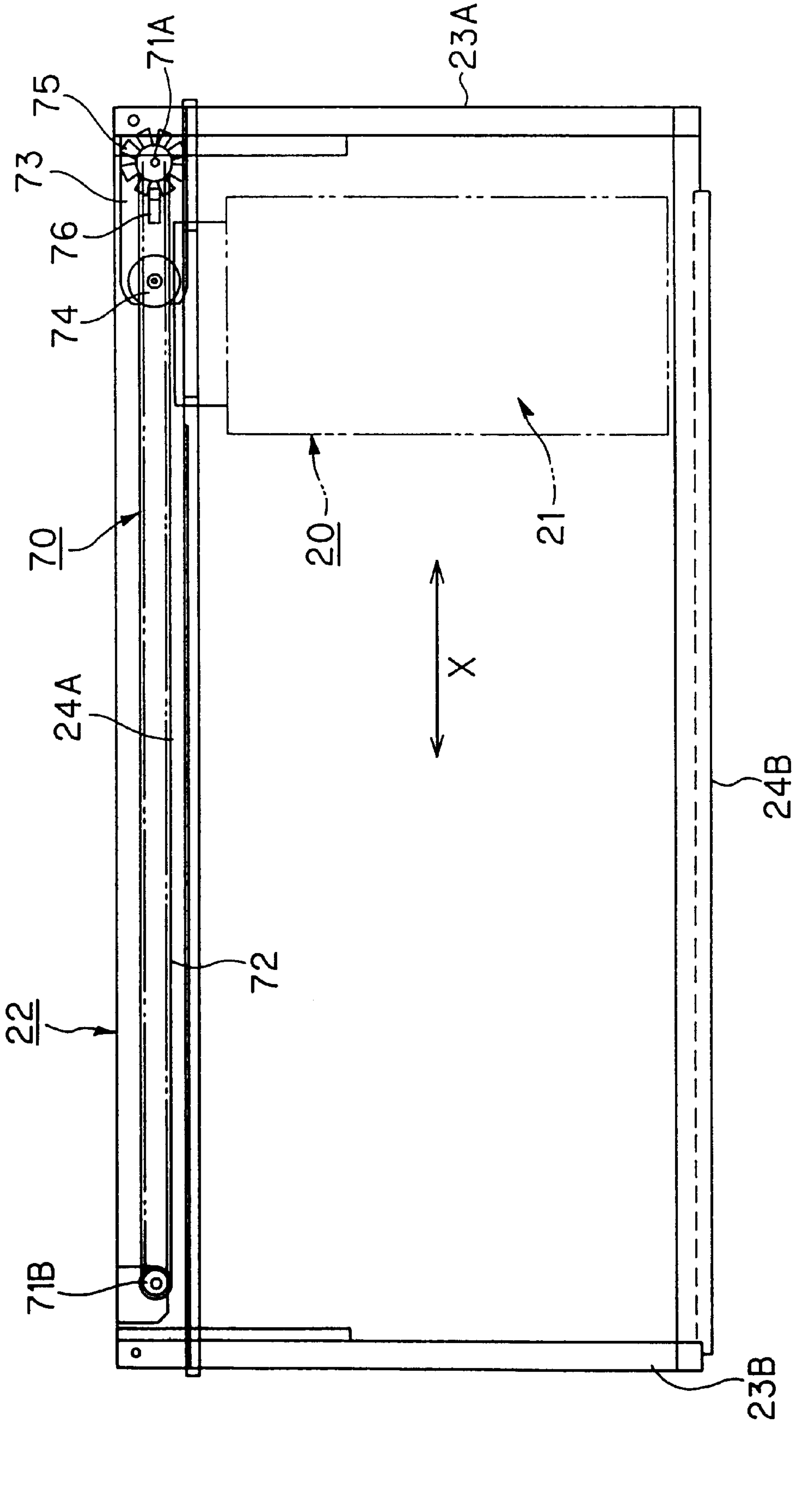
FIG. 13 is, likewise, a partial expanded front view of the second transfer means.
Figure 14:
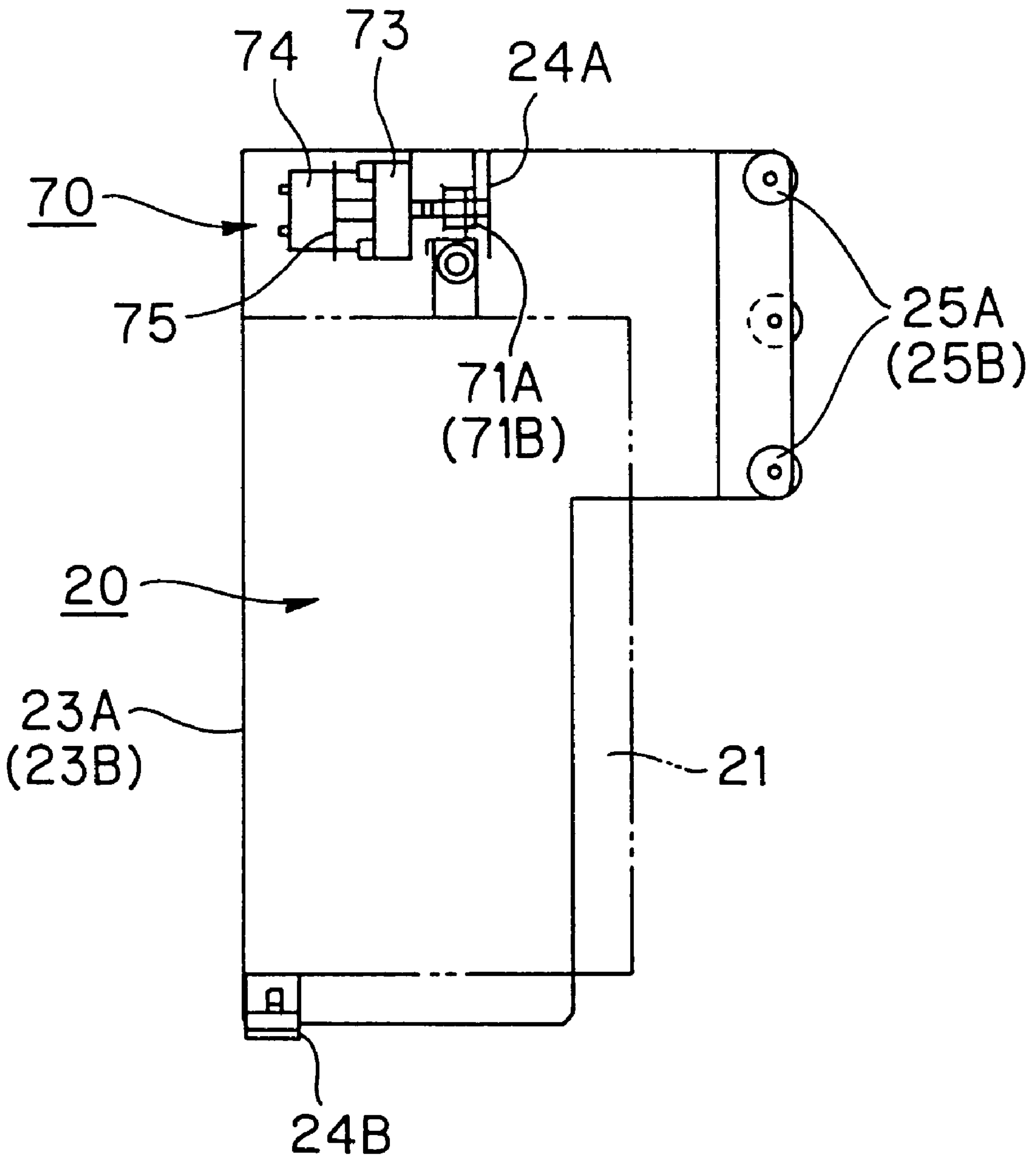
FIG. 14 is, likewise, a partial expanded side view of the second transfer means.
Figure 15:
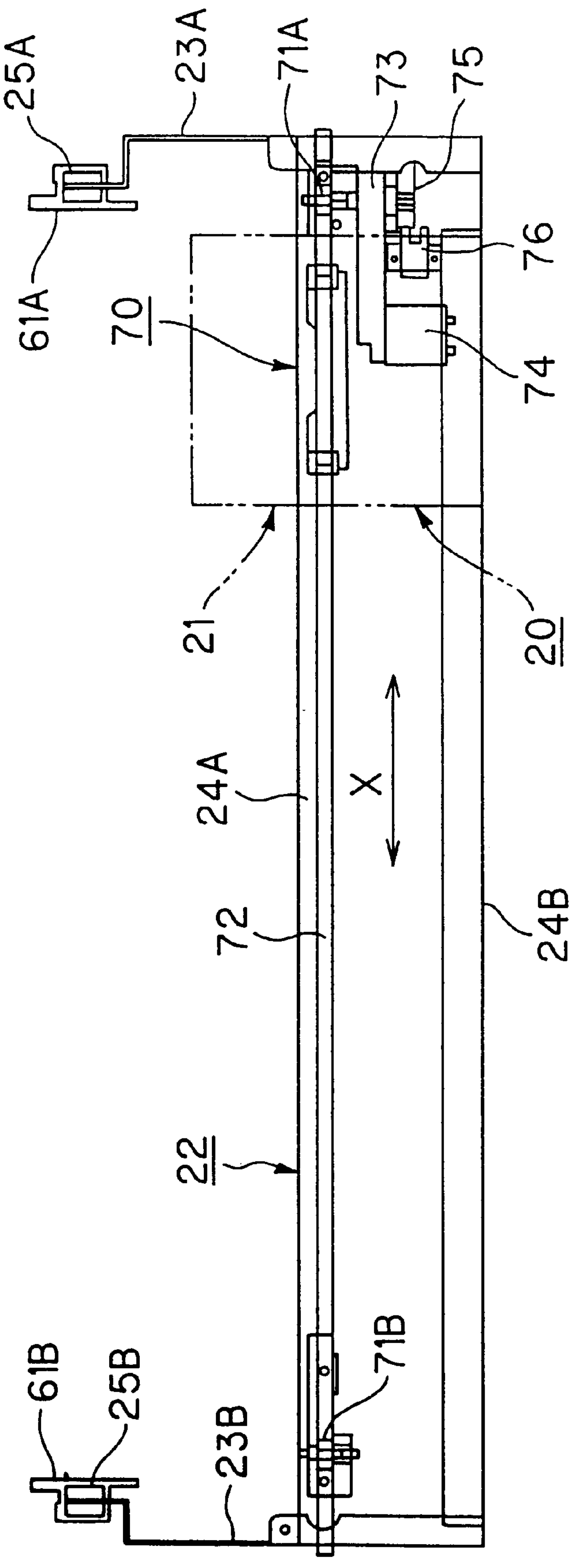
FIG. 15 is, likewise, a partial expanded plan view of the second transfer means.

The horizontal-transfer mechanism 70, the second transfer unit, as shown in details in FIG. 13 to FIG. 15, comprises a pair of right and left pulleys 71A and 71B provided on the movable brackets 23A and 23B forming the hang-support means 22, a X-axis driving belt 72 given between the pulleys 71A and 71B, and a X-axis driving motor 74 which drives via a speed reducing gear box 73 one of the pulleys 71A on which the X-axis driving belt 72 is given. The X-axis driving belt 72 is connected with the housing 21 of the article-pick-up means 20, which is supported in a state being movable in horizontal direction, between a pair of right and left X-axis guide shafts 24A and 24B laid between the movable brackets 23A and 23B of the hang-support means 22. The housing 21 makes the article-pick-up means 20 move in horizontal direction, to right and left, by the driving X-axis drive belt 72 via the pulley 71A with normal and reverse rotation of the X-axis driving motor 66A.

In this case, the control for the movement of the article-pick-up means 20 in horizontal X direction is conducted by detecting with a position detective pulse sensor 76 the pulse signal generated by a position detective pulse generator 75 provided on the rotating shaft of the Y-axis driving motor 74.

Figure 16:
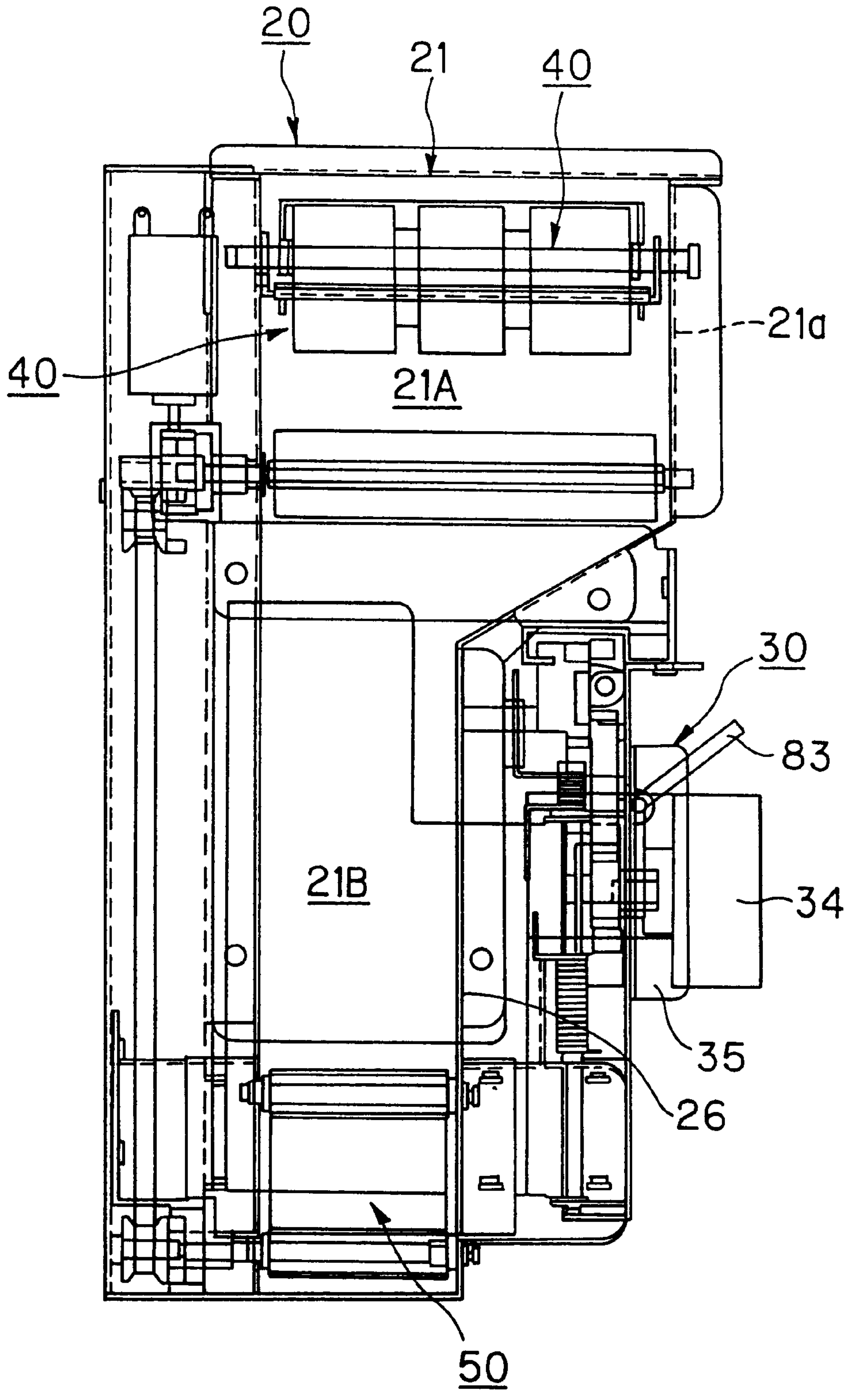
FIG. 16 is, likewise, an partial expanded front view of an article-pick-up means.
Figure 17:
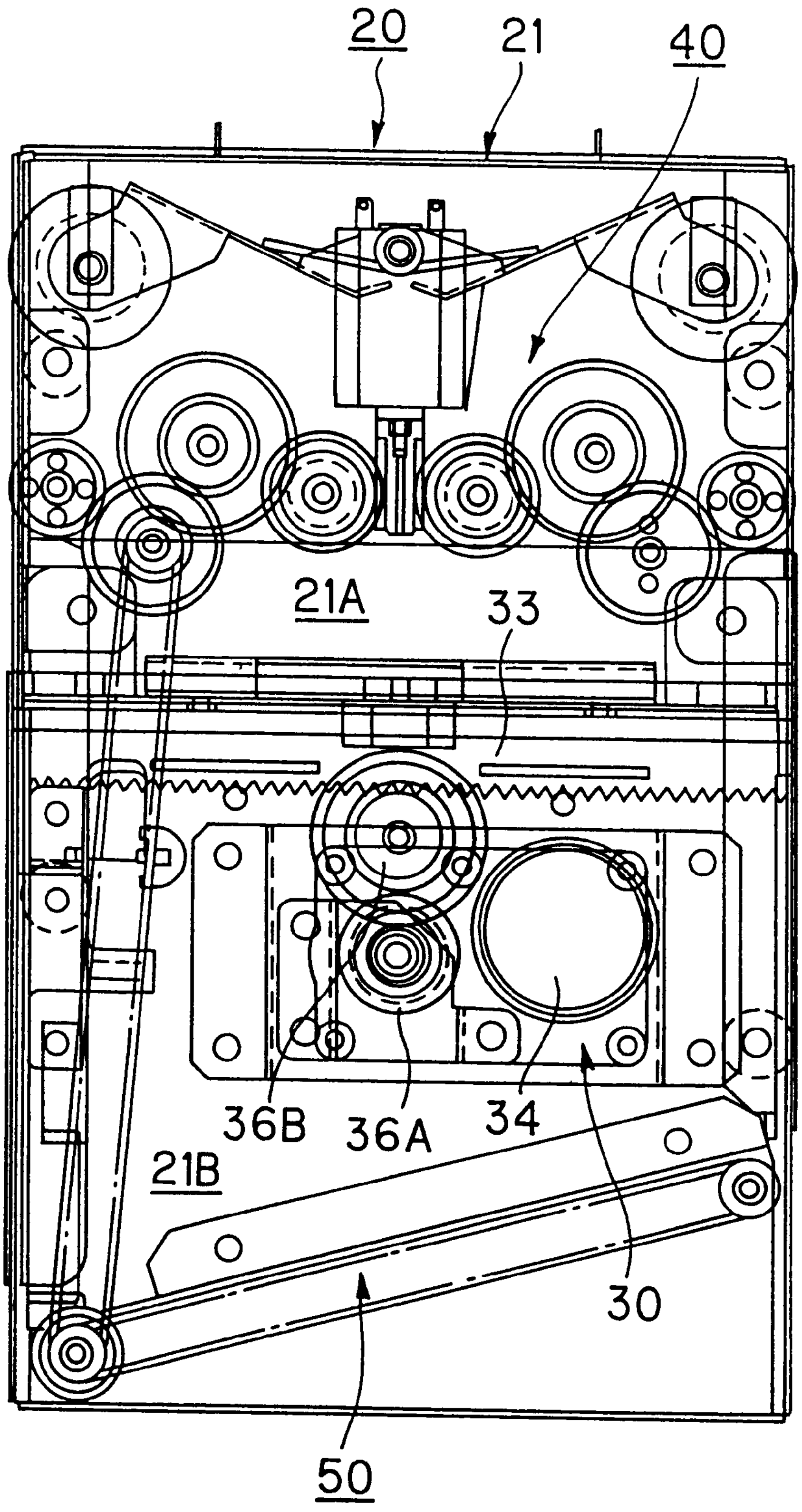
FIG. 17 is, likewise, an partial expanded side view of an article-pick-up means.
Figure 18:
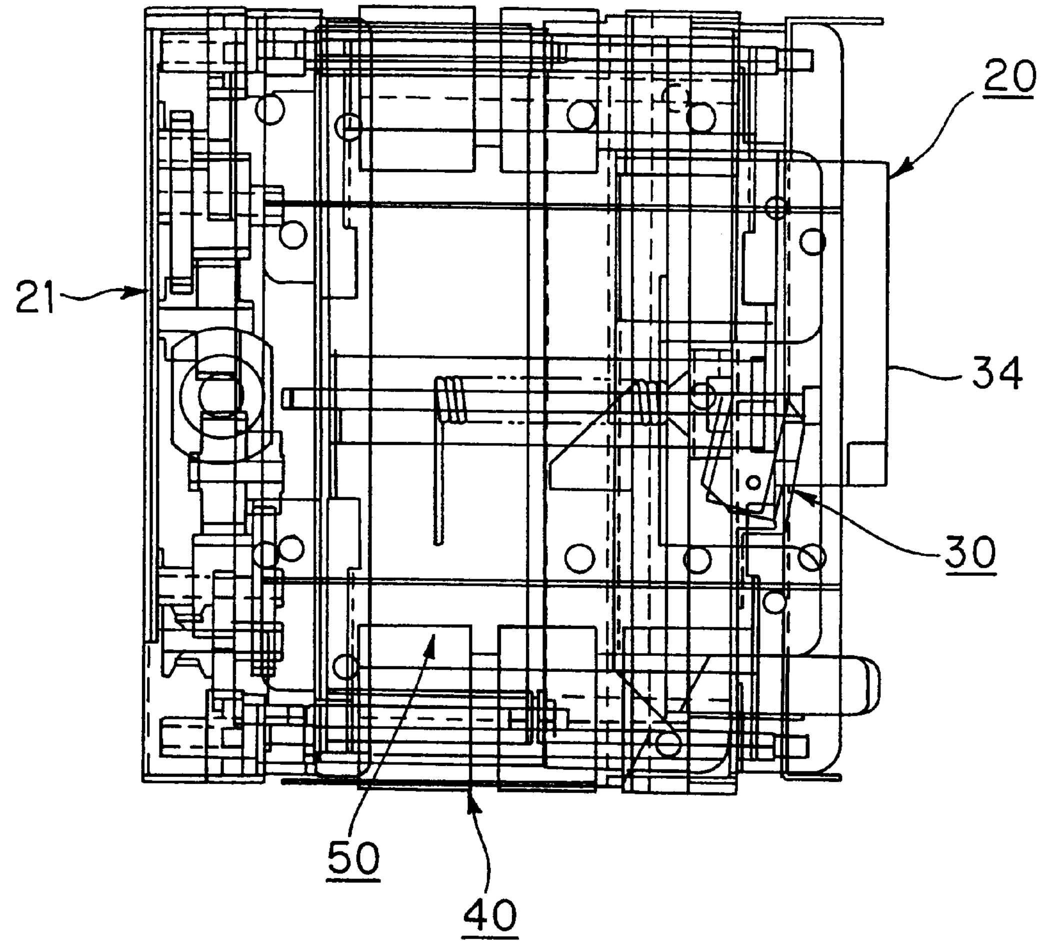
FIG. 18 is, likewise, an partial expanded plan view of an article pick-up means.

The housing 21 of the article-pick-up means 20, as shown in FIG. 16 to FIG. 18, has such shape that almost the lower half of its one side's outer side surface 21 is formed to have a tapered, reduced shape, and the inside comprises an upper half take-in-and-storing portion 21A being horizontally long and wide and capable of taking in an article (cigarettes) in a horizontally-laid posture, and an lower half storing portion 21B being vertically long and narrow and able to guide an article S for it to be reversed into a horizontally wide and standing posture and taken into it by the free drop of the article S.

Figure 19:
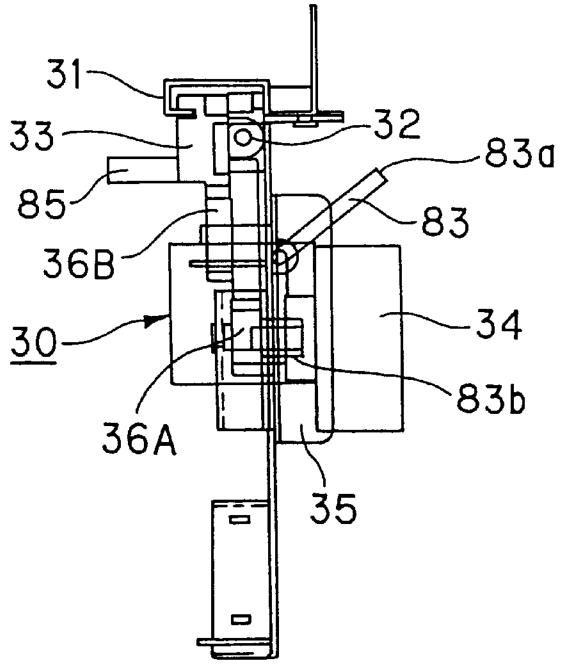
FIG. 19 is, likewise, an partial expanded front view of an article push-out drive means in an article-pick-up means.
Figure 20:
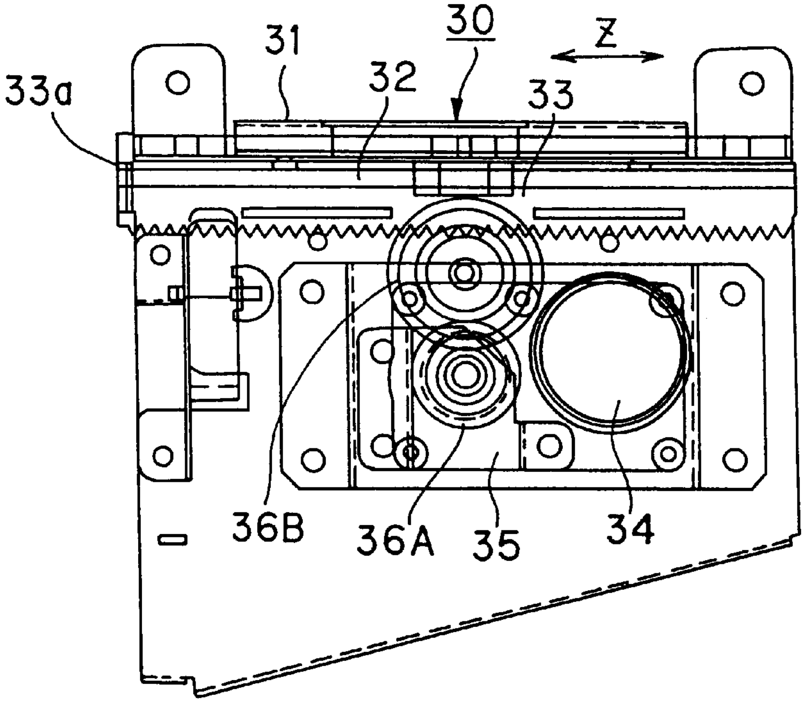
FIG. 20 is, likewise, an partial expanded side view of an article-push-out drive means in an article-pick-up means.
Figure 21:
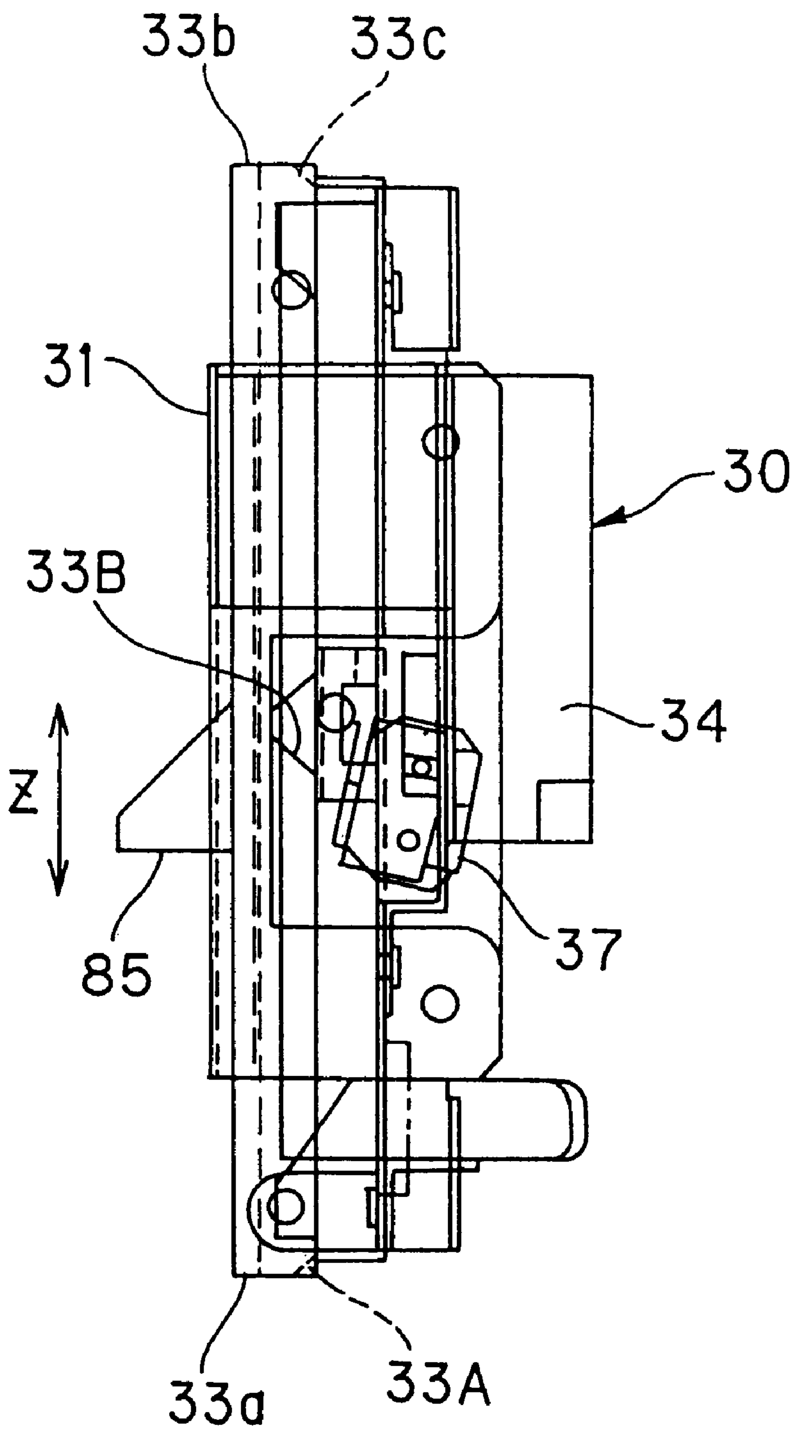
FIG. 21 is, likewise, an partial expanded plan view of an article-push-out drive means in an article-pick-up means.

On the reduced, concaved portion 26 on the one side's outer surface 21*a* of the housing 21, the article-push-out driving means 30 is mounted, which includes, as shown in details in FIG. 19 to FIG. 21, a pusher (protruding member) 33 in a shape of rack gear which is combined with and held by a first guide 31 and a second guide 32 and enabled to move in horizontal, front and rear direction. The pusher 33 is engaged with gear group 36A and 36B which operate synchronously via the speed decreasing gear box 35 with the output pivot of the Z-axis driving motor 34, and, when the door of the machine 1 is shut, is capable of appearing alternatively towards both sides of the main body 2 and the door 3 by the normal and reverse rotation of the Z-axis driving motor 34.

Namely, the article-pick-up means 20 is designed to have the reduced, concaved portion 26 formed by reducing the outer surface 21*a* of one side of the housing 21 into the tapered and reduced shape and to use the reduced, concaved portion 26 as the space for the article-push-out driving means 30 is installed, so that a smaller article-pick-up unit 20 is obtained and the article S is stored and held in stable posture in the lower half storing portion 21B corresponding to the reduced, concaved portion 26.

Also, the front end 33*a* or the rear end 33*b* of the pusher 33, at a position corresponding to each of the article-storing columns 8 arranged in the main body 2 and door 3 to which the article-pick-up means 20 is moved by the transfer control described hereafter, corresponds, with capability of contacting with and separating from it, to the actuating plate 18 which is provided on the second rack gear 17 of the differential mechanism 13 driving the pusher (pushing-out member) 12 of the article-push-out means 10 of the article-storing columns 8, and the differential mechanism 13 is started by this sticking-out movement of the pusher 12.

In addition, on the upper part of the pusher 33, a first positioning groove 33A, a second positioning groove 33B and a third positioning groove 33C are provided in a front and rear direction sequentially with a predetermined interval, and positioning switches 37 are disposed so as to correspond to each of positioning grooves 33A, 33B and 33C. The positioning switch 37 detects a position of each positioning groove 33A, 33B and 33C and controls the drive of the Z-axis driving motor 34 to make the pusher 33 stop at the front protruding position, the intermediate waiting position, or the rear protruding position.

Figure 22:
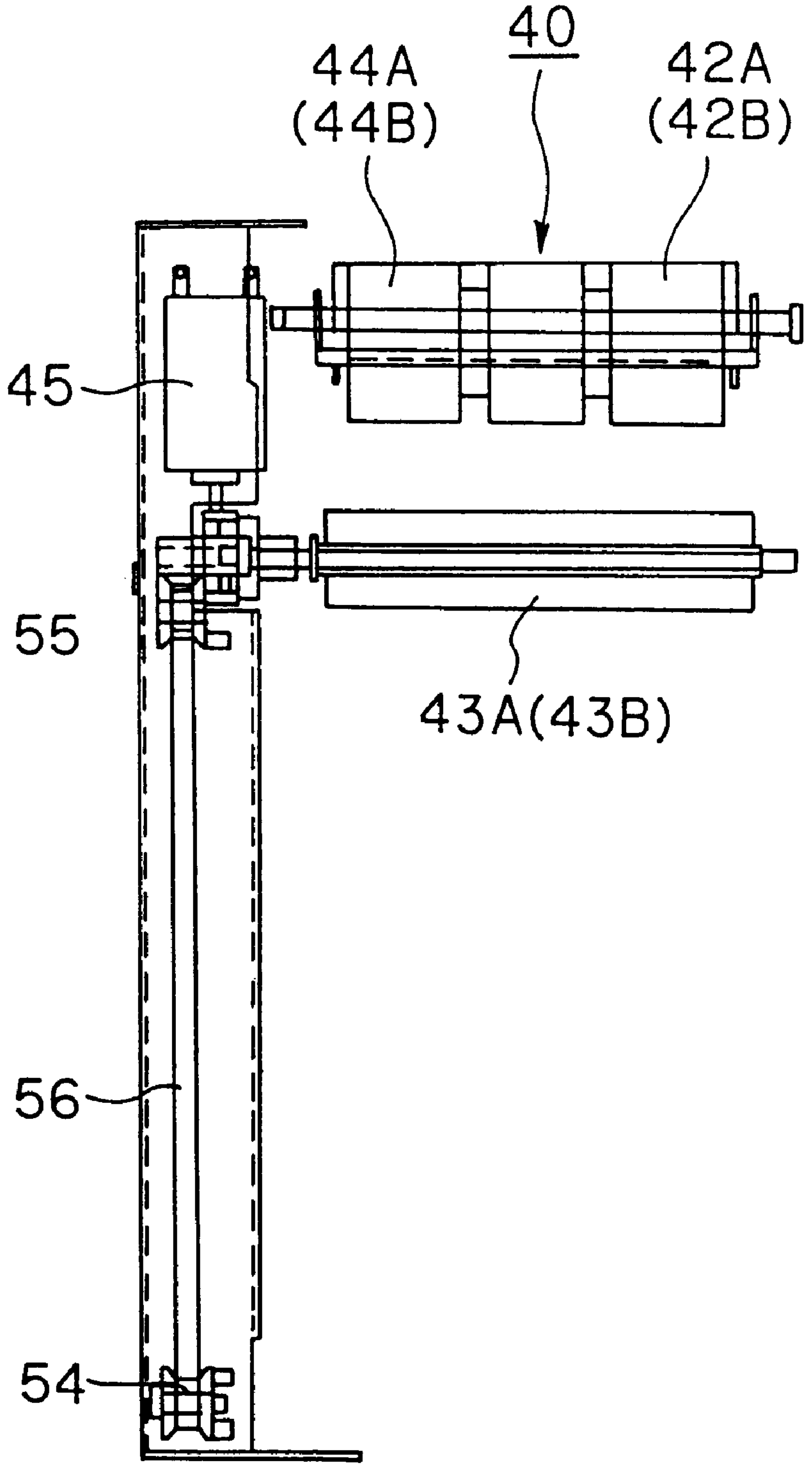
FIG. 22 is, likewise, an partial expanded front view of an article-take-in means in an article-pick-up means.
Figure 23:
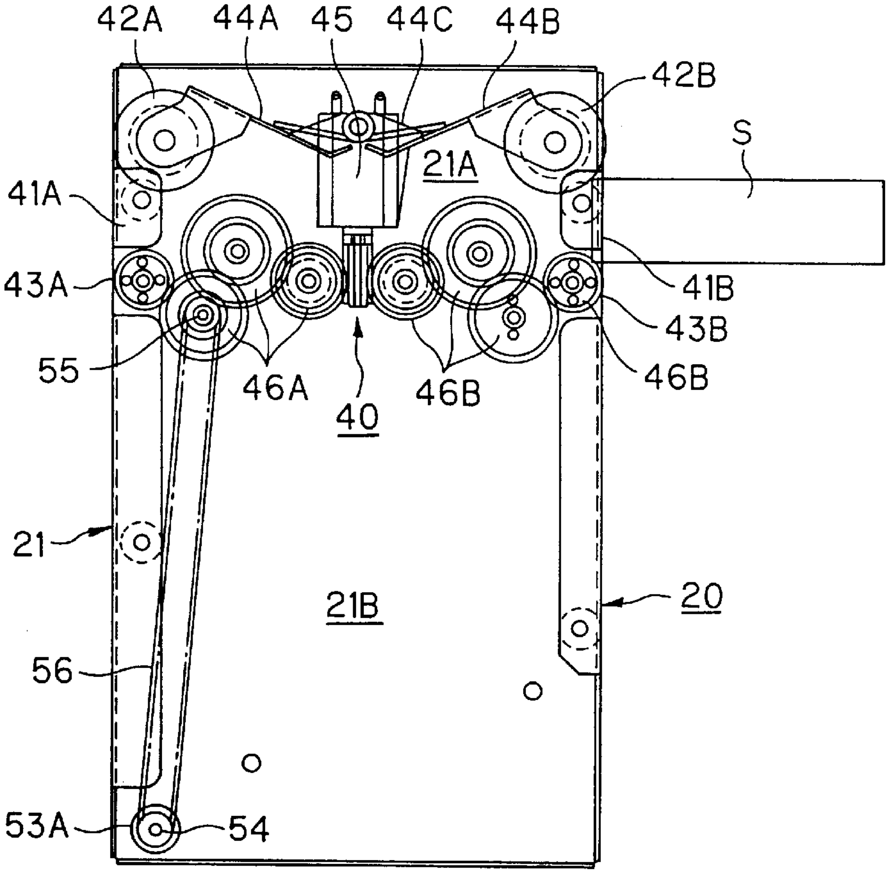
FIG. 23 is, likewise, an partial expanded side view of an article-take-in means in an article-pick-up means.
Figure 24:
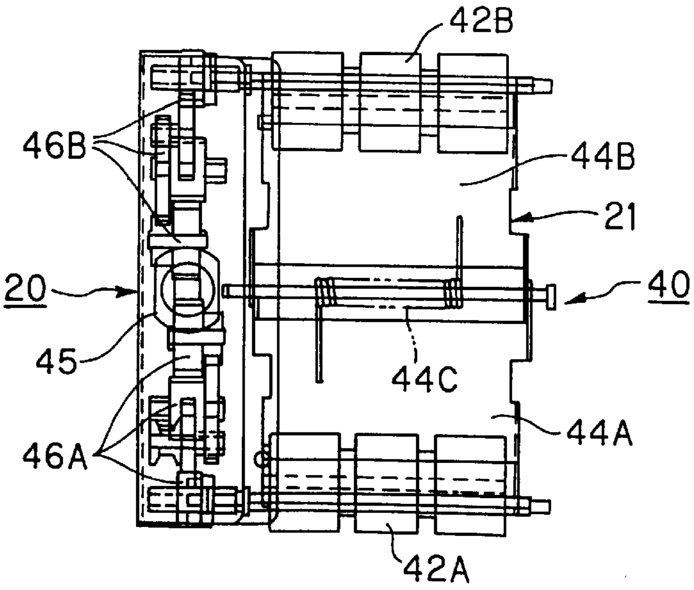
FIG. 24 is, likewise, an partial expanded plan view of an article-take-in means in an article-pick-up means.

As shown in details in FIG. 22 to FIG. 24, in the upper half take-in-and-storing portion 21A which is horizontally long and wide of the housing 21*a* of the article-pick-up means 20, an article-take-in means 40 is mounted.

The article-take-in means 40 comprises upper take-in rollers 42A and 42B disposed, with symmetrical relation of the front and the rear, at the front article-take-in aperture 41A side corresponding to the door 3 of the machine 1 and the rear article-take-in aperture 41B side corresponding to the main body 2, which are opened at the front and the rear end of the housing 21, respectively, and lower take-in rollers 43A and 43B which are disposed at the position under and corresponding to the upper take-in rollers 42A and 42B. Each of the upper take-in rollers 42A and 42B are pivotally supported by supporting members 44A and 44B which are enabled to move upward and downward by a spring 44C, while each of the lower take-in rollers 43A and 43B are driven to rotate, via plural gear group 46A and 46B being engaged with the output pivot of the article-take-in drive motor 45, towards the direction Q of article-take-in operation of the article S, and the article-take-in apertures 41A and 41B correspond to the open portion 8A of the article-storing columns 8.

Figure 25:
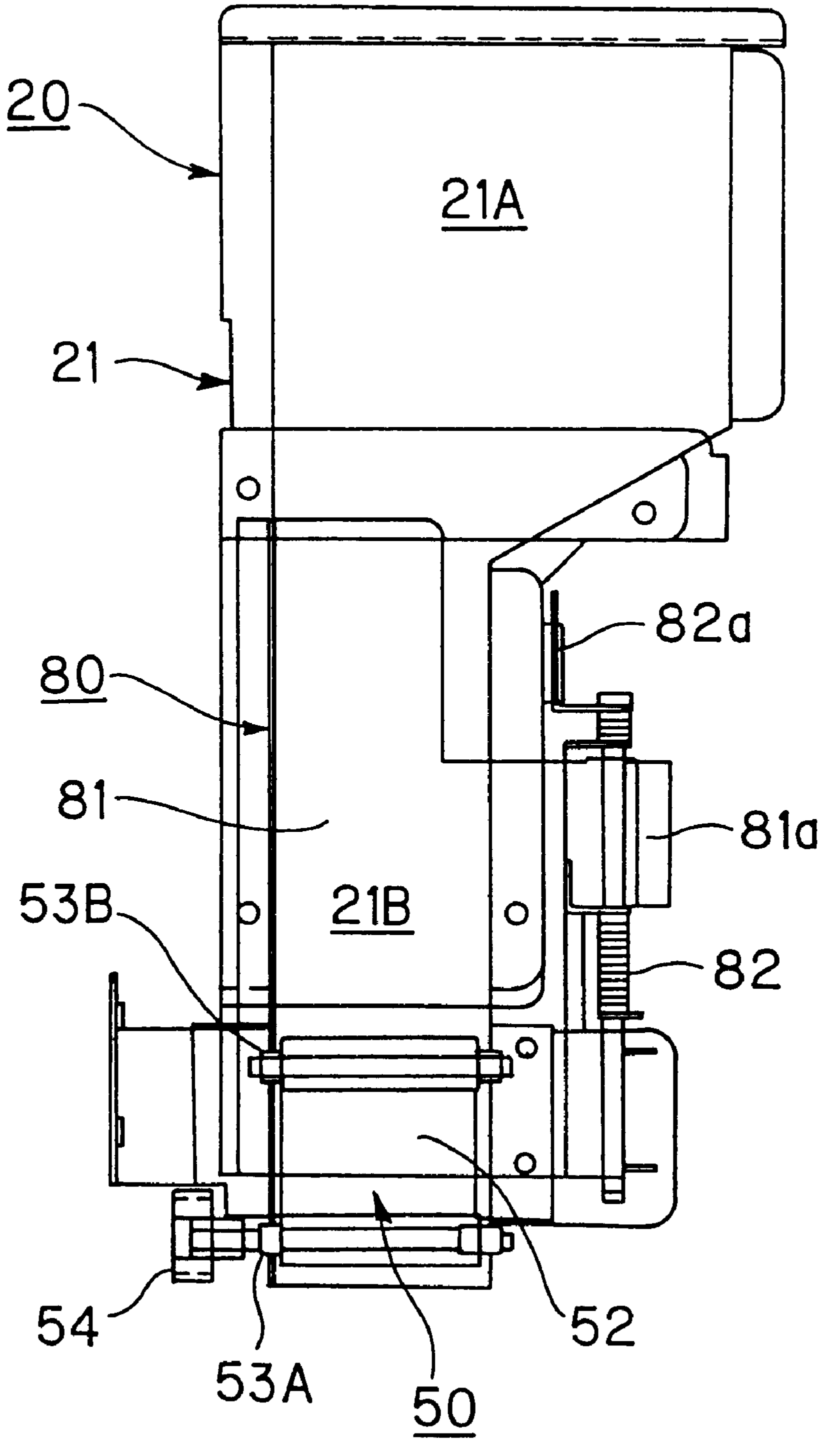
FIG. 25 is, likewise, an partial expanded front view of an article-hold-and-carry means in an article pick-up means.
Figure 26:
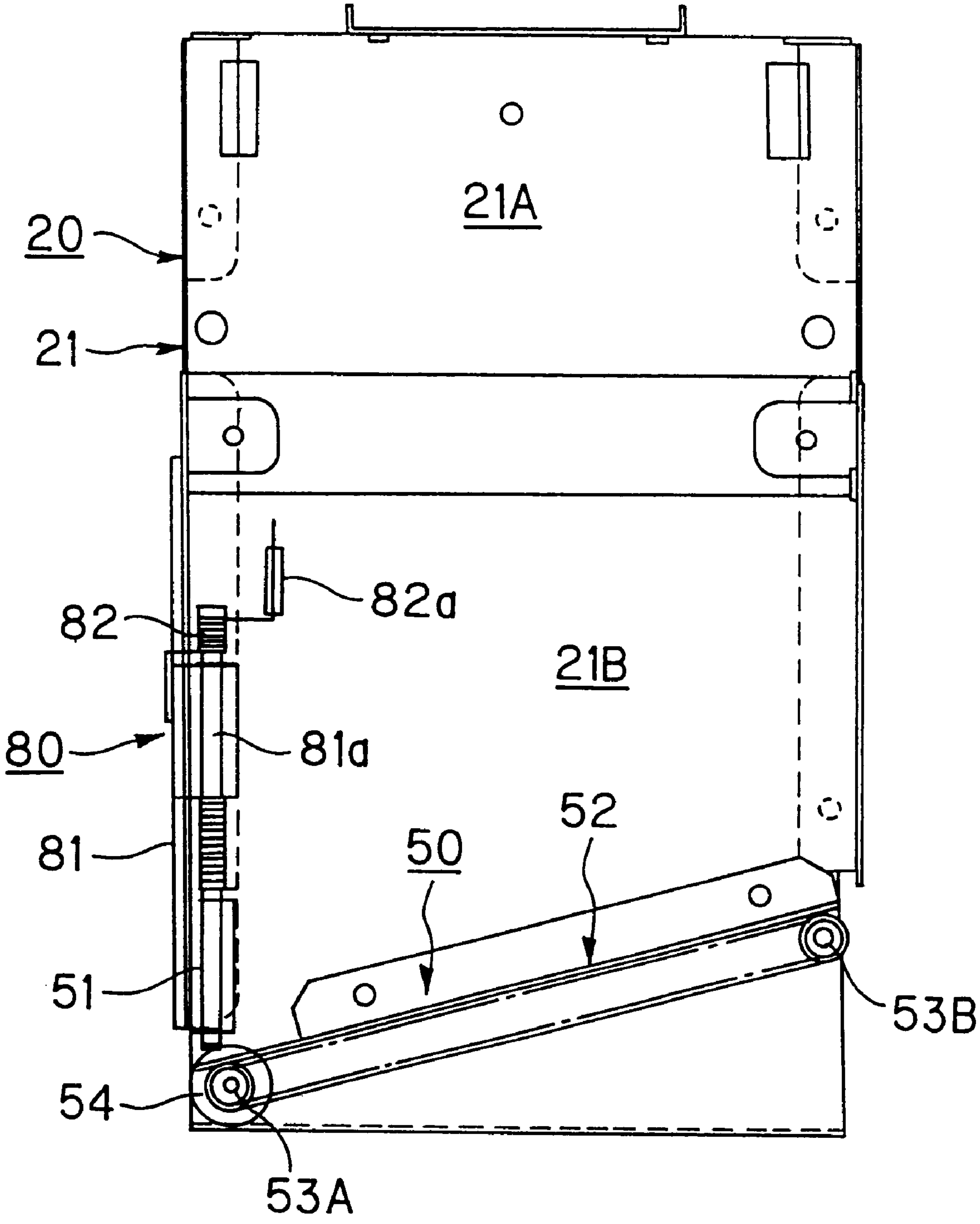
FIG. 26 is, likewise, an partial expanded side view of an article-hold-and-carry means in an article-pick-up means.
Figure 27:
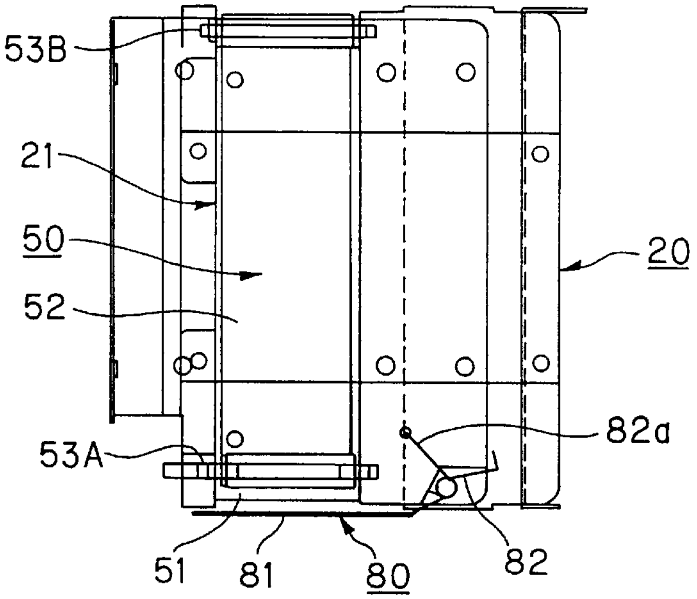
FIG. 27 is, likewise, an partial expanded plan view of an article-holding-and-carry means in an article-pick-up means.

That is to say, the article-take-in means 40, as described above, holds an article S, which is at the lowest position in the article-storing columns 8 in the main body 2 or the door 3 and pushed out by the article-push-out means 10, between the upper and the lower take-in rollers 42A and 43A or 42B and 43B via the front or the rear article-take-in aperture 41A or 41B, and takes the article S, in a posture of horizontally-laid, into the upper half take-in-and-storing portion 21A which is horizontally long and wide by the drive of the lower take-in rollers 43A or 43B driven by the article-take-in motor 45, and makes the posture of the article S which has been taken into the upper half take-in-and-storing portion 21A reversed to a horizontally long and standing posture and fallen into the bottom of the inside of the housing 21 by the guide of the lower half-storing portion 21B which is vertically long and narrow As shown in details in FIG. 25 to FIG. 27, on the inner bottom of the housing 21 an article hold-and-carry means 50 is mounted. The article-hold-and-carry means 50 includes a carry-out drive belt 52 which is tapered downward to the article-carry-out aperture 51 opened at the lower part of the front of the housing 21. The carry-out drive belt 52 is given between a pair of front and rear pulleys 53A and 53B, and the front pulley 53A as shown in FIG. 22 and FIG. 23, is driven to rotate via a pair of pulleys 54 and 55 by and synchronously with the drive-belt 56 put on a gear 46A among plural gear groups 46A which drives to rotate the lower roller 43A at the front side of the article-take-in means 40.

That is to say, the drive for the article-hold-and-carry unit 50 co-uses the article take-in drive motor 45 which drives the article-take-in means 40 and is drive-controlled in cooperation with the take-in operation of the article-take-in means 40 and is stopped upon the completion of the take-in operation of the article-take-in means 40. The article S taken into the housing 21 is stored and held temporally on the carry-out drive belt 52.

Figure 28:
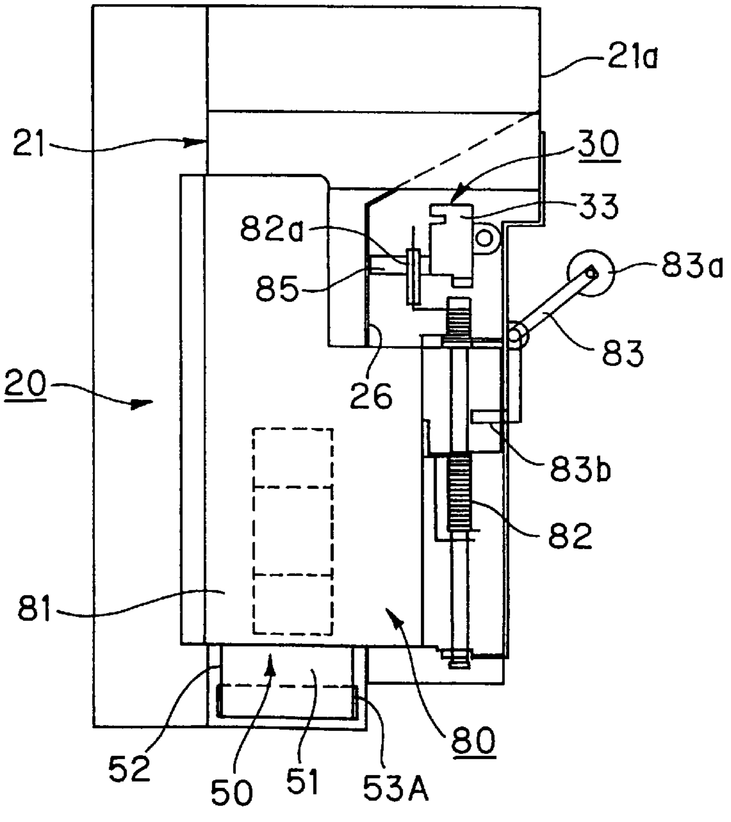
FIG. 28 is, likewise, an partial expanded front view of an article-jumping-out prevention means.
Figure 29:
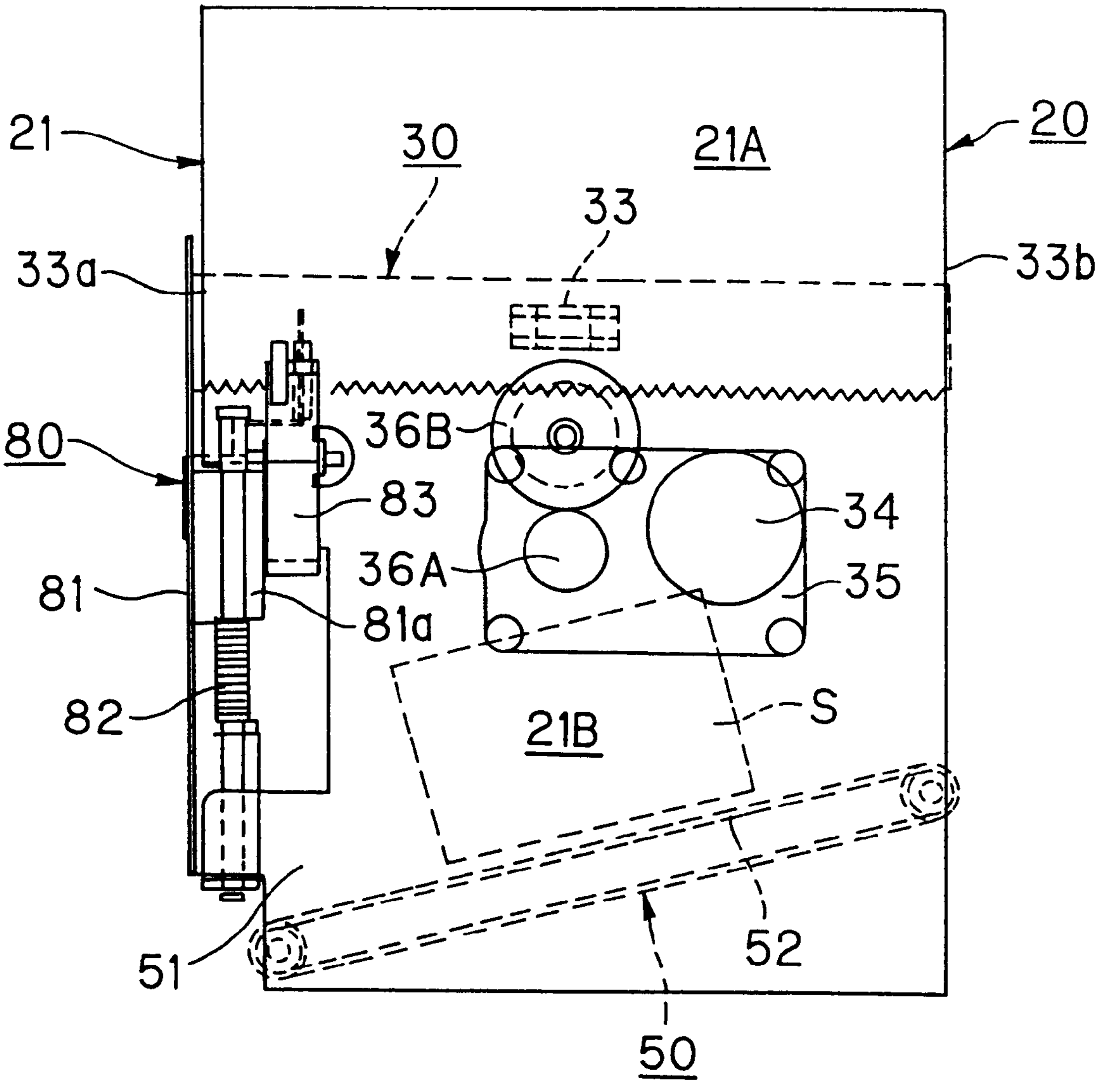
FIG. 29 is, likewise, an partial expanded side view of an article-jumping-out prevention means.
Figure 30:
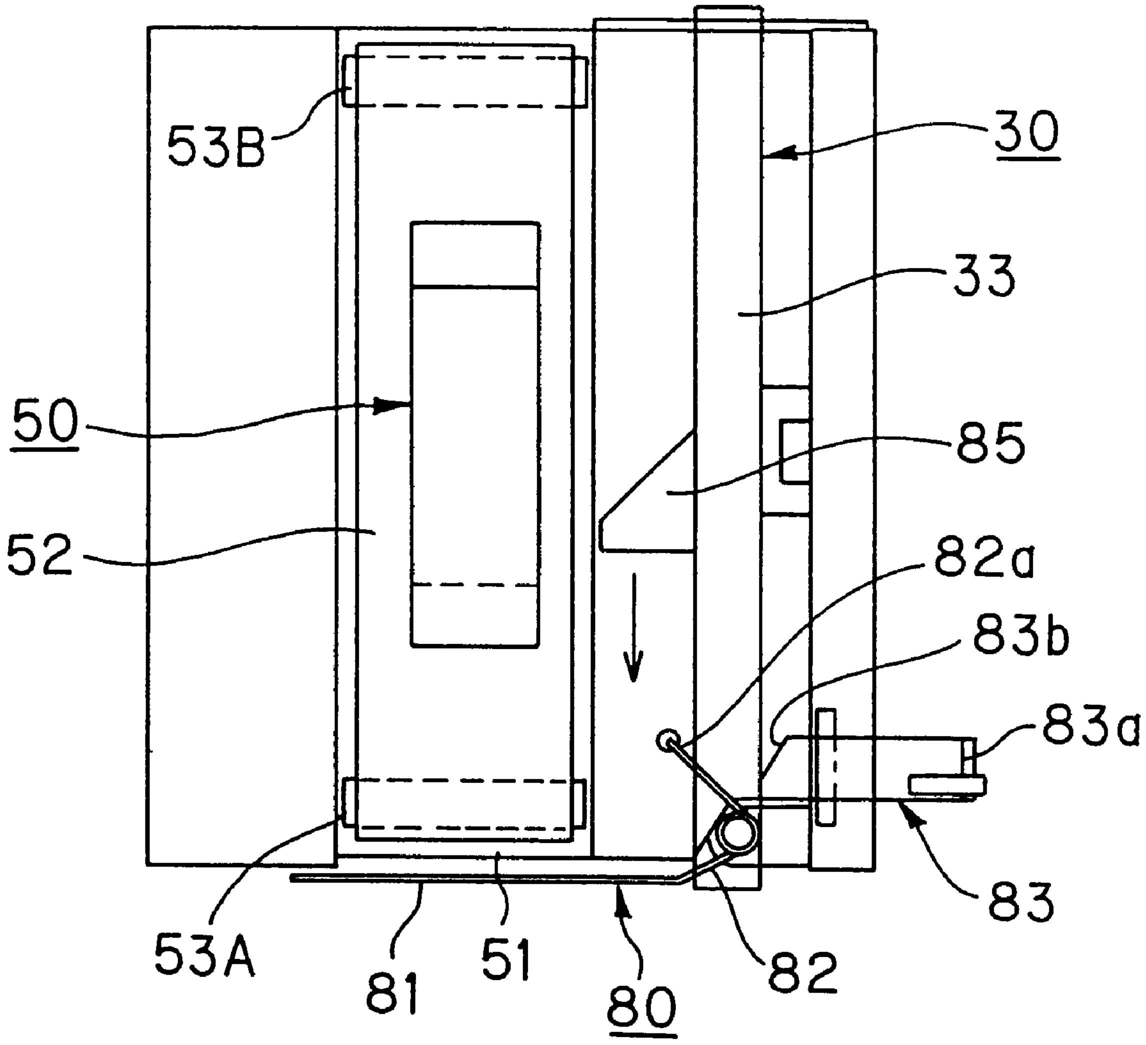
FIG. 30 is, likewise, an partial expanded plan view of an article-jumping-out prevention means.

As shown in details in FIG. 28 to FIG. 30, the article-carry-out aperture 51 opened at the front lower part of the housing 21 is provided with an article-jump-out restraining plate 80 which prevents the jumping-out of the goods S temporally taken into the housing 21. The article-jump-out restraining means 80 comprises a restraining door 81 which is pivotally supported in a manner to be able to open the article-carry-out aperture 81 of the housing 21 from its outside, a spring 82 always giving an energy toward the direction to close the restraining door 81, a swinging stopper 83 engaged in a manner being able to contact and separate from it, with the end of the pivotally supported end 81*a* of the restraining door 81 which is energized by the spring 82 and locked, and a plate 84 to release the locked state by the stopper 81 of the restraining door 81.

Figure 31:
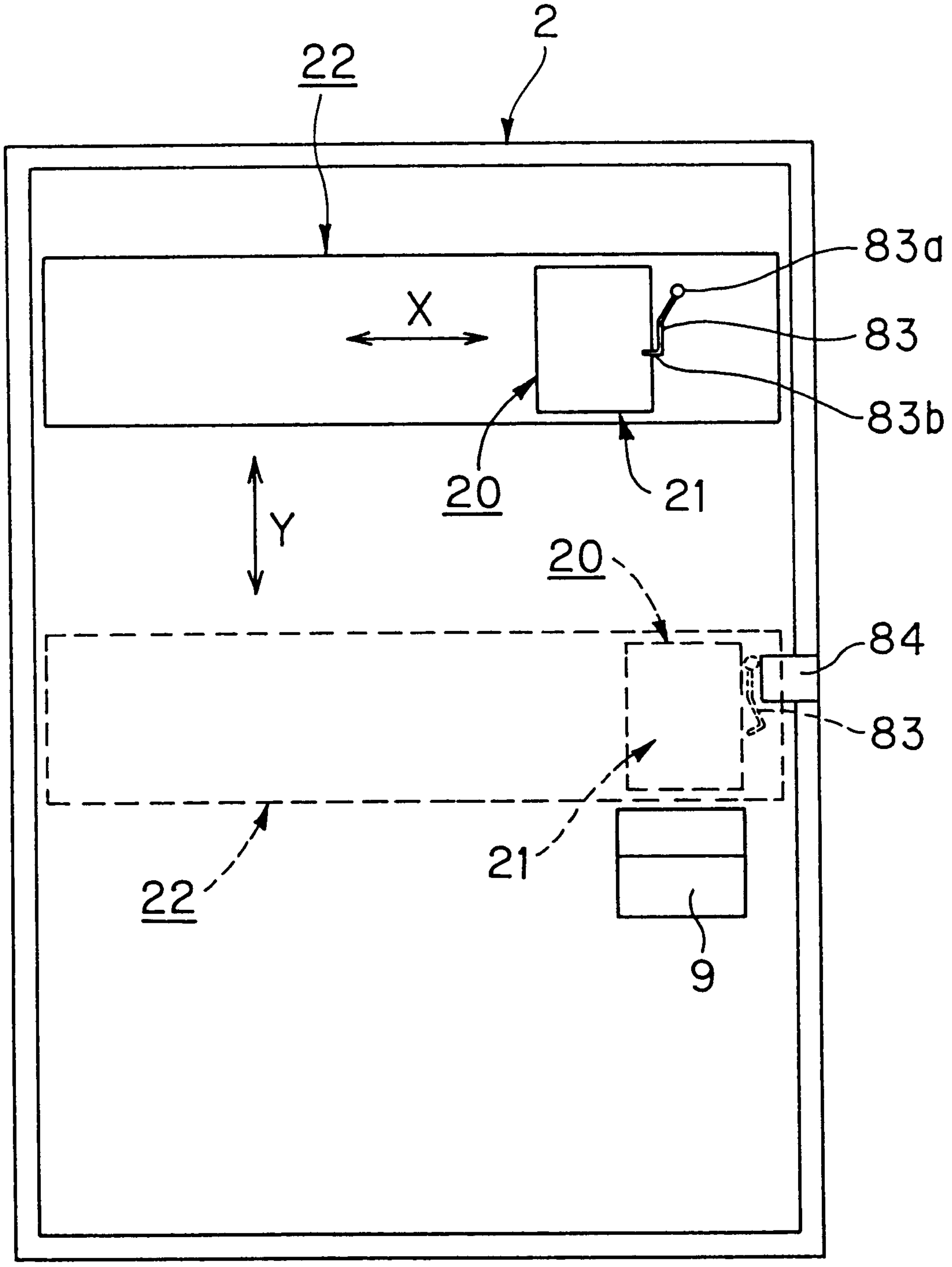
FIG. 31 is, likewise, an partial expanded front view showing the state of operation of an article-jumping-out prevention means by the movement of an article-pick-up means towards a machine.
Figure 32:
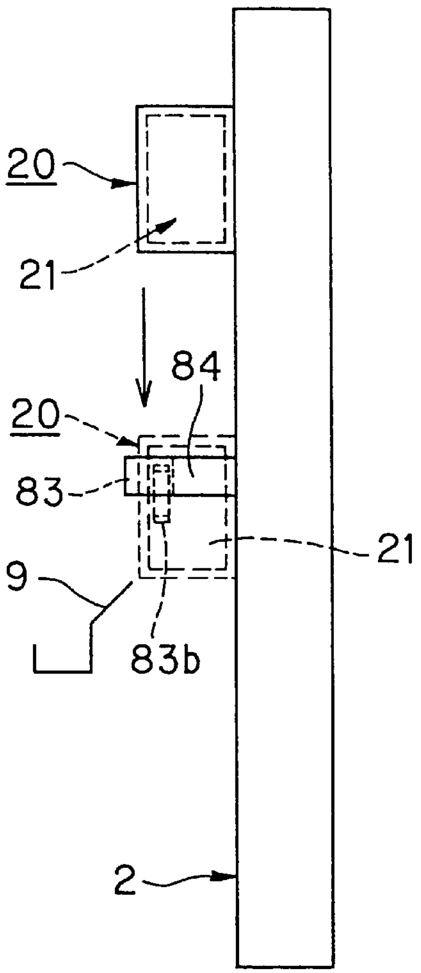
FIG. 32 is, likewise, an partial expanded side view showing the state of operation of an article-jumping-out prevention means by the movement of an article pick-up means towards a machine.
Figure 33:
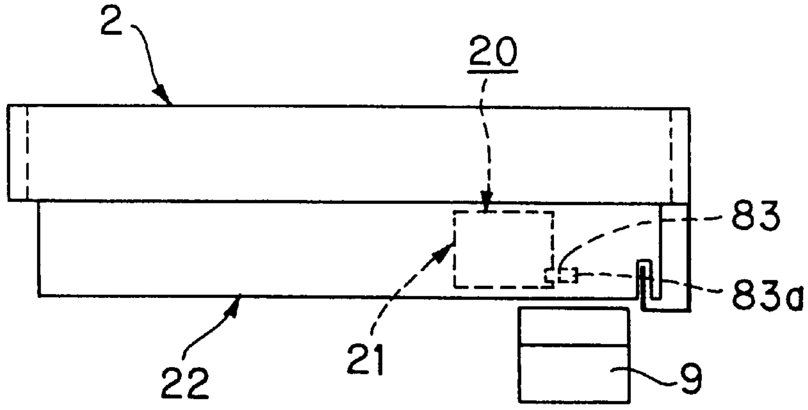
FIG. 33 is, likewise, an partial expanded plan view showing the state of operation of an article-jumping-out prevention means by the movement of an article-pick-up means towards a machine.
Figure 34:
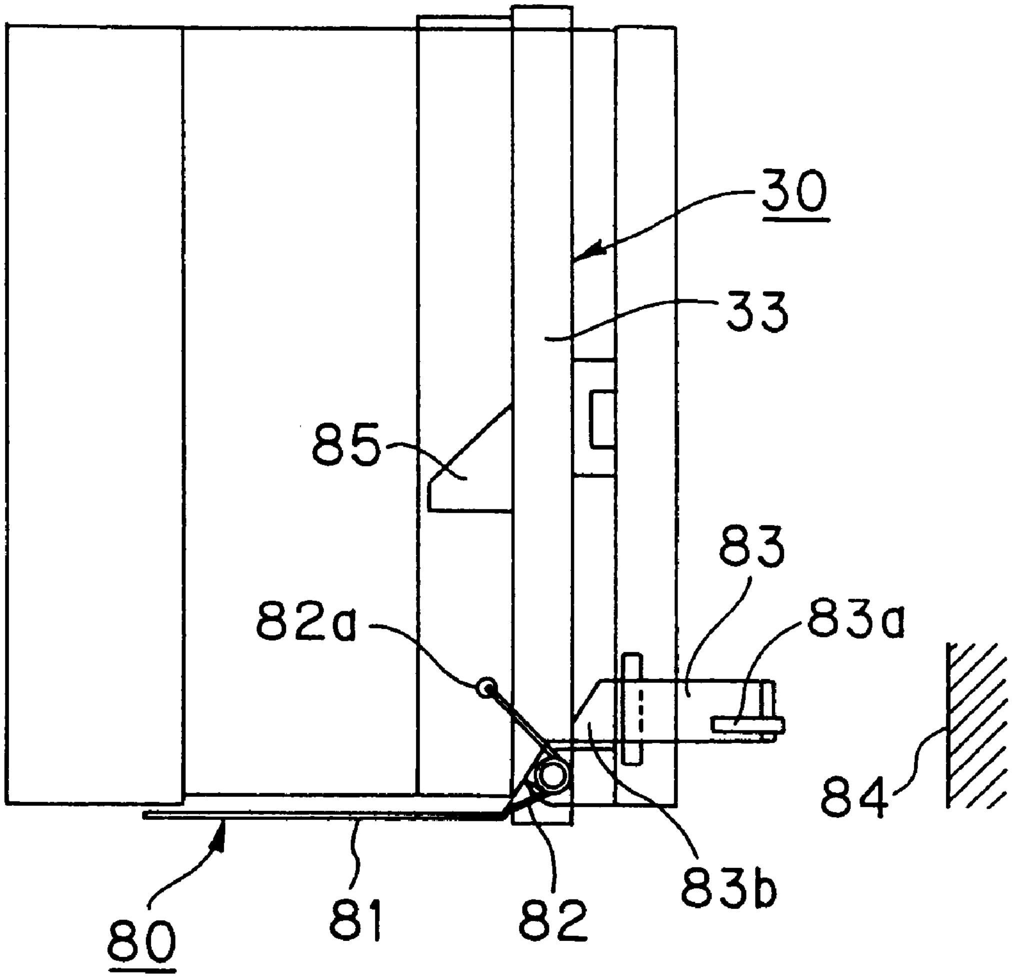
FIG. 34 is, likewise, an partial expanded plan view showing the closed state of a restriction door of an article-jumping-out prevention means.
Figure 35:
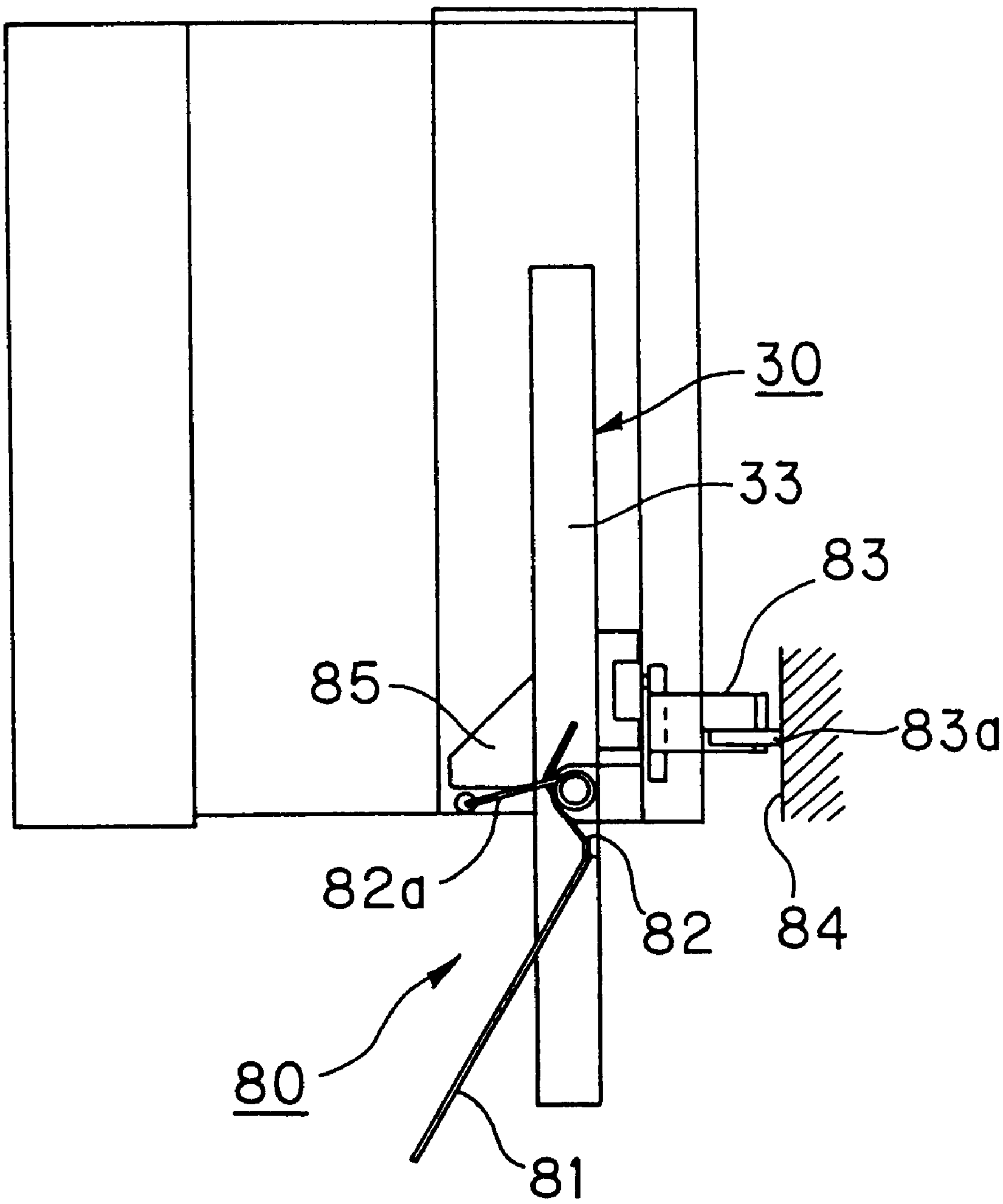
FIG. 35 is, likewise, an partial expanded plan view showing the open state of a restriction door of an article-jumping-out prevention means.
Figure 36:
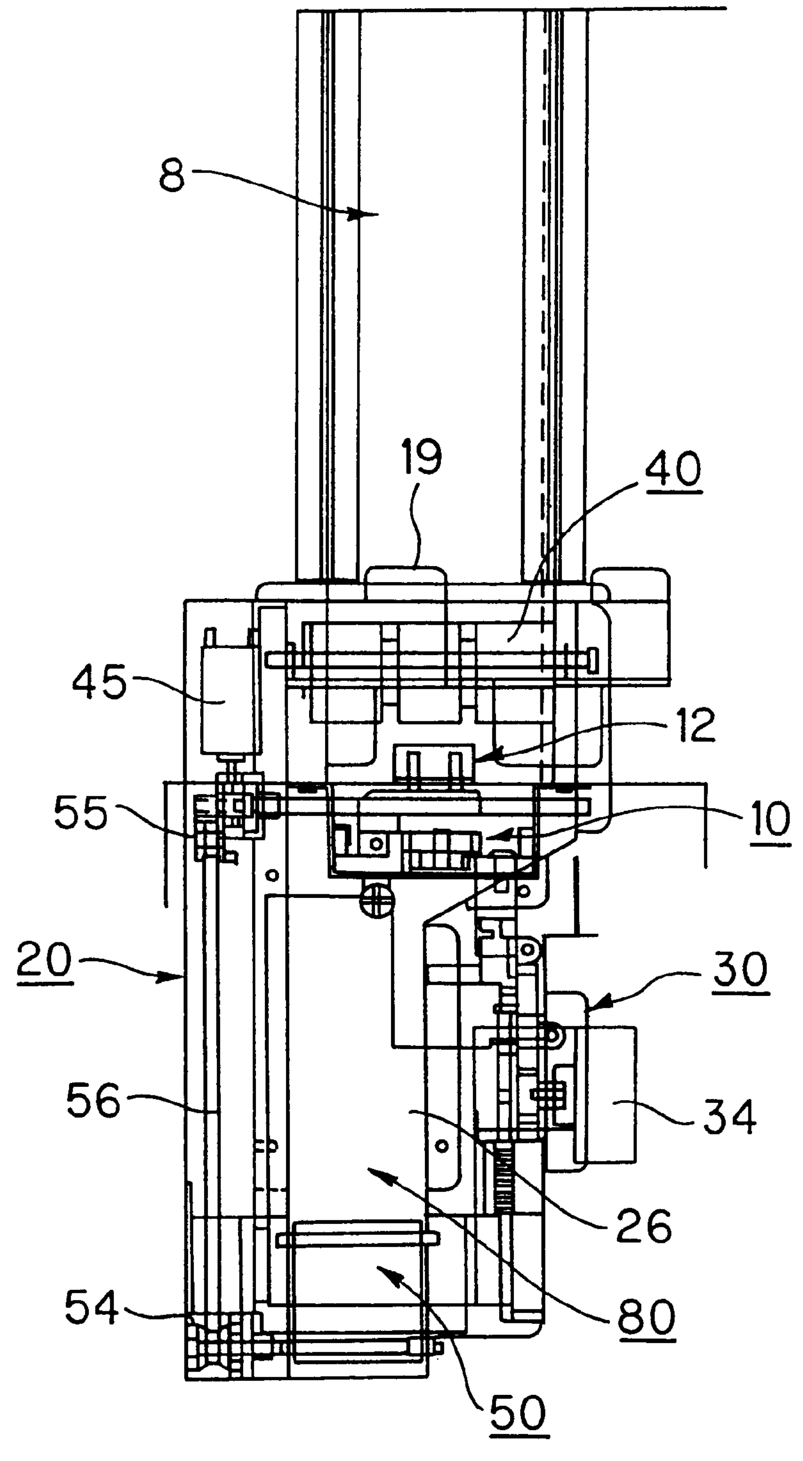
FIG. 36 is, likewise, an partial expanded front view showing the state of a goods being pushed out by an article-push-out means operating with an article-push-out drive means in an article-pick-up means.
Figure 37:
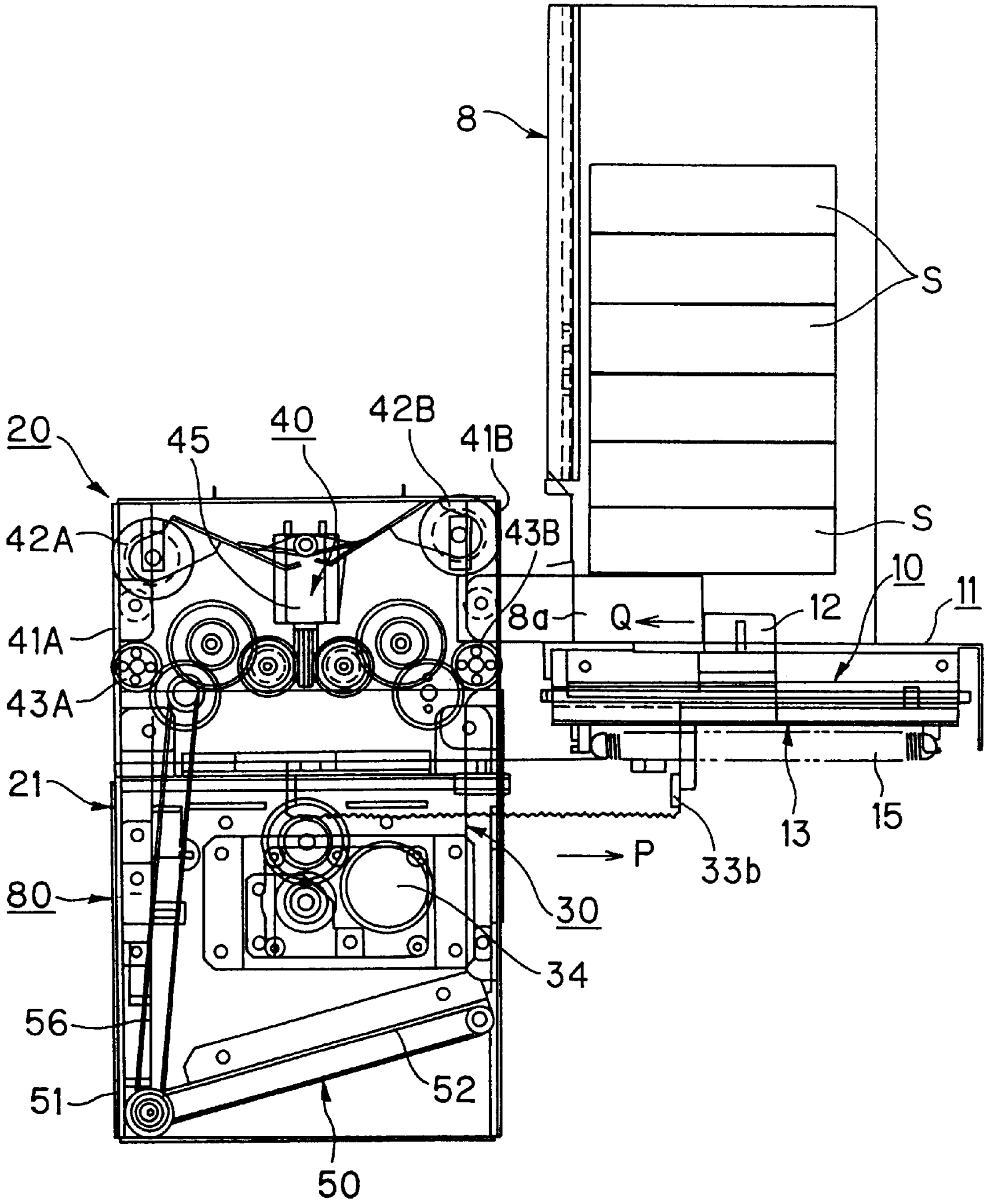
FIG. 37 is, likewise, an partial expanded side view showing the state of an article being pushed out by an article-push-out means operating with an article-push-out drive means in an article-pick-up means.
Figure 38A:
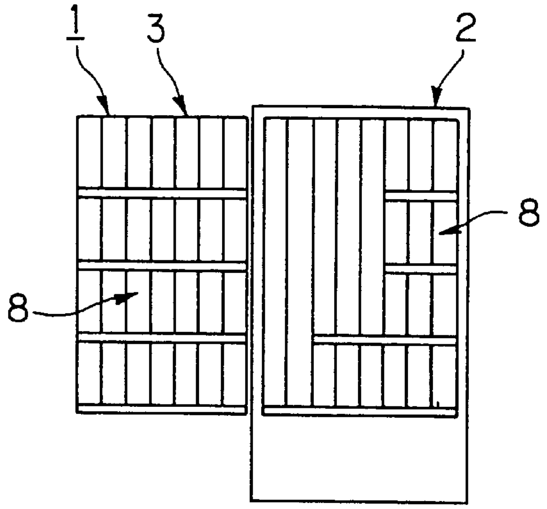
FIG. 38(A) is, likewise, an explanatory drawing showing an embodiment of the first pattern of arrangement.
Figure 38C:
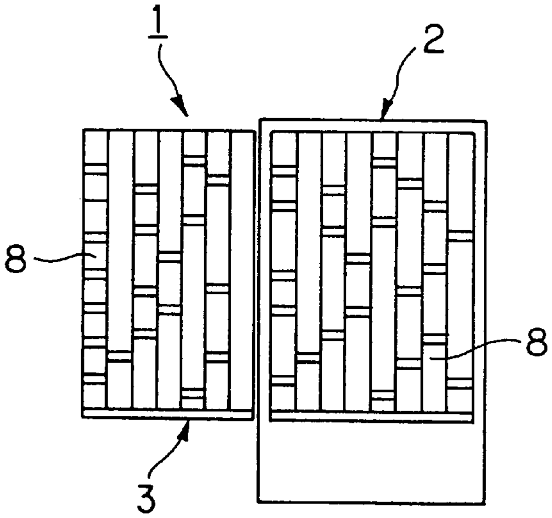
FIG. 38(C) is an explanatory drawing showing an embodiment of the third pattern of arrangement.
Figure 38B:
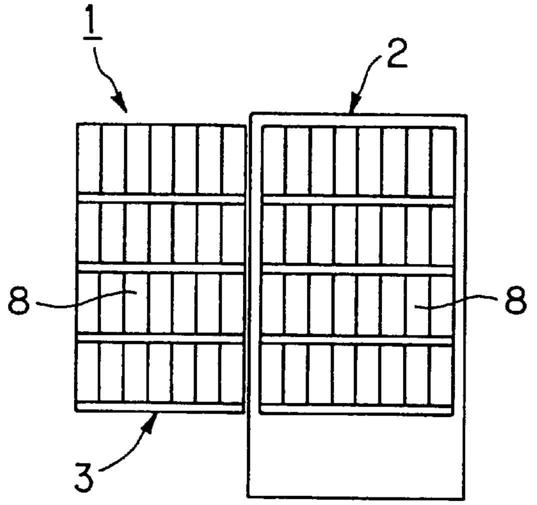
FIG. 38(B) is an explanatory drawing showing an embodiment of the second pattern of arrangement.
Figure 38D:
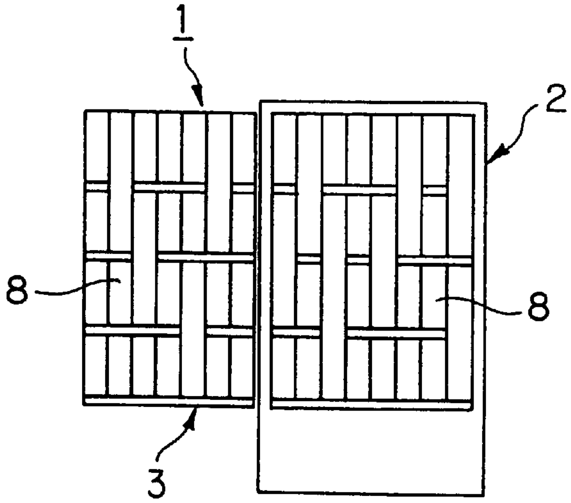
FIG. 38(D) is an explanatory drawing showing an embodiment of the forth pattern of arrangement.

The plate 84, as shown in FIG. 31 to FIG. 33, is secured to one of the flames 2A of the main body 2 of the machine 1, to the position approximate to the article-take-out window 6, i.e. the position where the article-pick-up means 20 which has taken therein an article is moved by the vertical-transfer mechanism 60 and the horizontal-transfer mechanism 70, the first and second transfer means, onto the shooter 9 constituting the article-carry-out portion and the upper end 83*a* of the stopper 83 faces with it and rotates. By the rotation of the upper end 83*a*, the lower end 83*c* of the stopper 83 is released, as shown in FIG. 34 and FIG. 35, from the restraint of the pivotally supported end 81*a* of the restraining door 81, so the locked state of the restraining door 81 is released.

Further, the pusher 33 of the article-carry-out driving means 30 incorporated in the article-pick-up means 20, as shown in details in FIG. 19 to FIG. 22, is provided an engaging claw 85. The engaging claw 85, when the pusher 33 moves forward, faces with the open end 82*a* of the spring 82 which always energizes the restraining door 81 to the direction to be shut and opens the restraining door 81 against the energy of the spring 82. The state of the restraining door 81 being opened is detected by a detecting sensor not shown and at the same time an article-take-in drive motor 45 of the article-take-in means 40 is started so as to drive the carry-out drive belt 52 of the article-hold-and-carry means 50, by which the carrying out of the article S onto the shooter 9 may be performed. In this case, when the completion of the carrying out of the article S is detected by a detecting sensor, pusher 33 moves backward and stops at its original waiting position.

Next, the controlling process for taking in an article S by the article pick-up means 20 from each of the article-storing columns 8 and for carrying it into the shooter 9 will be explained. When a predetermined cash is put into the bill put-in aperture 4A or the coin put-in aperture 4B of the cash put-in portion and the desired sample article S is selected by the operation of the push button 7, an instruction signal for sale is outputted. The controlling unit (not shown) within the machine 1, upon the instruction signal for sale, outputs the positioning signal indicating the article-storing columns 8 corresponding to the sample article S to the vertical-transfer mechanism 60, the first moving unit, and the horizontal-transfer mechanism 61, the second moving unit, of the article-pick-up means 20, and then the article-pick-up means 20, by the drive of the first and the second transfer means 60 and 70, moves in vertical direction Y and in horizontal direction X, from its waiting position to the position corresponding to the desired article-storing columns 8.

In this case, the waiting position of the article pick-up means 20 is usually established on the shooter 9 (article-carry-out portion), but may be provided, for example, in the central portion of an arrangement pattern of respective article-storing columns 8. Also, the transfer of the article-pick-up means 20 from its waiting position to the desired article-storing columns 8 is controlled to take the shortest distance by the synchronous drive of the first and the second transfer means 60 and 70.

When the article-pick-up means 20 stops at the position corresponding to the article-storing columns 8 which is corresponding to the desired sample article S, for example, at the position corresponding to the rear article-storing columns 8 disposed in the main body 2 side of the machine 1, by the drive of the first and the second transfer means 60 and 70, the article push-out driving means 30 which is mounted on the concaved portion 26 of the outer surface 21*a* of the one side of the housing 21 starts to drive.

In this article-push-out driving means 30, the pusher (protruding member) 33 moves horizontally, by the normal rotation drive of the Z-axis drive motor 34, towards the push-out movement direction P at the rear position along the front and rear push-out direction Z, and its rear end 33*b* faces with the actuating plate 18 of the differential mechanism 13 of the article-push-out means provided on the lower part of the article-storing columns 8, and by its stick-out movement the second rack gear 17 of the differential mechanism 13 moves backward and then, relative to the backward movement of the second rack gear 17 moves forward via the differential gear 16 against the energy of the spring member 15.

By the movement of the first rack gear 14 the pusher 12 moves forward and pushes out an article S at the lowest position which is piled up in the article-storing columns 8 in horizontally-laid posture via a restraining plate 19 from the open portion 8*a* opened at the lower part of the article-storing columns 8. The article S from the article-storing columns 8 is pushed out toward the rear article take-in aperture 41 which is opened in the housing 21 of the article-pick-up means 20 in a horizontally-laid posture, and taken into the housing 21 by the article-take-in means 40.

In the article-take-in means 40, when the front end of the article S is pushed into the rear article-take-in aperture 41, the state is detected by a detecting sensor (not shown) and at the same time the article-take-in drive motor 45 starts to drive and makes the lower take-in rollers 43A and 43B drive to rotate to the direction of take-in movement Q, and as soon as the front end of the article S is held between the rear upper and lower take-in rollers 42B and 43B, the article S is pulled, in horizontally-laid posture, into the upper half taking-in-and-storing portion 21A which is horizontally long and wide.

In this case, the operation by the article-take-in means 40 to take in the article S is conducted by detecting with a detecting sensor (not shown) the state that the front end of the article S is pushed into the rear article-take-in aperture 41B and by starting the article-take-in drive motor 45. But it is possible to start driving of the article-take-in drive motor 45 at the same time as the forward movement of the pusher (push-out member) 12 of the article-push-out means 10 by the drive of the pusher (protruding member) 33 of the article-push-out drive means 10.

The article S taken into the upper half take-in-and-storing portion 21A of the housing 21 is guided to reverse its posture within the lower half take-in-and-storing portion 21B, and stored and held temporally on the carrying-drive belt 52 of the article-hold-and-carry means 50. When the state of the article being stored and held is detected by a detecting sensor (not shown), the Z-axis drive motor 34 of the article-push-out driving means 30 starts reverse rotation, by which the pusher (protruding member) 33 moves horizontally towards the direction of the front take-in portion and stops at its original waiting position.

And, the actuating plate 18 of the differential mechanism 13 of the article-push-out means 10 is released, by this take-in movement of the pusher (protruding member) 33, from sticking movement of the pusher (protruding member) 33 and the pusher 12 is made to return to its original waiting position by the backward movement of the first rack gear 14 by the force of the spring 15, and at the same time the actuating plate 18 is returned to its original waiting position by the forward movement of the second rack gear 17 via the differential gear 16.

At this time, the carrying-drive belt 52 of the article-hold-and-carry means 50 continues to drive in synchronization with the article-take-in drive motor 45 of the article-take-in means 40 until the state that the article S is stored is detected by a detecting sensor not shown, and to try to carry the article S placed on the carrying-drive belt 52 towards the article-carry-out aperture 51, but the article S never to be carried out from the article-carrying aperture 51 because the restraining door 81 of the article-jump-out prevention means 80 is kept closed.

Also, in this case, it is possible to stop the drive of the carrying-drive belt 52 of the article-hold-and-carry means 50 at the same time as the stop of the article-take-in drive motor 45 by detecting with a detecting sensor not shown here the taking-in movement of the article S by the article-take-in means 40.

When the article s is taken into and stored, the article-pick-up means 20, by the drive of the first and the second transfer means 60 and 70, is controlled to start movement from the take-in position to a position where the article is carried out which corresponds to the shooter 9 (article-carry-out portion) in the shortest distance and to stop at the article-carry-out position.

When the article-pick-up means 20 moves to the article-carry-out position, the restraining door 81 of the article-jump-out prevention means 80 opens against the energy of the spring 82. The stopper 83 which makes the restraining door 81 close releases the locked state of the restraining door 81 by its rotation when its upper end 83*a* faces with the plate 84 secured to one of the flames 2A of the main body 2 of the machine 1, and at the same time drives the Z-axis drive motor 34. By the drive of the Z-axis drive motor 34, the pusher 33 moves forwards, by which the engaging claw 85 faces with the open end 82*a* of the spring 82 which always gives energy to shut the door and opens the door against the energy.

When the restraining door 81 is opened, the state is detected by a detecting sensor not shown and at the same time the article-take-in drive motor 45 of the article-take-in means 40 is driven and the carrying-drive belt 52 of the article-hold-and-carry means 50 is synchronously driven, so that the article S is carried out for sale from the carry-out aperture 51 onto the shooter 9.

Thus, when the completion of sale of the article S is detected by a detecting sensor not shown, the pusher 33 moves backward and stops at its original waiting position, and at the same time the restraining door 81 is rotated toward the direction to be closed by the force of the spring 82 which is released by the pull-back work of the engaging claw 85, and the article-take-in drive motor 45 of the article-take-in means 40 which gives synchronous drive to the carrying-drive belt 52 of the article-hold-and-carry unit 50 is stopped.

The article-pick-up means 20, at the time when the restraining door 81 is closed, provides for next sale of articles at a waiting position, for example, at the article-carry-out portion, but in that case locking for the restraining door 81 is conducted by the self-rotation by the weight of the stopper 83 when the article-pick-up means 20 moves from the waiting position for sale of next goods and the stopper 83 is separated from the plate 84 of the machine 1 side.

FIG. 38 shows an arrangement pattern of article-storing columns in the machine 1 and the inside of the door 3. FIG. 38 (A) shows an arrangement pattern of article-storing columns according to a first embodiment where the columns in the inside of the door 3 side are arranged in 4 columns in vertical direction and in 7 rows in horizontal direction, while respective article-storing columns in the machine 1 side are arranged in 8 rows in horizontal direction, among which each of the first 3 rows has 3 columns in vertical direction, and adjacent 3 rows 3 columns in vertical direction and the remaining 2 rows in 1 column in vertical direction. FIG. 38 (B) shows an arrangement pattern according to a second embodiment where respective article-storing columns in the machine 1 and the door 3 are arranged in 4 columns in vertical direction, respectively. FIG. 38(C) and FIG. 38(D) show arrangement patterns according to a third and fourth embodiments where respective article-storing columns in the machine 1 and the door 3 are arranged in columns and rows at random.

Further, in the above embodiments, the operation for pushing out, taking in and carrying of an article S in the rear article-storing columns arranged in the main body 2 of machine 1 is explained, but the operation for pushing out, taking in and carrying of an article S for the front article-storing columns arranged in the door 3 side is conducted in the same way. Furthermore, it goes without saying that various changes in form and details can be made without departing from the spirit and scope of the invention.

As is obvious from the above explanation, according to the invention, a plurality of article-storing columns each of which storing various articles piled up therein are arranged in raw and column directions, an article push-out units for pushing out the lowest of the articles piled up in each column is provided at the lower part of the article-storing columns, respectively, while an article-pick-up means operative at a position opposite to the article-push-out means of the respective article-storing columns is provided in a state of being movable, and an article pushed out by the operation of the article-push-out means by the article-pick-up means is taken into said article-pick-up means and carried thereby, so that all the article-push-out means of the article-storing columns are driven by one article-pick-up means, by which number of parts required for an article-carrying mechanism is reduced and cost reduction for the whole apparatus is realized.

Also, since the article-storing columns and the article-push-out means are arranged both in the main body and the inside of the door thereof, article-storing efficiency may be raised.

As this invention may be embodied in several forms without departing from the spirit of essential characteristics thereof, the present embodiment is therefore illustrative and not restrictive, since the scope of the invention is defined by the appended claims rather than by the description proceeding them, and all changes that fall within meets and bounds of the claims, or equivalence of such meets and bounds are therefore intended to be embraced by the claims.

Next, another embodiment according to the invention will be explained. The explanation on the front of a machine is omitted because the structure is same as that of the embodiment described above.

Figure 39:
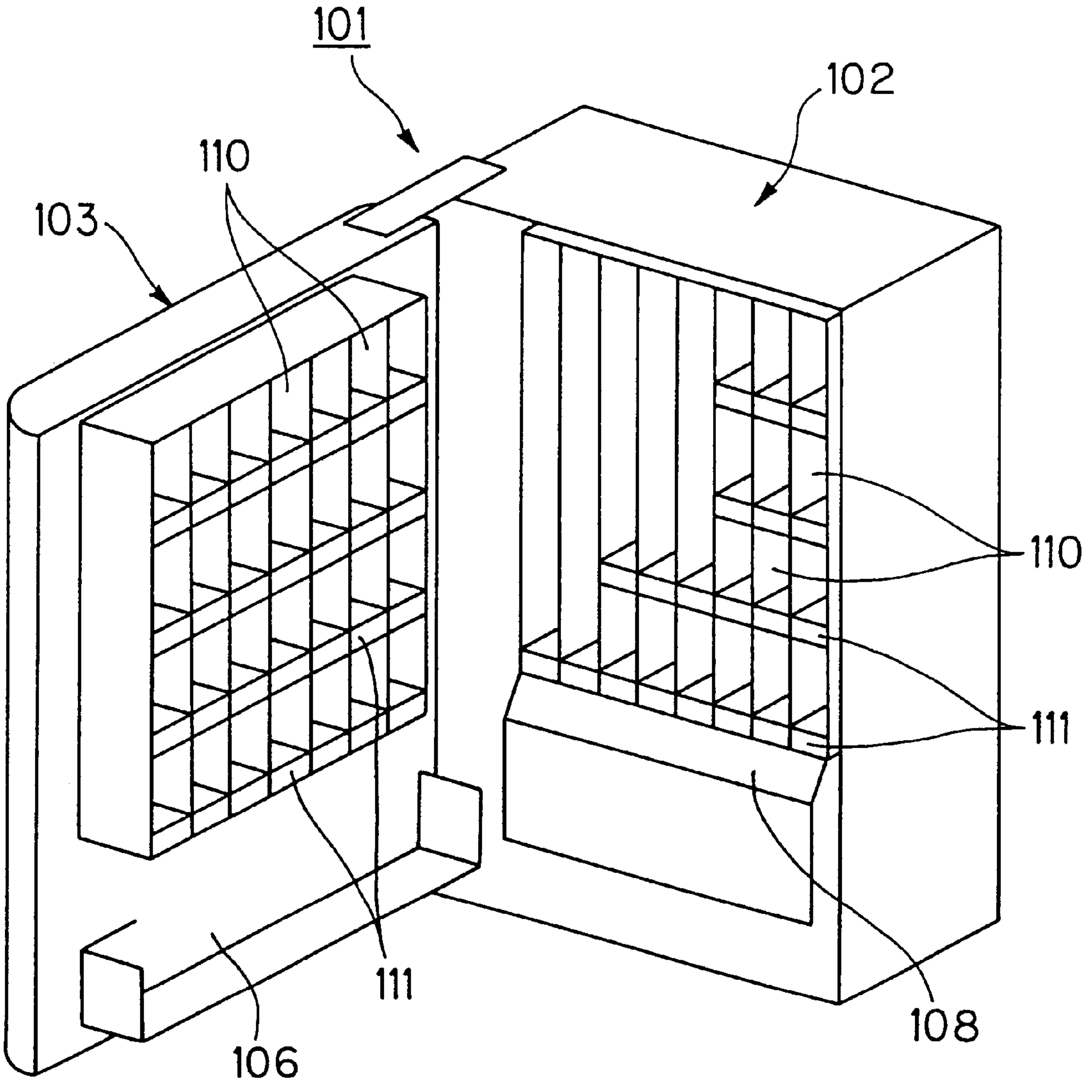
FIG. 39 is an explanatory drawing showing briefly an arrangement of article-storing columns in a state that the door of a machine is opened in an automatic vending machine embodying the second aspect of the invention.
Figure 40:
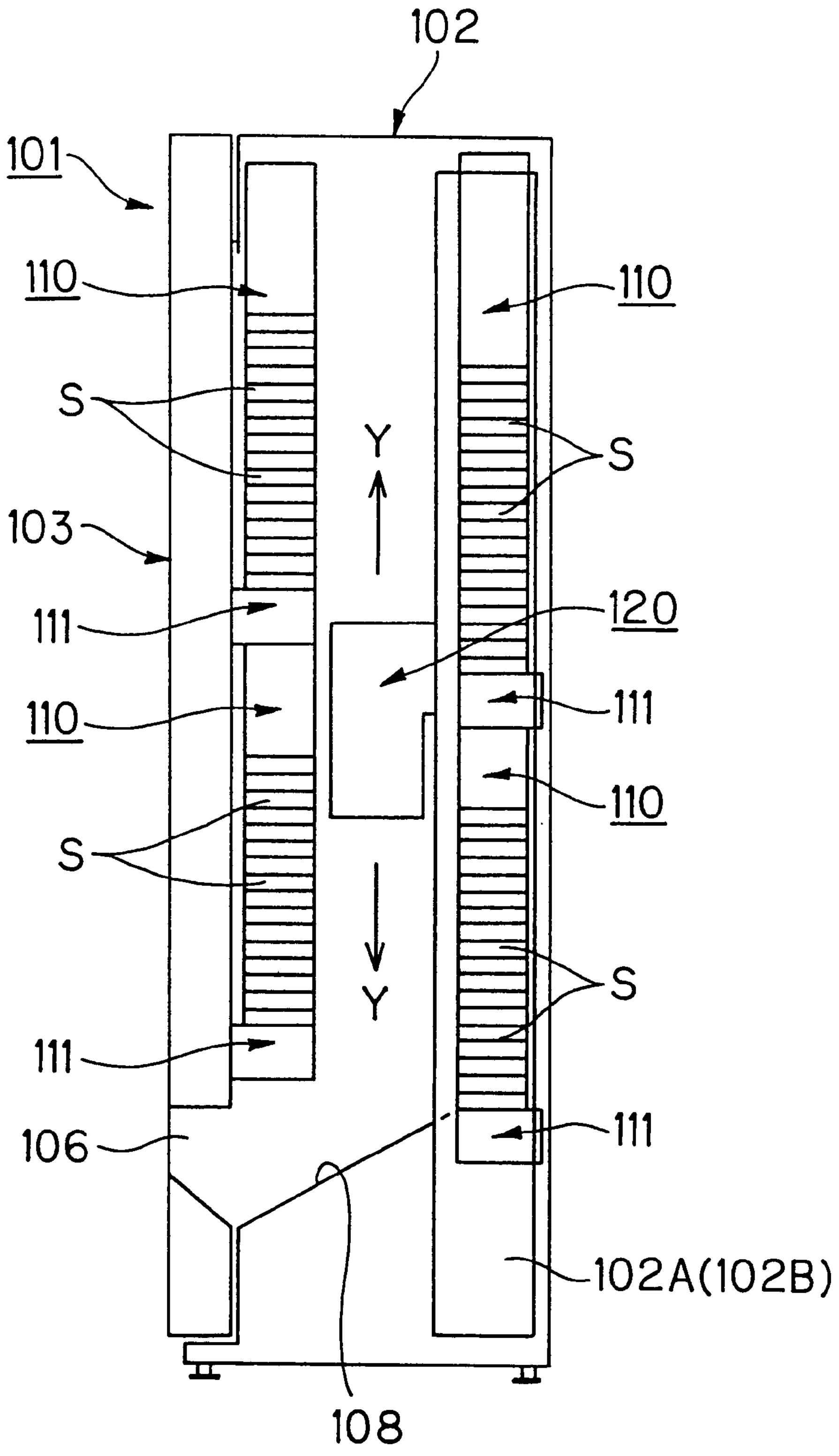
FIG. 40 is, likewise, an explanatory drawing showing briefly an arrangement of article-storing columns and the position of an article-pick-up means in a state that the door of a machine is opened.

In the bottom of the main body 102 side of a machine 101, as shown in FIG. 39 and FIG. 40, an shooter 103 which constitute an article-carry-out portion is disposed so as to correspond to an article-take-out window 106 provided on the lower front surface of a door 103 of the machine 101, and the shooter 103 is designed to carry out an article S which is taken therein via an article-pick-up means from an article-storing column described below toward the article-take-out window 106.

In the main body 102 of the machine 101 and the inside of the door 103, the front and the back sides, respectively, plural article-storing columns 110 storing various articles S which are different in kind from others and piled up in horizontally-laid posture are arranged to form a matrix of predetermined arrangement pattern, in columns in vertical direction and in rows in horizontal direction. These front and back article-storing columns 110, 110, as shown in FIG. 40, are disposed to oppose each other with a relation of the front and the rear in a state the door is closed, and an article-pick-up means 120 is positioned between them, in a manner being able to move in vertical direction Y and in horizontal direction X, by being hung and supported via a hang-and-support means 140 described below by a first and second transfer means 150 and 160.

At the lower part of each of the article-storing columns 110 a column base 111 is disposed, and at a position corresponding to an article S at the lowest layer piled and placed on the column base 111 an article-take-out aperture 112 is provided.

Figure 41:
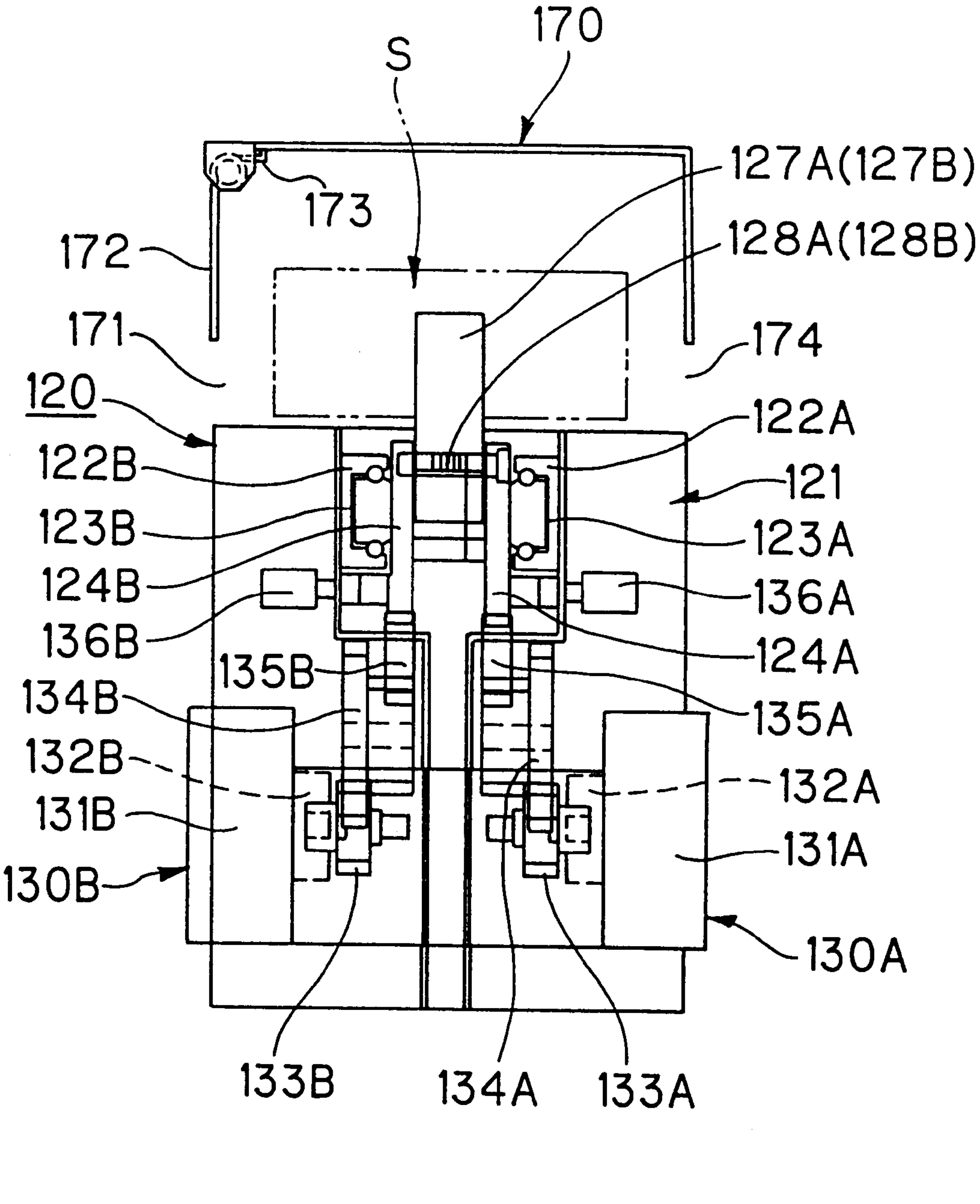
FIG. 41 is, likewise, a partial expanded front view of an article-pick-up means.
Figure 42:
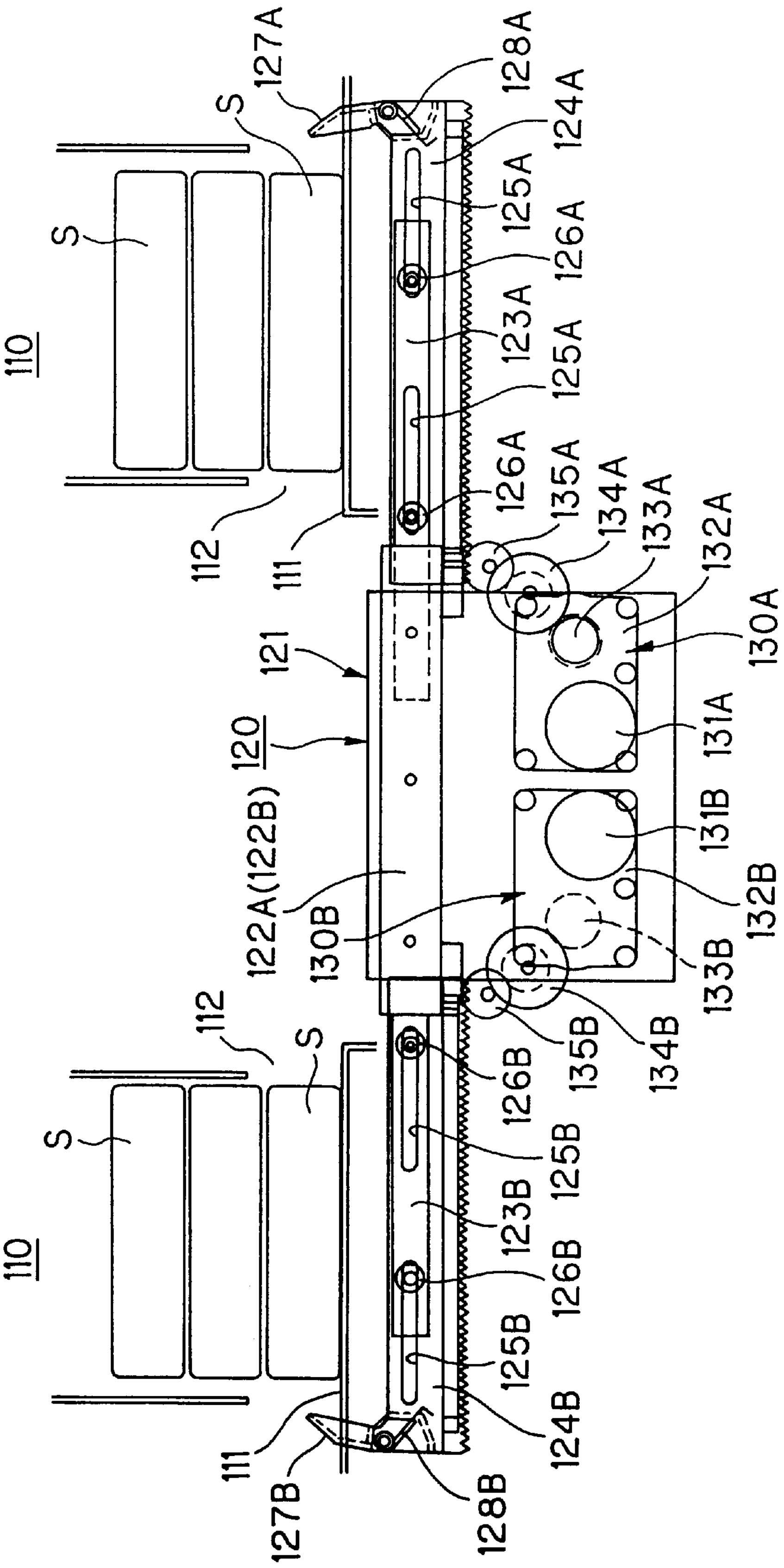
FIG. 42 is, likewise, a partial expanded side view of an article-pick-up means.
Figure 43:
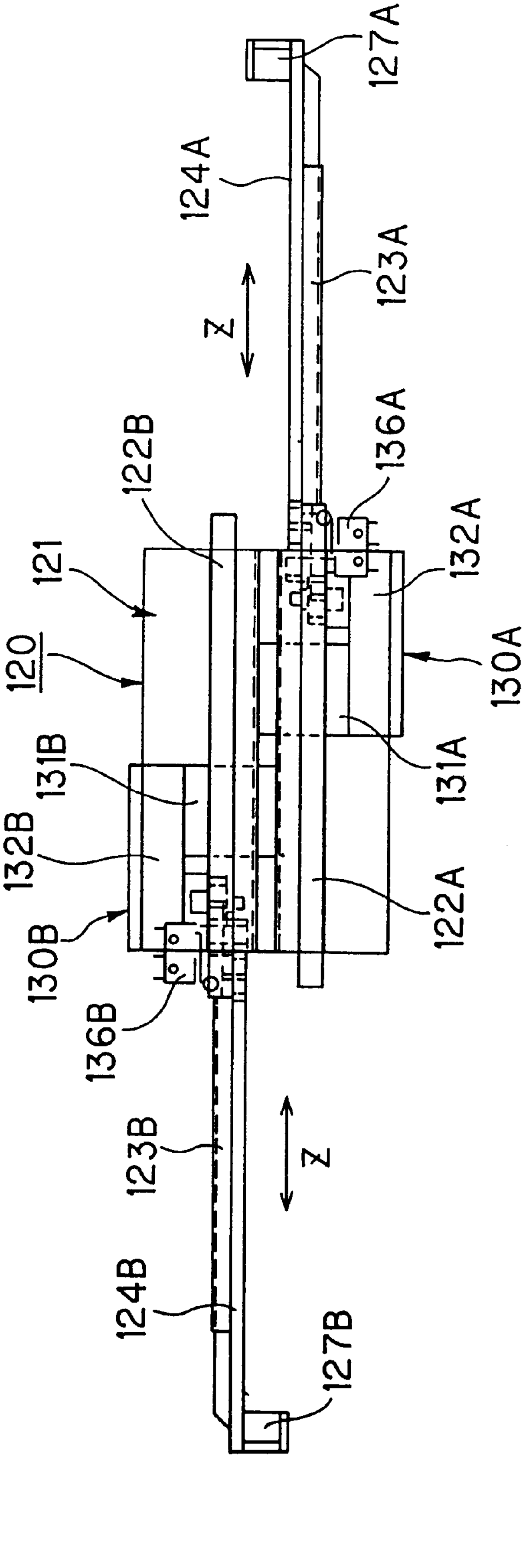
FIG. 43 is, likewise, a partial expanded plan view of an article-pick-up means.

The article-pick-up means 120, as shown in FIG. 41 to FIG. 43, has a support flame 121, a pair of guide rails 122A and 122B provided on the support flame 121 and extending in the front and the rear direction Z, sliding rails 123A and 123B provided on the respective guide rails 122A and 122B and enabled to move alternatively toward the main body 102 side of machine 101 and the door 102 side, respectively, in front and rear direction Z, and arms 124A and 124B of rack gears provided on the sliding rails 123A and 123B, respectively, and enabled to move in front and rear direction Z. The support flame 121 constitutes a article-take-in-and-placing portion on the upper surface of which an article s is taken in and placed, while the sliding rails 123A and 123B and the arms 124A and 124B constitute protrusion members.

The sliding rails 123A and 123B and the arms 124A and 124B constituting the protrusion members has such structure that the sliding rails 123A and 123B, by engaging the sliding pins 126A and 126B provided on the sliding rails 123A and 123B with grooves 125A and 125B provided on the arms 124A and 124B along the front and back direction Z, follow the movement of the arms 124A and 124B in two step movement. In this case, as shown in FIG. 41, each of the sliding rails 123A and 123B have supporting function enabling the appearance, especially smooth protruding operation of the arms 124A and 124B to be made.

Further, at the protruding end of the arms 124A and 124B, pushers 127A and 127B as a push-out member are provided, respectively, in a manner capable of rotating upward, and these pushers 127A and 127B are always given energy to rotate toward the upward direction by springs 128A and 128B.

Each of the arms 124A and 124B are drive-controlled, by the drive units 130A and 130B, respectively, to be able to make protruding and drawing movement in the direction Z of front and back. These respective drive units 130A and 130B comprise Z-axis drive motors 131A and 131B and a first, second and third gear groups 133A, 134A and 135A, and 133B, 134B and 135B which are driven to rotate via speed decreasing gear boxes 132A and 132B by the Z-axis drive motors 131A and 131B, and have such structure as the arms 124A and 124B are engaged with the third gear groups 135A and 135B.

That is to say, the arms 124A or 124B protrudes and moves in the front and back direction Z by the drive of Z-axis drive motor 31A or 31B, and is controlled to make, when the pusher 127A or 127B provided at the protruding end reach the opening position in the back side of an article S at the lowest layer placed on the columns base 111 of the article-storing columns 110, the pusher 127A or 127B rotate upward by the force given by springs 128A or 128B, and to stop by detecting the protruded position by a position detecting sensor 136A or 136B.

On the other hand, the arms 124A or 124B, in its protruded state, moves to draw by reverse-rotation drive of the Z-axis drive motor 131A or 131B and pushes out, by the pusher 127A or 127B provided at the protruding end, the article S at the lowest layer placed on the column base 111 from its back side via an article take-out opening 112 towards the support flame 121, so that the article S in the respective article-storing columns 110 is taken out one by one and placed and taken onto the supporting flame 121, and the movement of the arms 124A and 114B is controlled to stop by detecting the taken-in position by a position detecting sensor 136A or 136B.

The explanation on article-pick-up means 120, vertical-transfer mechanism 150 and horizontal-transfer mechanism 160 will be omitted, because they are same as the article-pick-up means 20, vertical-transfer mechanism 60 and horizontal-transfer mechanism 70 explained in details in FIG. 7 to FIG. 15.

As shown in FIG. 41, the upper part of the support flame 121 forming the article-pick-up means 120, as shown in FIG. 4 to FIG. 6, is covered by a cover 170 whose front and the back are opened. On the one side surface of the cover, for example, on the left side surface of the cover 170, an article-carry-out aperture 171 is opened. The article-carry-out aperture 171 is enabled to open by the flap 172 which is capable of rotating so as to be wound up outwards, and the flap 172 is always energized by the force of the spring 173 towards the direction for it to be closed. On the other side surface of the cover 170 opposite to the article-carrying aperture 171, an aperture for sticking 174 is opened, into which a stick-out plate 181 of an article-stick-out means 180 as described below is inserted.

Figure 44:
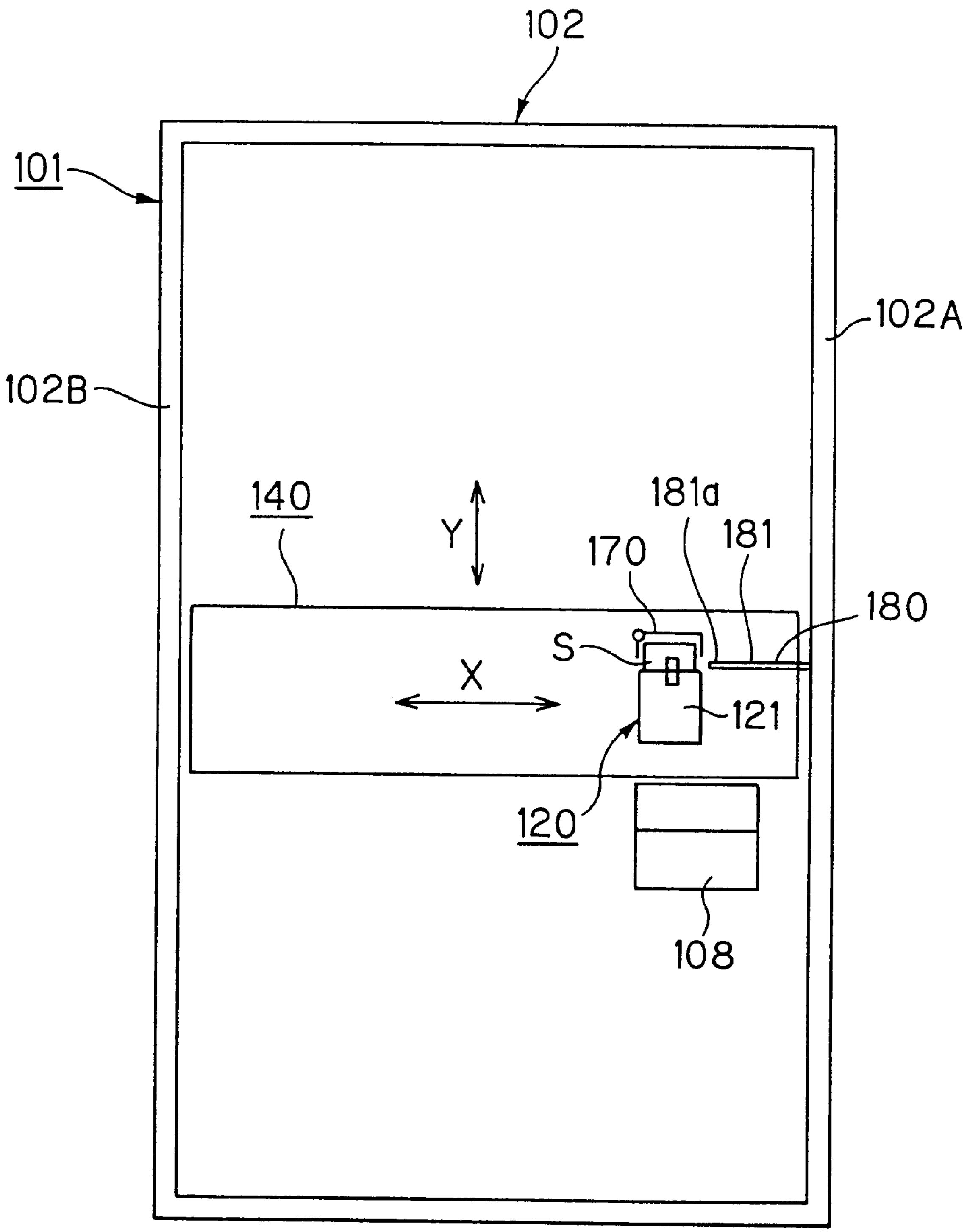
FIG. 44 is, likewise, a partial expanded front view of an article-push-out means in an article-carry-out unit.
Figure 45:
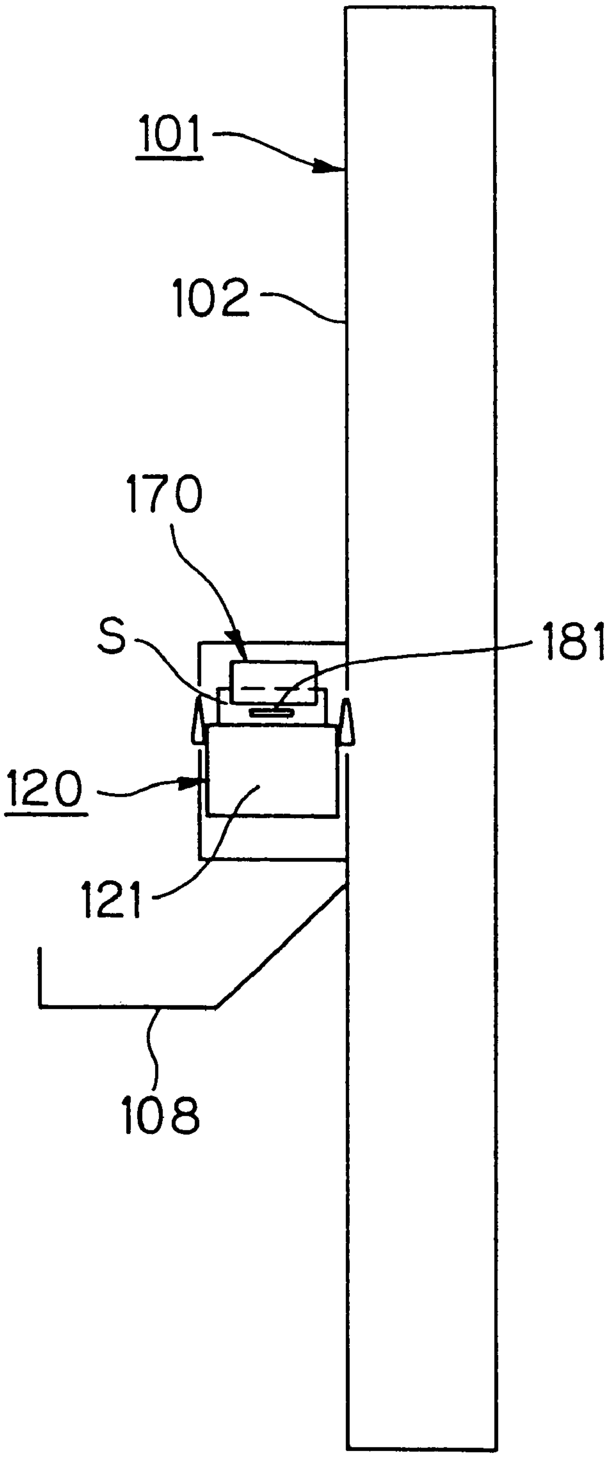
FIG. 45 is, likewise, a drawing showing briefly a side view of an article-push-out means in an article-carry-out unit.

The article-stick-out unit 180, as shown in FIG. 44 to FIG. 45, comprises the stick-out plate 181 secured to one of the flame 102A side of the main body 102 of machine 101. The stick-out plate 181 is secured to the position adjacent to the article-take-out window 106, i.e. the position where, when the article-pick-up means 120 which has taken in an article is transferred to the article-carry-out portion on the shooter 108 by the vertical-transfer mechanism 150 and the horizontal-transfer mechanism 160, the first and second transfer means, its front end 181 can be inserted into the sticking aperture 174 opened on the other side surface of the upper cover 170 of the article-pick-up means 120. And, as described below, by this sticking movement of the stick-out plate 181 at the article-carry-out portion, the article S placed on the supporting flame 121 of the article-pick-up means 120 is stack out towards the article-carry-out aperture 171 and by this stick-out movement of the article S the flap 172 is opened against the force to close it by the spring 173, by which the article S may be carried out onto the shooter 108.

Next, referring to the drawings shown in FIG. 46 to FIG. 53, the process for taking in and carrying out an article S from each of article-storing columns 110 by the article-pick-up means 120 will be explained. First, when a predetermined amount of cash is inputted into the bill put-in aperture 104A or coin put-in aperture 104B and a desired article S is selected by the operation of the push button, a sales instruction signal is output. The control unit of the machine 101 (not shown), upon the sales instruction signal, outputs a position signal indicating the article-storing column 110 corresponding to the sample article S to the vertical-transfer mechanism 150, the first transfer unit, and the horizontal-transfer mechanism 160, the second transfer unit of the article-pick-up means 120. The article-pick-up means 120, by the drive of the first and second transfer units 150 and 160, moves in vertical direction Y and horizontal direction X from its waiting position to a position corresponding to the desired article-storing column 110.

In this case, the waiting position of the article-pick-up unit 120 is established on the shooter 108 (article-carry-out portion), but it may be provided at the center portion of an arrangement pattern of each of the article storing columns 110. Also, the transfer of the article-pick-up means 120 from its waiting position to the desired article-storing column 10 is designed to take the shortest distance by the synchronous drive of the first and second transfer means 150 and 160.

Figure 46:
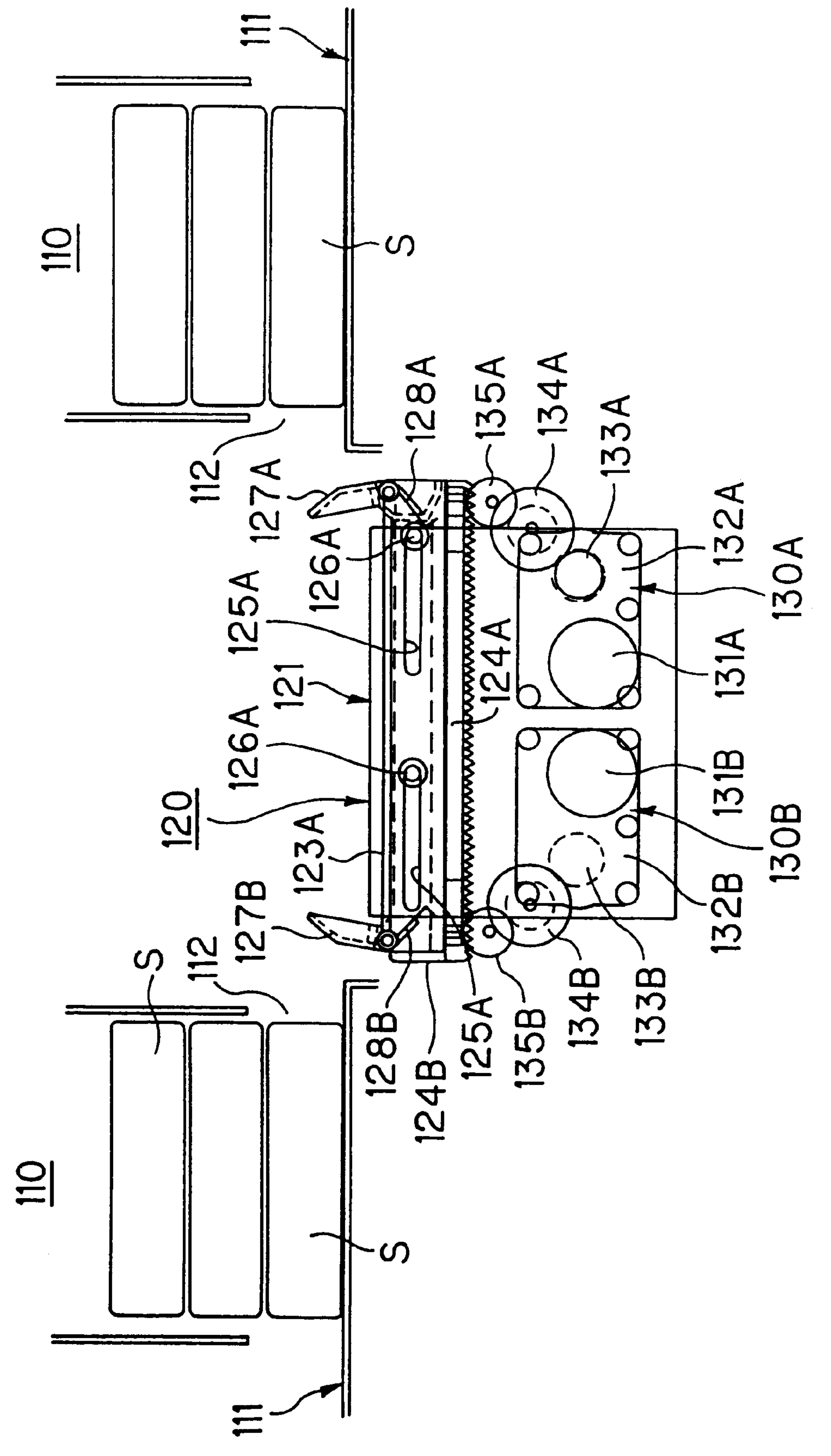
FIG. 46 is, likewise, an explanatory drawing showing a state of an article taking-in operation by an article-pick-up means.

When the article-pick-up means 120, by the drive of the first and second transfer means 150 and 160, as shown in FIG. 46, stops at the position opposite to the article-storing columns 110 corresponding to the desired sample article S, for example, at a position corresponding to an article-storing column 110 disposed in the main body 102 side of the machine 101, the drive unit 130A of the article-pick-up means 120 starts to drive.

Figure 47:
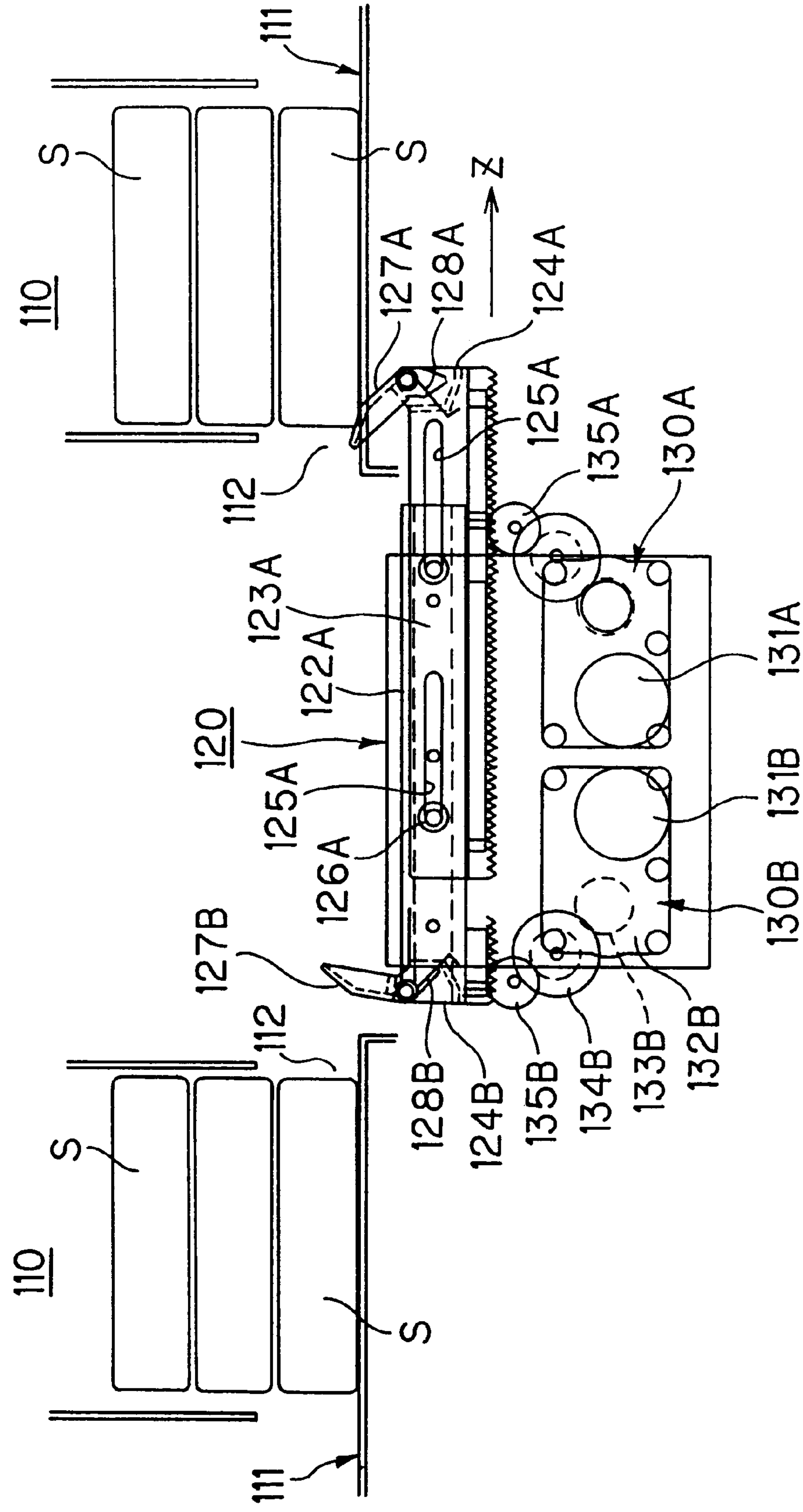
FIG. 47 is, likewise, an explanatory drawing showing a state of an article taking-in operation by an article-pick-up means.

The article-pick-up means 120 makes the arm 124A protrude and move toward the column base 111 of the article-storing column 10 by the normal drive of Z-axis drive motor 131A of the drive units 130A. At this time, as shown in FIG. 47, the pusher 127A provided on the protruding end of the arm 124A is rotated to lean, against the energy given by the spring 128A, so as to be able to pass through under an article S at the lowest layer placed on the column base 111 and allowed to make its protruding movement, and the arm 124A protrudes and moves independently as long as the length of the guide groove 125A.

Figure 48:
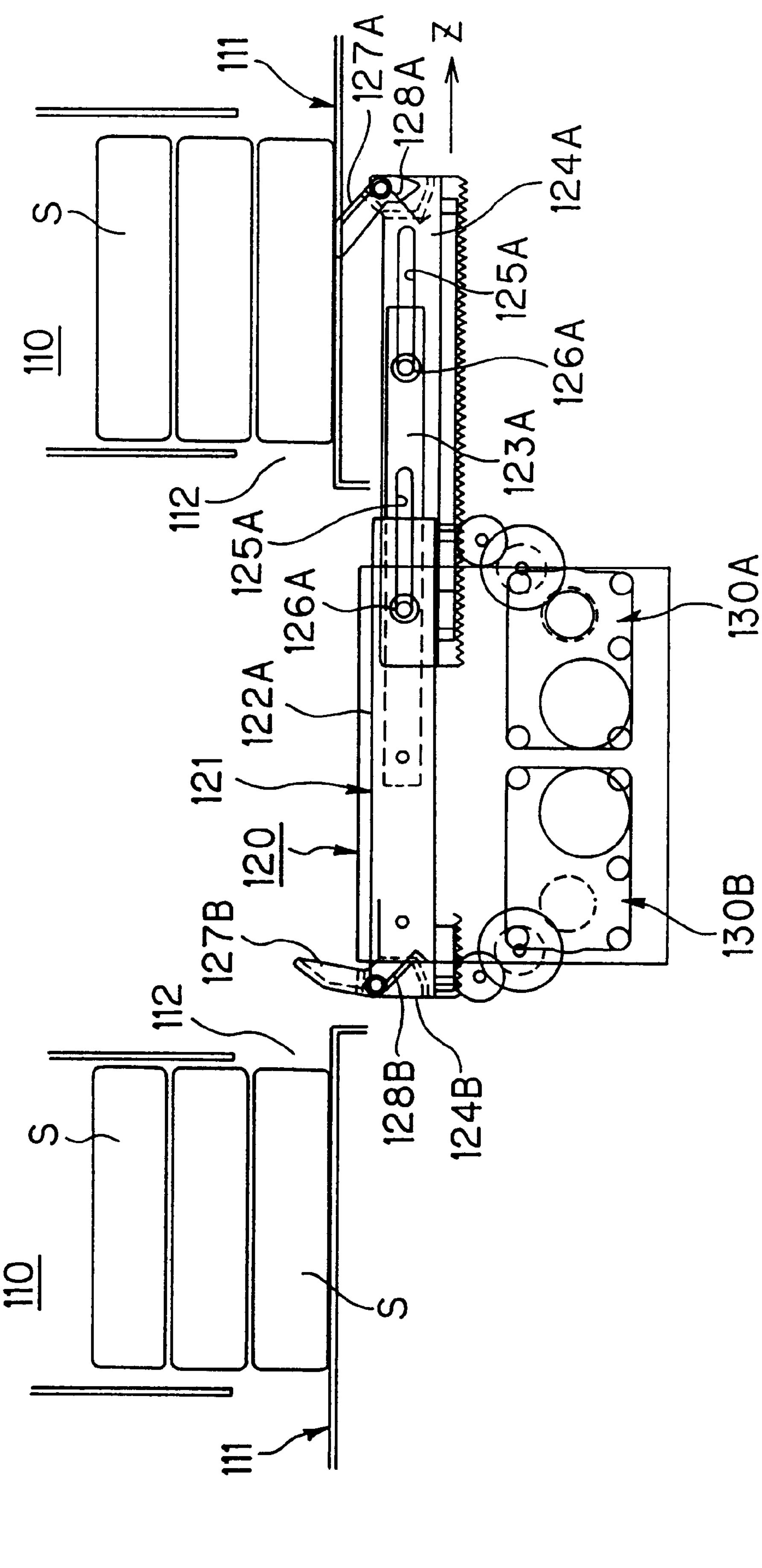
FIG. 48 is, likewise, an explanatory drawing showing a state of an article taking-in operation by an article-pick-up means.
Figure 49:
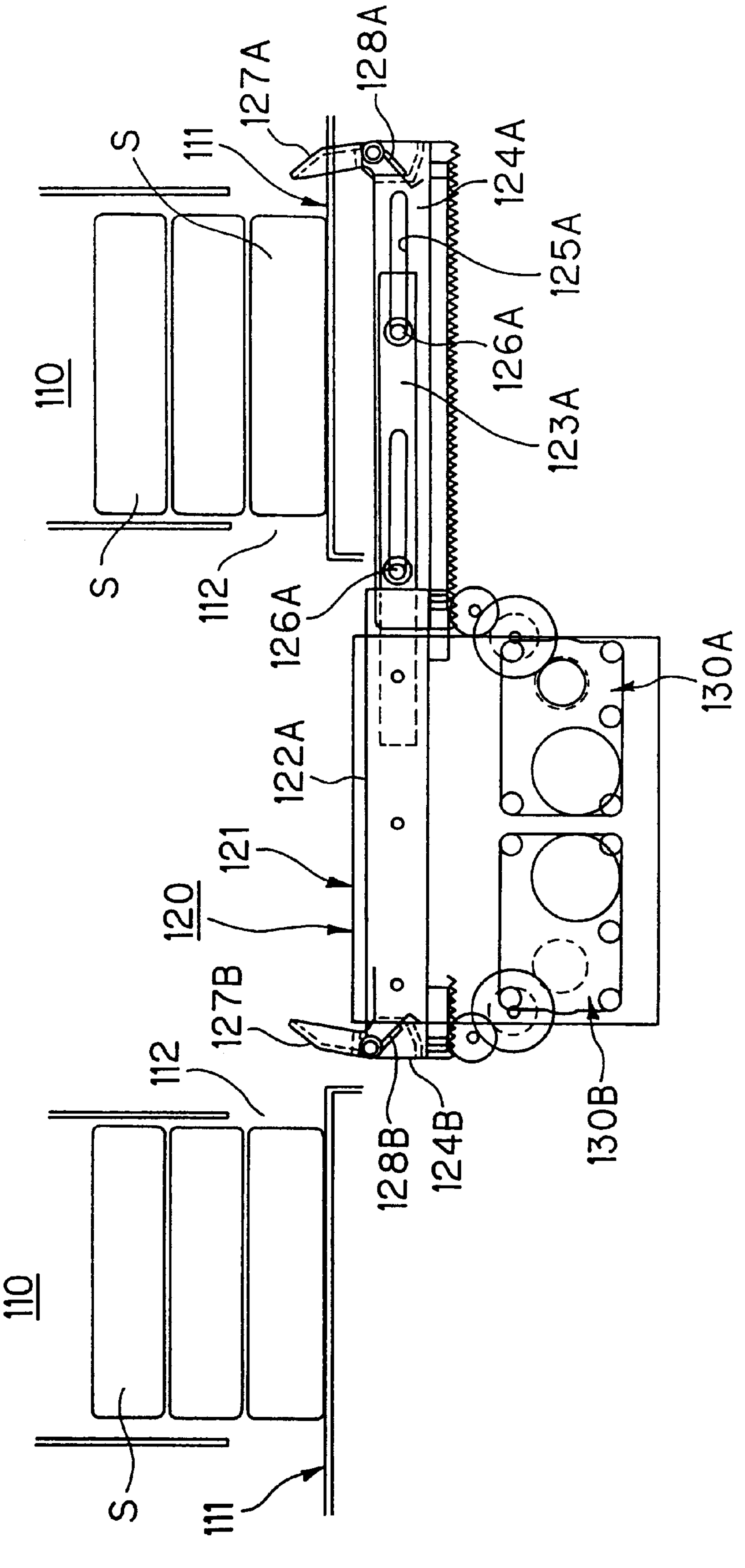
FIG. 49 is, likewise, an explanatory drawing showing a state of an article taking-in operation by an article-pick-up means.

Under the state, when the slide-pin 126A of the sliding rails 123A engages with the guide groove 125A of the arm 124, as shown in FIG. 48, the sliding rails 123A moves to follow the movement of the arm 124A in two steps, and, as shown in FIG. 48, when the front end of the arm 124A, namely, the pusher 127A reaches the open position of the back side of the article S at the lowest layer placed on the column base 111 of the article-storing columns 110, the pusher 127A rotates upward by the energy of spring 128A and at the same time stops the protruding movement of the arm 124A.

Figure 50:
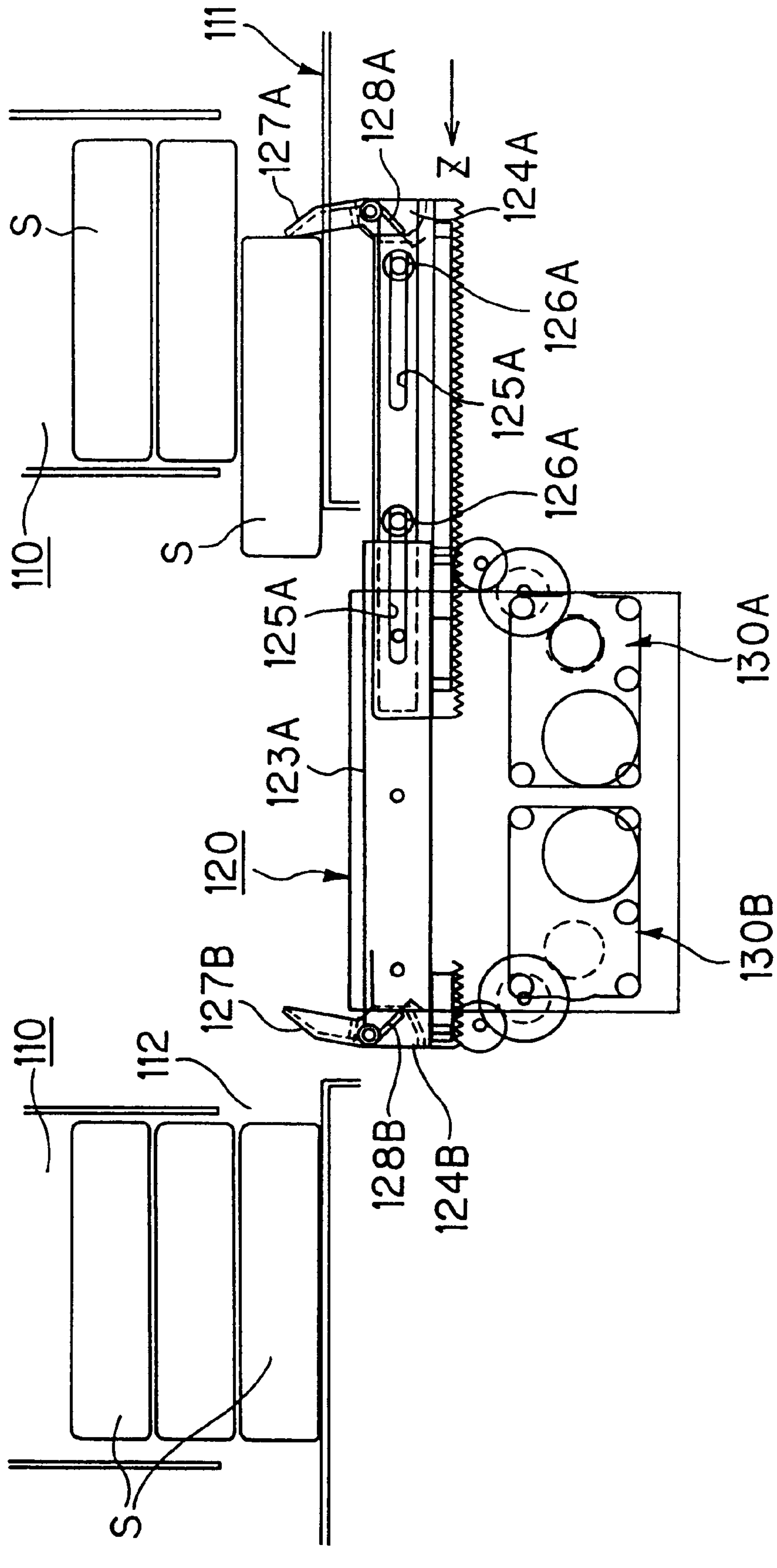
FIG. 50 is, likewise, an explanatory drawing showing a state of an article taking-in operation by an article-pick-up means.

When the Z-axis drive motor 141A of the drive unit 140A drives reverse rotation under the state that the arm 124A is protruded, as shown in FIG. 50, the arm 124A moves to withdraw and the pusher 127A provided on its protruding end pushes out the article S at the lowest layer placed on the column base 111 towards the article-take-out opening 112 of the article-storing columns 110.

Figure 51:
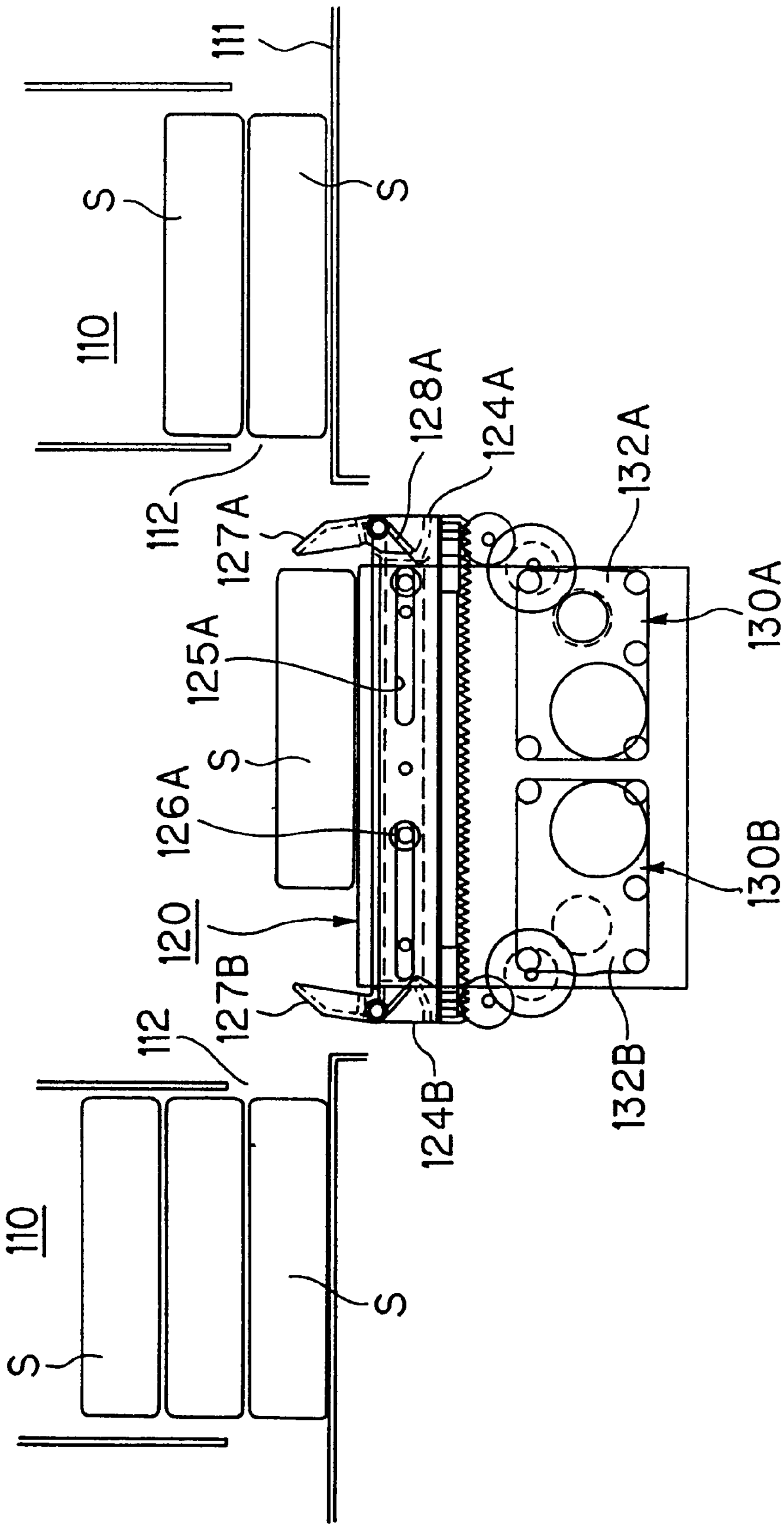
FIG. 51 is, likewise, an explanatory drawing showing a state of an article taking-in operation by an article-pick-up means.
Figure 52:
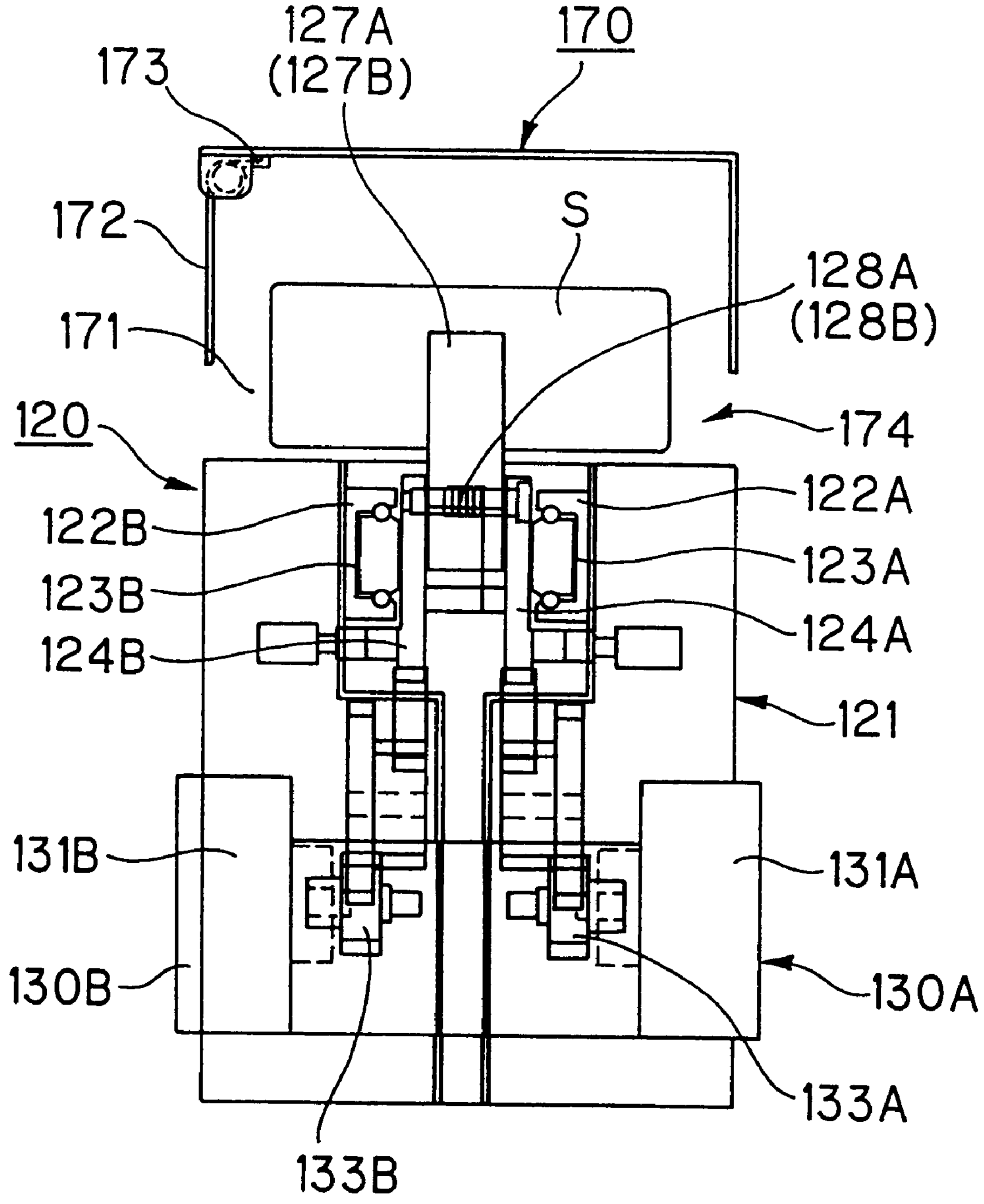
FIG. 52 is, likewise, an explanatory drawing showing a state of an article taking-in operation by an article-pick-up means.

The article S pushed out from the article-take-out opening 112 of the article-storing columns 110 is further pushed out towards the supporting flame 121 of the article-pick-up unit 120, as shown in FIG. 51 and FIG. 52, and is placed on the supporting flame 121 and taken into the cover 170.

When the article S is placed on the supporting flame 121 of the article-pick-up means 120, the article-pick-up means 120, by the drive of the first and the second transfer means 150 and 160 starts to move from the take-in position to the article-carry-out position corresponding to the shooter 108 (article-carry-out portion) in the shortest distance, as shown in FIG. 44 and FIG. 45, and is controlled to stop at the position.

Figure 53:
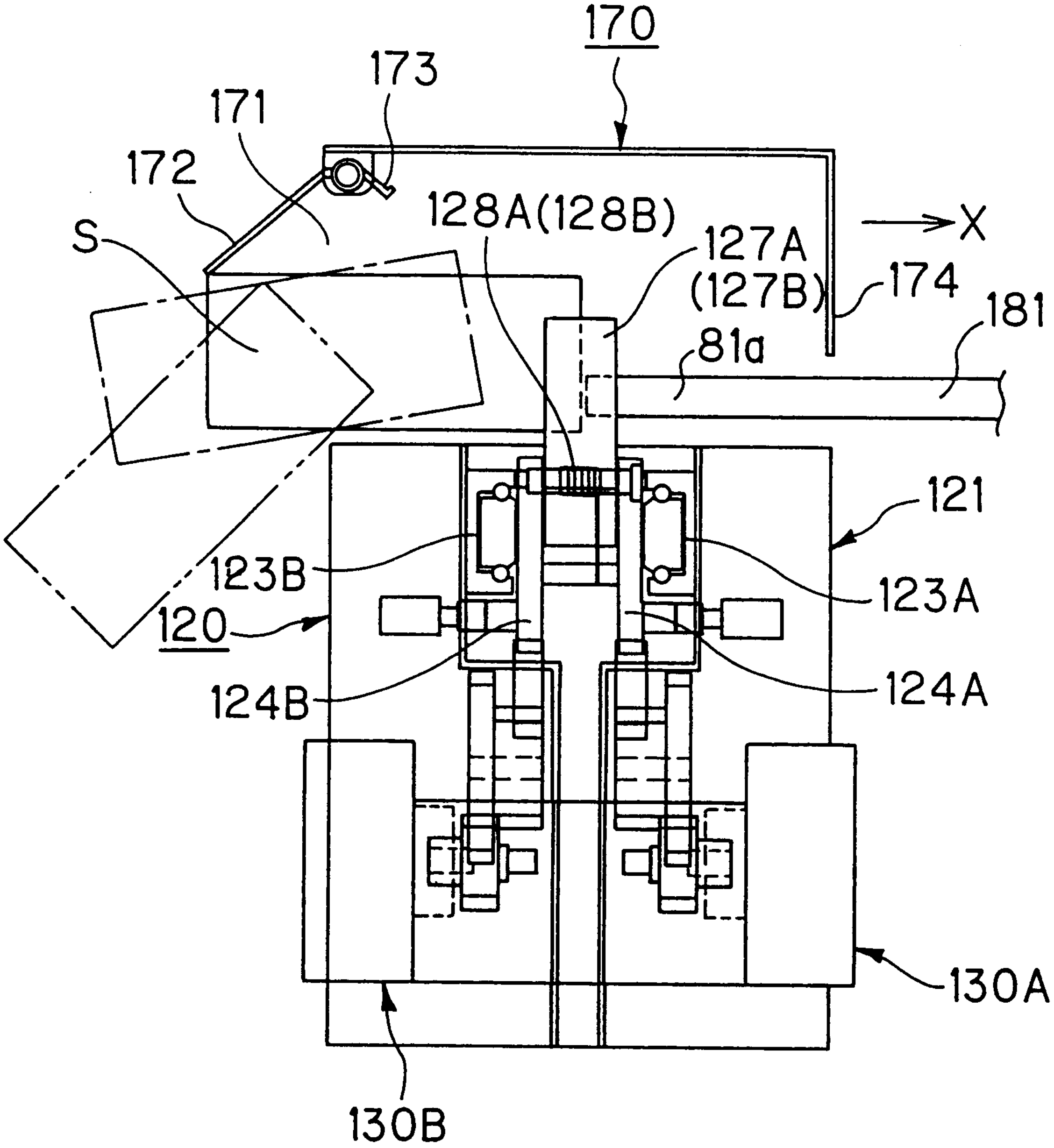
FIG. 53 is, likewise, an explanatory drawing showing a state of an article carrying-out operation at an article-carry-out portion.

Like this, when the article-pick-up means 120 moves to the article-carry-out portion, as shown in FIG. 53, the front end 181$a$ of the sticking-out plate 181 of the article-sticking-out means 180 is stack out into the sticking-out-aperture 174 opened at the other side surface of the cover 170, and by the actuation of the sticking-out plate 181 the article S placed on the supporting flame 121 of the article-pick-up unit 120 is stack out towards the article-carry-out aperture 171. By the sticking-out actuation of sticking-out plate 181 of the article-sticking-out means 180, the flap 172 opens against the force of the spring 173, and the article S may be carried out for sale.

Figure 54:
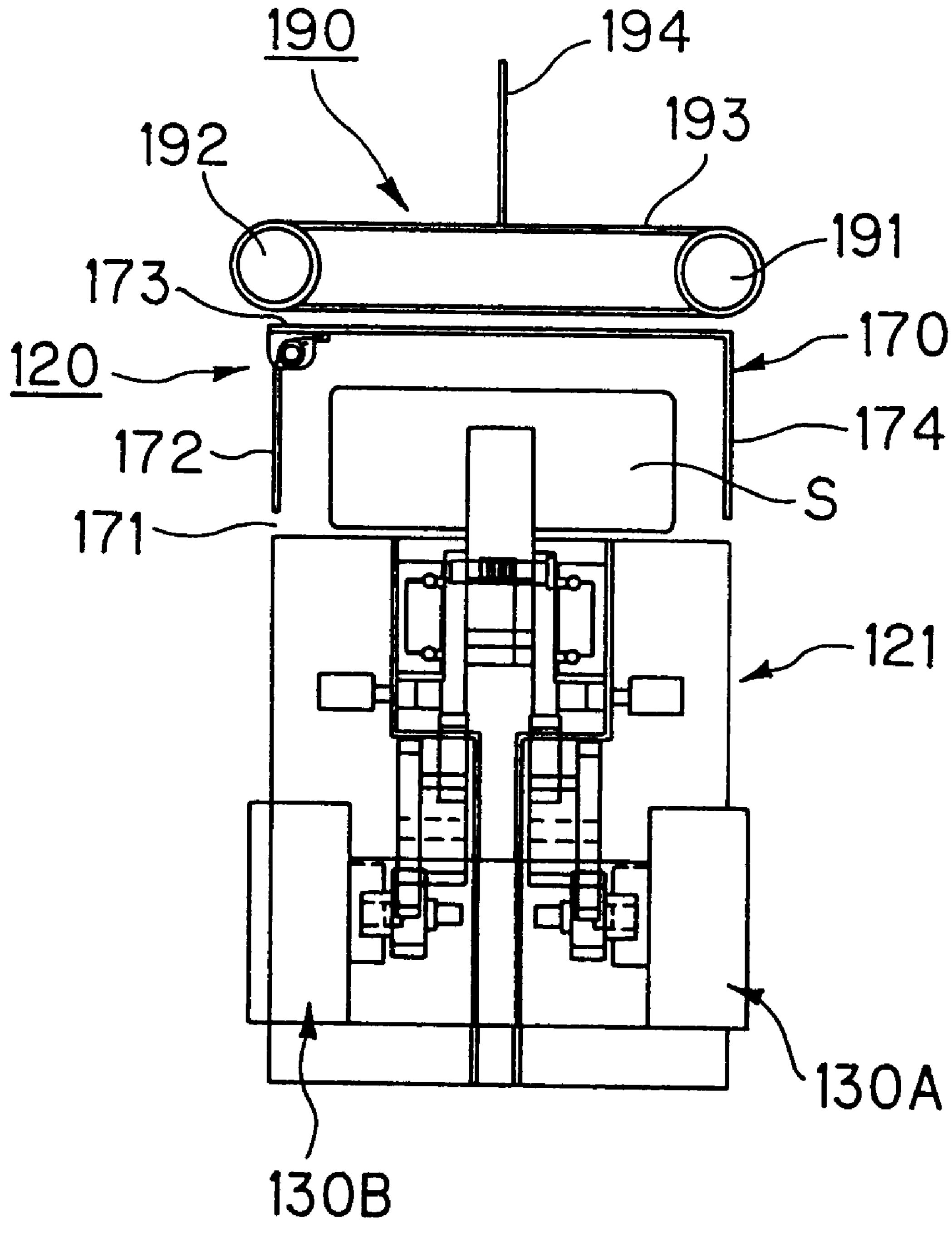
FIG. 54 is, likewise, a front view showing another embodiment of state of an article carrying-out operation at an article-carry-out portion.
Figure 55:
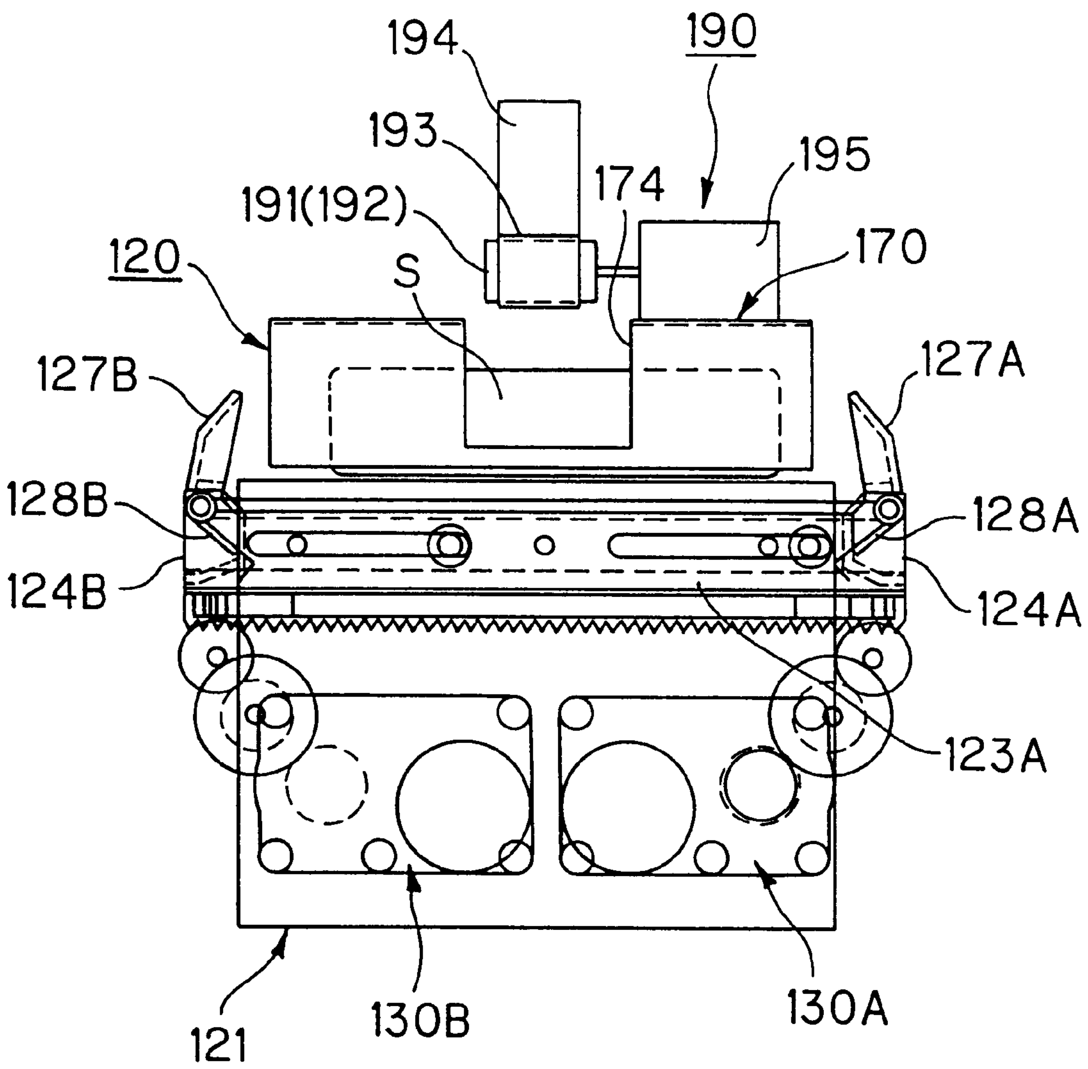
FIG. 55 is, likewise, a side view showing the state of an article carrying-out operation in FIG. 54.

FIG. 54 and FIG. 55 show another embodiment of the article-sticking-out means. This sticking-out means 190 is designed to provide a pair of right and left pulleys 191 and 192 at a position corresponding to the carry-out position of the main body 2 side of machine 1, and to hang an endless belt 193 between these pulleys 191 and 192, and to provide a protruding plate 194 on the endless belt 193. In this embodiment, the protruding plate 194 on the endless belt 193, by the rotating-movement of the endless belt 193 driven by one of the pulleys 191 and 192 connected with a drive motor 195, is stack into the sticking-out aperture 174 opened at the other side surface of the cover 170 and moved, so that the article S placed on the supporting flame 121 of the article-pick-up means 120 is stack out towards the article-carry-out aperture 171.

Further, in the above described embodiment, the operation for pushing out and taking in of an article for the rear article-storing columns arranged in the main body 102 of machine 101 is explained, but the operation for the front article-storing columns is conducted in the same way.

As is obvious from the above explanation, according to the invention, since a plurality of article-storing columns each of which storing various articles piled up therein are arranged in raw and column directions, and an article-pick-up means for taking in an article stored in each of these article-storing columns at a position opposite to it is provided in a state of being movable, and the article taken into the article-pick-up means is carried to an article-take-out window by the transfer of said article-pick-up means, the drive for pushing out articles in all the article-storing columns may be conducted with one article-pick-up means. In addition, since it is unnecessary to install in the article-storing columns such complex article-push-out mechanism as the conventional one, number of parts required for an article-carrying mechanism is reduced and cost reduction for the whole apparatus may be realized.

Also, since the article-storing columns and the article-push-out means are arranged in the main body and the inside of the door thereof, article-storing efficiency may be raised.

As this invention may be embodied in several forms without departing from the spirit of essential characteristics thereof, the present embodiment is therefore illustrative and not restrictive, since the scope of the invention is defined by the appended claims rather than by the description proceeding them, and all changes that fall within meets and bounds of the claims, or equivalence of such meets and bounds are therefore intended to embraced by the claims.

What is claimed is:

1. An apparatus for carrying a selected article to a take-up window in an automatic in an automatic vending machine, comprising a plurality of columns for storing various articles classified in kind and piled one on another, the plurality of columns being arranged in columns and rows, the apparatus, comprising:

means for pushing out an article which is positioned at the lowest layer in each of the plurality of columns, the pushing-out means being provided at the lower part of each of the plurality of columns;

means for picking up the article pushed out by the pushing-out means; and means for moving the picking-up means which is holding the article in predetermined directions, whereby the selected article is carried to a predetermined position in the vicinity of the take-out window;

wherein, the pushing-out means is actuated by the picking-up means, wherein each of the columns and the pushing-out means are arranged in the main body and the inside of the door which is provided in the front of the main body and enabled to open and shut.

2. The apparatus as defined in claim 1, wherein the picking-up means is positioned between the main body and the door thereof.

3. The apparatus as defined in claim 1, wherein the moving means has means for hanging and supporting the picking-up means in a state being movable in horizontal direction, a vertical-transfer mechanism which makes the hanging-and-supporting means move in vertical direction, and a horizontal-transfer mechanism which makes the picking-up means hung and supported by the hanging-and-supporting means move in horizontal direction.

4. The apparatus as defined in claim 1, wherein the pushing-out means has a pushing-out member which moves to push out an article at the lowest layer piled up in each of columns toward a direction for the article to be pushed out, and a differential mechanism which makes the pushing-out member return to its original waiting position.

5. The apparatus as defined in claim 1, wherein the picking-up means has a pushing-out-drive means which makes the pushing-out means drive toward the pushing-out direction of the article, means for taking in the article pushed out from the column one by one by the drive of the pushing-out means driven by the pushing-out-drive means, and a means for holding and carrying the article which stores and holds the article temporally and carries out it, wherein the holding-and-carrying means is enabled to carry out the article at the position to which the picking-up means is moved by the moving means and at which it corresponds to the article-carrying out portion.

6. The apparatus as defined in claim 5, wherein the pushing-out-drive means has a protrusion member enabled to protrude and move toward the pushing-out means and means for driving the protrusion member, and the pushing-out member of the pushing-out means is pushed out by the protrusion and movement of the protrusion member driven by the drive means, and returned to its original waiting position by the releasing operation by the withdrawal drive of the protrusion member.

7. The apparatus as defined in claim 5, wherein the drive means for the taking-in means and for the holding-and-carrying means is co-used.

8. An apparatus for carrying a selected article to a take-out window in an automatic vending machine, a plurality of columns for storing various articles classified in kind and piled one on another, the plurality of columns being arranged in columns and rows, the apparatus, comprising:

means for picking up the article from each of the plurality of columns one by one at a position opposite to the column and taking therein; and means for moving the picking-up means selectively from the article-take-out window to a position corresponding to each of the plurality of columns;

wherein the picking-up means includes an article-taking-in-and-placing unit, a protrusion member enabled to move to protrude and withdraw so as to take in an article at the lowest layer in the column into said article-take-in-and-placing unit, a pushing-out member which is provided at the protruding end of the protrusion member and capable of rotating to stand upward, and a drive unit driving the protrusion member, wherein an article at the lowest layer in the column is pushed out from its back side toward the article-take-in-and-placing unit by the withdrawal movement of the protrusion member by the drive unit after the protrusion.

9. The apparatus as defined in claim 8, wherein the columns are arranged in the main body and the door which is provided in the front side of the main body and enabled to open and shut.

10. The apparatus as defined in claim 9, wherein the picking up means is positioned between the main body of a machine and the door.

11. The apparatus as defined in claim 8, wherein the moving means comprise a hanging-and-supporting means which hangs and supports the picking-up means, a vertical-transfer mechanism which moves the hanging-and-supporting means perpendicularly, and a horizontal-transfer mechanism which moves the picking-up means which is hung and supported by the hanging-and-supporting means in a horizontal direction.

* * * * *